US008345384B1

(12) United States Patent
Sasaki et al.

(10) Patent No.: US 8,345,384 B1
(45) Date of Patent: Jan. 1, 2013

(54) MAGNETIC HEAD FOR PERPENDICULAR MAGNETIC RECORDING HAVING A MAIN POLE AND A SHIELD

(75) Inventors: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Hironori Araki, Milpitas, CA (US); Atsushi Iijima, Hong Kong (CN)

(73) Assignees: Headway Technologies, Inc., Milpitas, CA (US); SAE Magnetics (H.K.) Ltd., Hong Kong (CN)

(*) Notice: Subject to any disclaimer, the term of this patent is extended or adjusted under 35 U.S.C. 154(b) by 0 days.

(21) Appl. No.: 13/310,192

(22) Filed: Dec. 2, 2011

(51) Int. Cl.
*G11B 5/127* (2006.01)

(52) U.S. Cl. .................. 360/125.15; 360/125.3

(58) Field of Classification Search ............. 360/123.11, 360/123.06, 125.02, 123.02, 123.03, 125.3
See application file for complete search history.

(56) References Cited

U.S. PATENT DOCUMENTS

| | | | | |
|---|---|---|---|---|
| 6,469,868 B2* | 10/2002 | Yamamoto et al. | ...... | 360/125.71 |
| 6,504,678 B1* | 1/2003 | Kamijima | ................ | 360/125.42 |
| 6,525,903 B1* | 2/2003 | Sasaki | ...................... | 360/125.43 |
| 7,365,942 B2* | 4/2008 | Sasaki et al. | ............ | 360/125.02 |
| 7,692,894 B2* | 4/2010 | Kobayashi | ............... | 360/123.09 |
| 7,940,495 B2* | 5/2011 | Sasaki et al. | ............ | 360/125.27 |
| 8,035,921 B2* | 10/2011 | Sunwoo | ................... | 360/123.05 |
| 2004/0150910 A1 | 8/2004 | Okada et al. | | |
| 2005/0083608 A1* | 4/2005 | Watanabe | ..................... | 360/126 |
| 2005/0280937 A1* | 12/2005 | Sasaki et al. | ................... | 360/126 |
| 2006/0126221 A1* | 6/2006 | Kobayashi et al. | ........... | 360/123 |
| 2009/0059426 A1 | 3/2009 | Sasaki et al. | | |

* cited by examiner

*Primary Examiner* — Brian Miller
(74) *Attorney, Agent, or Firm* — Oliff & Berridge, PLC

(57) ABSTRACT

A main pole has a top surface and a bottom end that each include first, second, and third portions arranged contiguously in this order of increasing distance from a medium facing surface. A first virtual plane and a second virtual plane are assumed. The first virtual plane passes through an end of an end face of the main pole located forward in the direction of travel of a recording medium and is perpendicular to the medium facing surface and to the direction of travel of the recording medium. The second virtual plane passes through an end of the end face of the main pole located backward in the direction of travel of the recording medium and is perpendicular to the medium facing surface and to the direction of travel of the recording medium. The first and third portions are inclined relative to the first and second virtual planes and the medium facing surface. The second portion is parallel to the first and second virtual planes.

9 Claims, 36 Drawing Sheets

MAGNETIC HEAD FOR PERPENDICULAR MAGNETIC RECORDING HAVING A MAIN POLE AND A SHIELD

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a main pole and a shield.

2. Description of Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head having a magnetoresistive element (hereinafter, also referred to as MR element) for reading and a write head having an induction-type electromagnetic transducer for writing are stacked on a substrate. The write head includes a main pole that produces a magnetic field in a direction perpendicular to the plane of the recording medium. The main pole includes, for example, a track width defining portion having an end located in a medium facing surface that faces the recording medium, and a wide portion that is connected to the other end of the track width defining portion and is greater in width than the track width defining portion. The track width defining portion has a generally constant width. To achieve higher recording density, it is required that the write head of the perpendicular magnetic recording system be smaller in track width and improved in write characteristics such as overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of the recording medium by means of an airflow that comes from the air inflow end into the space between the medium facing surface and the recording medium. The magnetic head is typically disposed near the air outflow end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erasure). For higher recording densities, it is necessary to prevent adjacent track erasure.

A known technique for preventing adjacent track erasure induced by a skew is to configure the main pole so that its end face located in the medium facing surface decreases in width with increasing proximity to the top surface of the substrate, as disclosed in U.S. Patent Application Publication Nos. US 2004/0150910 A1 and US 2009/0059426 A1, for example. U.S. Patent Application Publication Nos. US 2004/0150910 A1 and US 2009/0059426 A1 also disclose configuring the main pole so that its thickness in the vicinity of the medium facing surface decreases with increasing proximity to the medium facing surface.

In order to prevent skew-induced problems, it is also effective to reduce the thickness of the main pole in the medium facing surface. If the entire main pole is thinned, however, the main pole becomes small in cross-sectional area perpendicular to the direction in which magnetic flux flows. This makes it difficult for the main pole to direct much magnetic flux to the medium facing surface, thus leading to degradation of overwrite property.

Configuring the main pole so that its thickness in the vicinity of the medium facing surface decreases with increasing proximity to the medium facing surface as disclosed in U.S. Patent Application Publication Nos. US 2004/0150910 A1 and US 2009/0059426 A1 makes it possible to reduce the thickness of the main pole in the medium facing surface and increase the thickness of a portion of the main pole away from the medium facing surface to allow the main pole to direct much magnetic flux to the medium facing surface.

In order to prevent adjacent track erasure induced by a skew and provide higher recording densities, it is effective to provide a write shield that has an end face located in the medium facing surface at a position forward of the end face of the main pole in the direction of travel of the recording medium, as disclosed in U.S. Patent Application Publication No. US 2009/0059426 A1.

In a magnetic head having the write shield, there are typically provided one or more return path sections for connecting the write shield to part of the main pole away from the medium facing surface. The write shield and the one or more return path sections function to capture a magnetic flux that is produced from the end face of the main pole and spreads in directions other than the direction perpendicular to the plane of the recording medium, and to thereby prevent the magnetic flux from reaching the recording medium. The write shield and the one or more return path sections also function to allow a magnetic flux that has been produced from the end face of the main pole and has magnetized the recording medium to flow back to the main pole.

The position of an end of a record bit to be recorded on the recording medium depends on the position of an end of the end face of the main pole located in the medium facing surface, the end being located forward in the direction of travel of the recording medium. In order to define the position of the end of the record bit accurately, it is therefore important that the write shield have an end face that is located in the medium facing surface at a position forward of the end face of the main pole in the direction of travel of the recording medium and that this end face of the write shield capture a magnetic flux that is produced from the end face of the main pole and spreads in directions other than the direction perpendicular to the plane of the recording medium. The magnetic head having the write shield is capable of preventing adjacent track erasure and provides a further improved recording density.

As described above, configuring the main pole so that its thickness in the vicinity of the medium facing surface decreases with increasing proximity to the medium facing surface makes it possible to reduce the thickness of the main pole in the medium facing surface and increase the thickness of a portion of the main pole away from the medium facing surface to allow the main pole to direct much magnetic flux to the medium facing surface. Nevertheless, there may be cases where the portion of the main pole away from the medium facing surface has an insufficient thickness.

To cope with this, it is also effective to connect a yoke layer to the portion of the main pole away from the medium facing surface to increase the total thickness of the main pole and the yoke layer while reducing the thickness of the main pole in the medium facing surface, as disclosed in U.S. Patent Application Publication No. US 2009/0059426 A1.

Now, a problem with the magnetic head having the write shield and the yoke layer will be described. To make full use of the effect of the yoke layer mentioned above, a front end face of the yoke layer facing toward the medium facing surface is preferably brought as close to the medium facing surface as possible. However, this causes a decrease in the distance between the front end face of the yoke layer and the write shield, thereby causing an increase in magnetic flux leakage from the yoke layer to the write shield to cause degradation of write characteristics such as the overwrite property. Typically, a corner having an angle of 90° is formed between the front end face of the yoke layer and each of top and bottom surfaces of the yoke layer, and magnetic flux tends to leak from inside to outside the yoke layer at the corner, in particular. A decrease in the distance between the front end face of the yoke layer and the write shield causes an increase in magnetic flux leakage from the corner of the yoke layer to the write shield.

It has thus been difficult for conventional magnetic heads having the write shield and the yoke layer to prevent the skew-induced problems and provide improved write characteristics.

OBJECT AND SUMMARY OF THE INVENTION

It is an object of the present invention to provide a magnetic head for perpendicular magnetic recording that is capable of preventing the skew-induced problems and providing improved write characteristics. A magnetic head for perpendicular magnetic recording of the present invention includes: a medium facing surface that faces a recording medium; a coil that produces a magnetic field corresponding to data to be written on the recording medium; a main pole; a write shield; and a gap part. The main pole has an end face located in the medium facing surface, allows a magnetic flux corresponding to the magnetic field produced by the coil to pass, and produces a write magnetic field for writing the data on the recording medium by means of a perpendicular magnetic recording system. The write shield is made of a magnetic material and has an end face located in the medium facing surface. The gap part is made of a nonmagnetic material and interposed between the main pole and the write shield.

The end face of the write shield includes a first end face portion that is located forward of the end face of the main pole in a direction of travel of the recording medium. The main pole has a top surface, and a bottom end opposite to the top surface, the top surface being a surface located at a forward end in the direction of travel of the recording medium. At least one of the top surface and the bottom end of the main pole includes a first portion, a second portion, and a third portion that are contiguously arranged in this order of increasing distance from the medium facing surface. The first portion has a first end located in the medium facing surface, and a second end opposite to the first end. The third portion has a third end connected to the second portion, and a fourth end that is located farther from the medium facing surface than is the third end. The end face of the main pole has an end located forward in the direction of travel of the recording medium and an end located backward in the direction of travel of the recording medium.

A first virtual plane and a second virtual plane are assumed for the magnetic head for perpendicular magnetic recording of the present invention. The first virtual plane passes through the end of the end face of the main pole located forward in the direction of travel of the recording medium and is perpendicular to the medium facing surface and to the direction of travel of the recording medium. The second virtual plane passes through the end of the end face of the main pole located backward in the direction of travel of the recording medium and is perpendicular to the medium facing surface and to the direction of travel of the recording medium. The first portion is inclined relative to the first and second virtual planes and the medium facing surface such that the second end is located farther from the first and second virtual planes than is the first end. The second portion is substantially parallel to the first and second virtual planes. The third portion is inclined relative to the first and second virtual planes and the medium facing surface such that the fourth end is located farther from the first and second virtual planes than is the third end. The write shield includes a portion interposed between the third portion and the medium facing surface.

In the magnetic head for perpendicular magnetic recording of the present invention, the end face of the main pole located in the medium facing surface may have a width that decreases with increasing distance from the first virtual plane.

In the magnetic head for perpendicular magnetic recording of the present invention, the at least one of the top surface and the bottom end of the main pole may further include a fourth portion and a fifth portion. The fourth portion is contiguous with the third portion and is located farther from the medium facing surface than is the third portion. The fifth portion is contiguous with the fourth portion and is located farther from the medium facing surface than is the fourth portion. The fourth portion is substantially parallel to the first and second virtual planes. The fifth portion has a fifth end connected to the fourth portion, and a sixth end that is located farther from the medium facing surface than is the fifth end. The fifth portion is inclined relative to the first and second virtual planes and the medium facing surface such that the sixth end is located farther from the first and second virtual planes than is the fifth end.

In the magnetic head for perpendicular magnetic recording of the present invention, the top surface of the main pole may include the first to third portions, and the bottom end of the main pole may include an inclined portion that has a first end located in the medium facing surface and a second end opposite to the first end. The inclined portion is inclined relative to the first and second virtual planes and the medium facing surface such that the second end of the inclined portion is located farther from the first and second virtual planes than is the first end of the inclined portion. The write shield may have a slope including a portion that is opposed to the first portion with the gap part interposed therebetween. The slope is inclined relative to the first and second virtual planes and the medium facing surface. The first portion may be smaller than each of the inclined portion and the slope in length in a direction perpendicular to the medium facing surface. In this case, the magnetic head may further include a return path section made of a magnetic material. The return path section is located forward of the main pole in the direction of travel of the recording medium and connects the write shield and part of the main pole away from the medium facing surface to each other so that a space is defined by the main pole, the gap part, the write shield, and the return path section. The coil may include a portion that passes through the space.

In the magnetic head for perpendicular magnetic recording of the present invention, the bottom end of the main pole may include the first to third portions, and the end face of the write shield may further include a second end face portion that is located backward of the end face of the main pole in the direction of travel of the recording medium. The top surface of the main pole may include an inclined portion that has a first end located in the medium facing surface and a second end opposite to the first end. The inclined portion is inclined relative to the first and second virtual planes and the medium facing surface such that the second end of the inclined portion is located farther from the first and second virtual planes than is the first end of the inclined portion. The write shield may have a slope including a portion that is opposed to the inclined portion with the gap part interposed therebetween. The slope is inclined relative to the first and second virtual planes and the medium facing surface. The inclined portion may be smaller than each of the first portion and the slope in length in the direction perpendicular to the medium facing surface. In this case, the magnetic head may further include a return path section made of a magnetic material. The return path section is located backward of the main pole in the direction of travel of the recording medium and connects the write shield and part of the main pole away from the medium facing surface to each other so that a space is defined by the main pole, the gap part, the write shield, and the return path section. The coil may include a portion that passes through the space.

In the magnetic head for perpendicular magnetic recording of the present invention, each of the top surface and the bottom end of the main pole may include the first to third portions, and the end face of the write shield may further include a second end face portion that is located backward of the end face of the main pole in the direction of travel of the recording medium. The write shield may have a slope including a portion that is opposed to the first portion of the top surface of the main pole with the gap part interposed therebetween. The slope is inclined relative to the first and second virtual planes and the medium facing surface. The first portion of the top surface of the main pole may be smaller than each of the first portion of the bottom end of the main pole and the slope in length in the direction perpendicular to the medium facing surface. In this case, the magnetic head may further include a first return path section and a second return path section each made of a magnetic material. The first return path section is located forward of the main pole in the direction of travel of the recording medium and connects the write shield and part of the main pole away from the medium facing surface to each other so that a first space is defined by the main pole, the gap part, the write shield, and the first return path section. The second return path section is located backward of the main pole in the direction of travel of the recording medium and connects the write shield and part of the main pole away from the medium facing surface to each other so that a second space is defined by the main pole, the gap part, the write shield, and the second return path section. The coil may include a first portion that passes through the first space and a second portion that passes through the second space.

In the magnetic head for perpendicular magnetic recording of the present invention, at least one of the top surface and the bottom end of the main pole includes the first portion and the third portion. This makes it possible to reduce the thickness of the main pole in the medium facing surface and sufficiently increase the thickness of a portion of the main pole that is located farther from the medium facing surface than is the third portion. Furthermore, in the present invention, the at least one of the top surface and the bottom end of the main pole includes the second portion. This makes it possible to increase the distance between the third portion and the write shield as compared with a case where the second portion is not provided. Consequently, according to the present invention, it is possible to prevent the skew-induced problems and to provide improved write characteristics.

Other objects, features and advantages of the present invention will become fully apparent from the following description.

DETAILED DESCRIPTION OF THE PREFERRED EMBODIMENTS

First Embodiment

Figure 1:
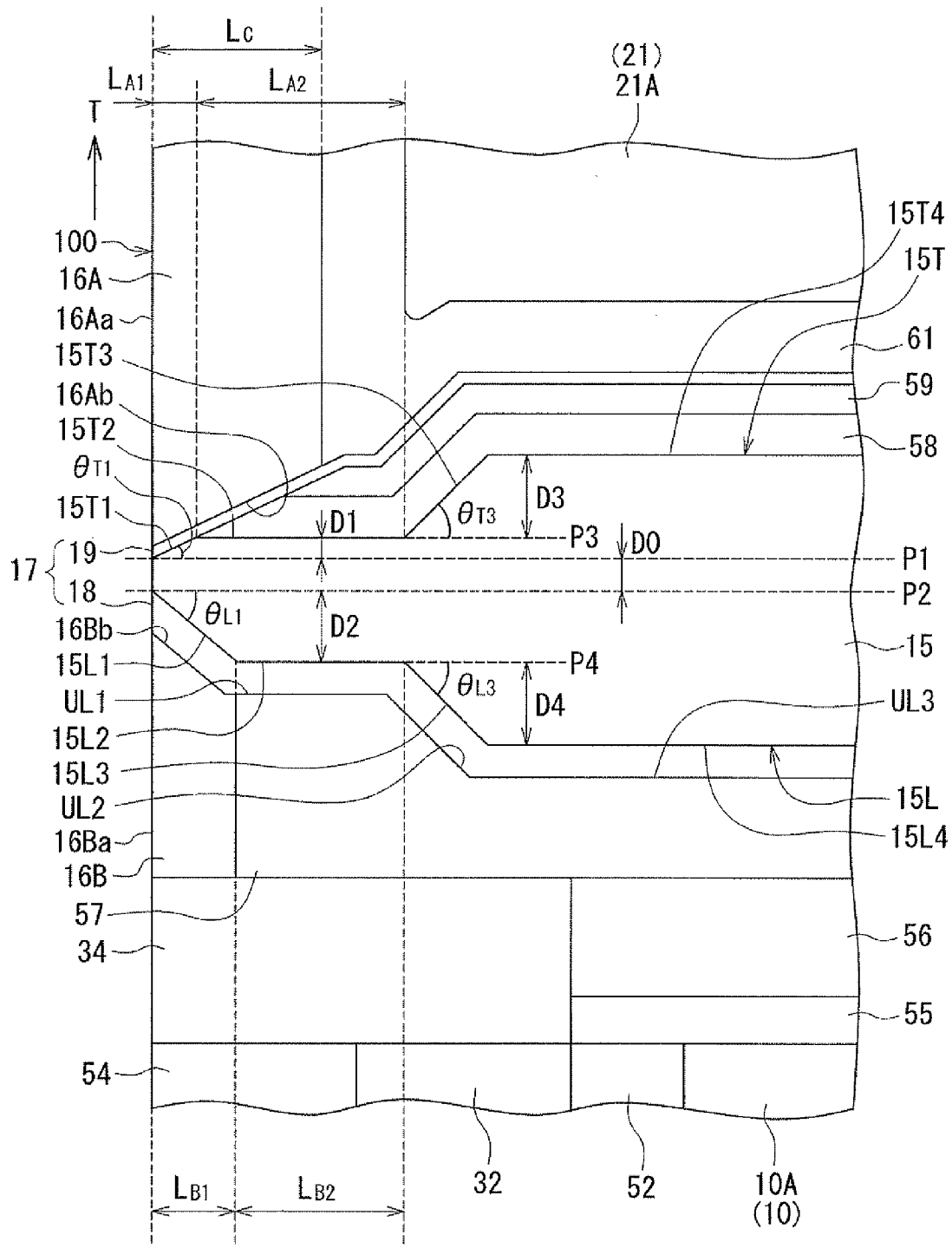
FIG. 1 is a cross-sectional view showing a part of a main pole in the vicinity of a medium facing surface in a magnetic head according to a first embodiment of the invention.
Figure 2:
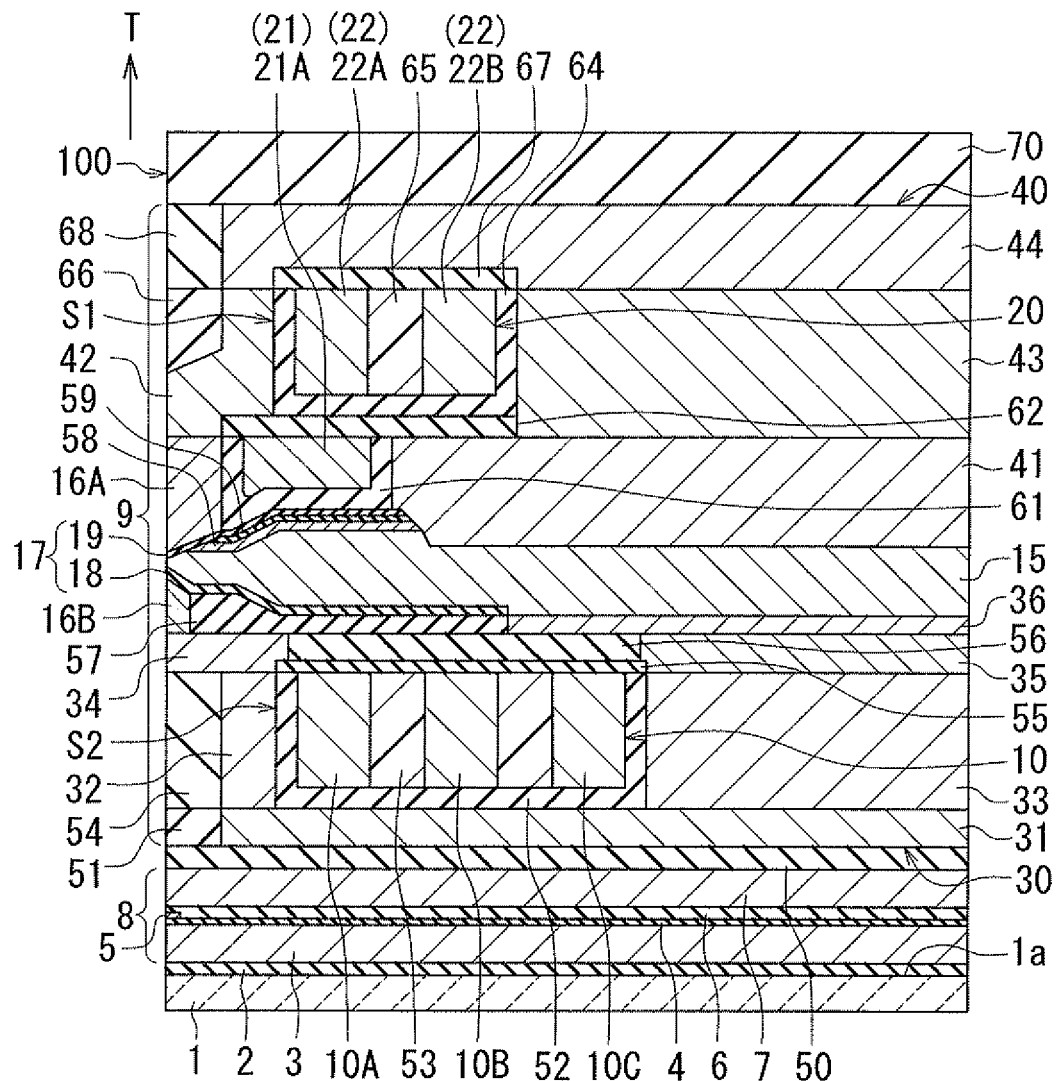
FIG. 2 is a cross-sectional view of the magnetic head according to the first embodiment of the invention.
Figure 3:
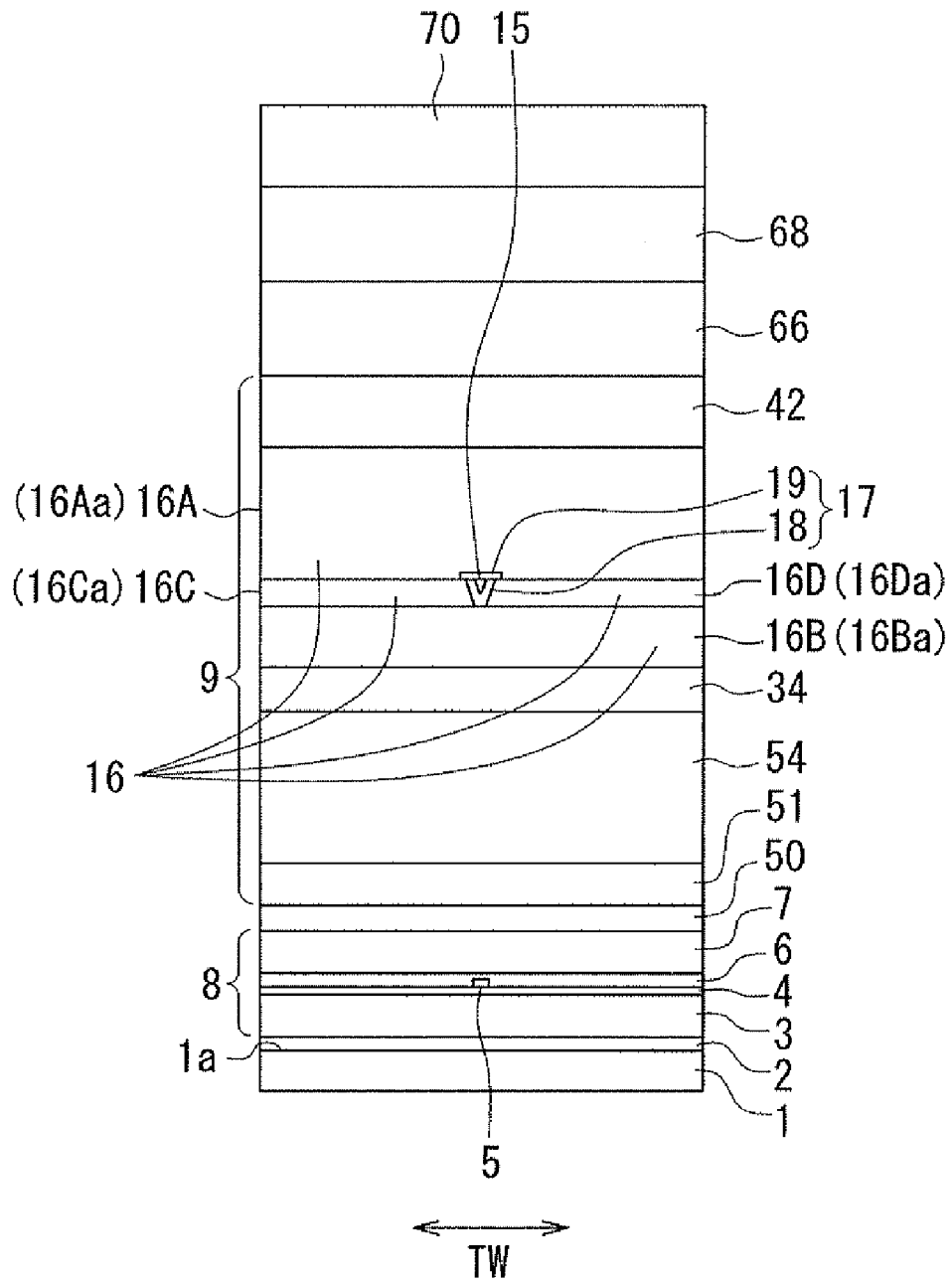
FIG. 3 is a front view showing the medium facing surface of the magnetic head according to the first embodiment of the invention.
Figure 4:
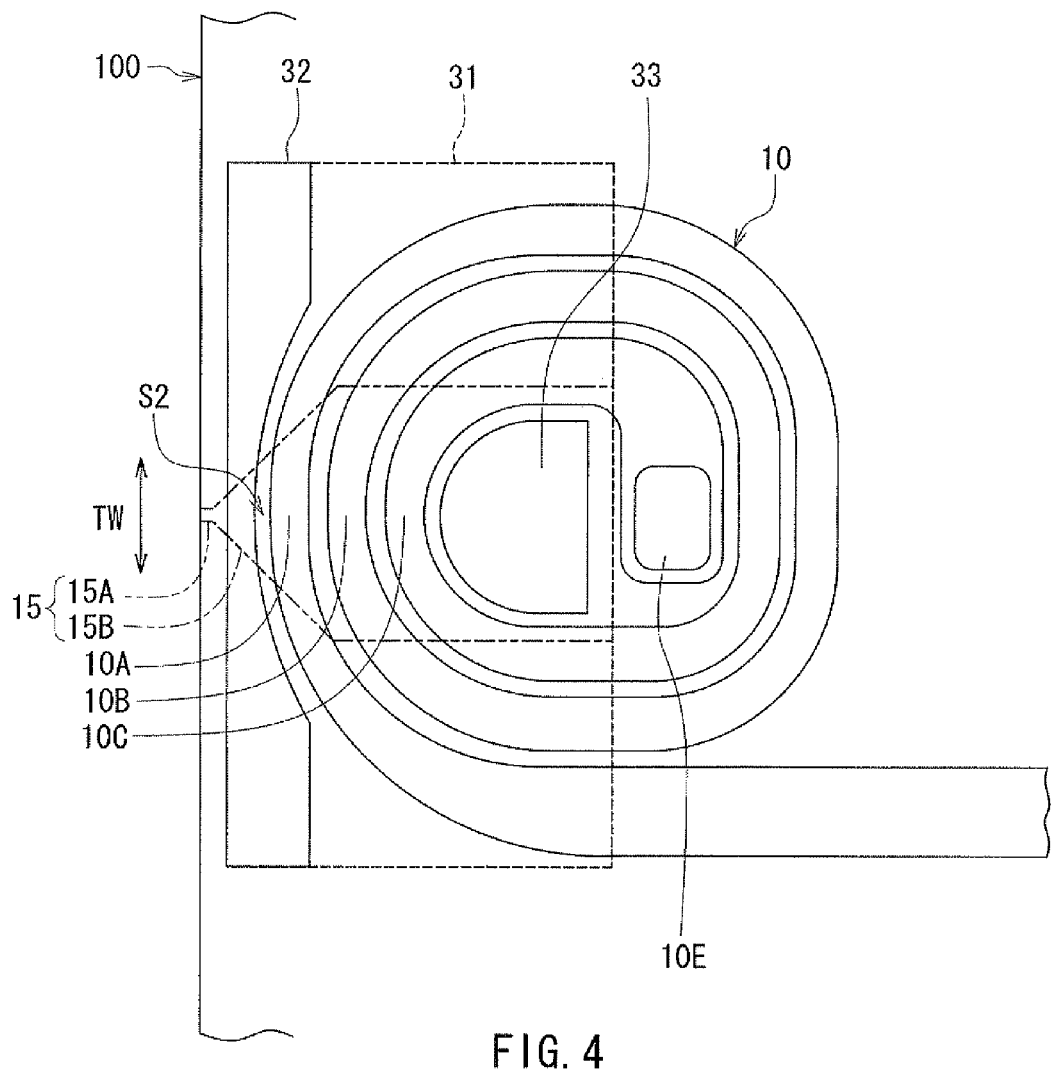
FIG. 4 is a plan view showing a second portion of a coil in the magnetic head according to the first embodiment of the invention.
Figure 5:
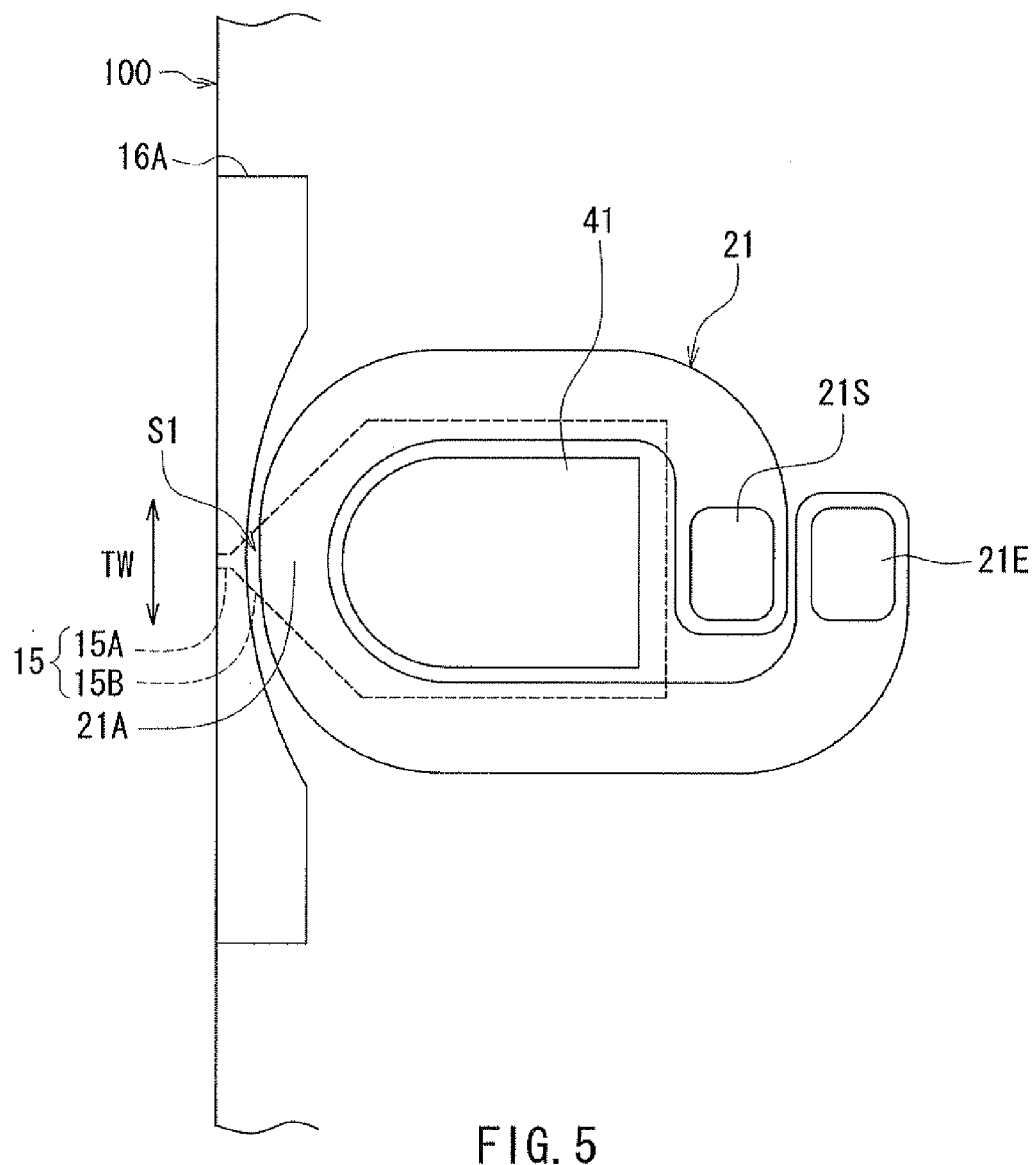
FIG. 5 is a plan view showing a first layer of a first portion of the coil in the magnetic head according to the first embodiment of the invention.
Figure 6:
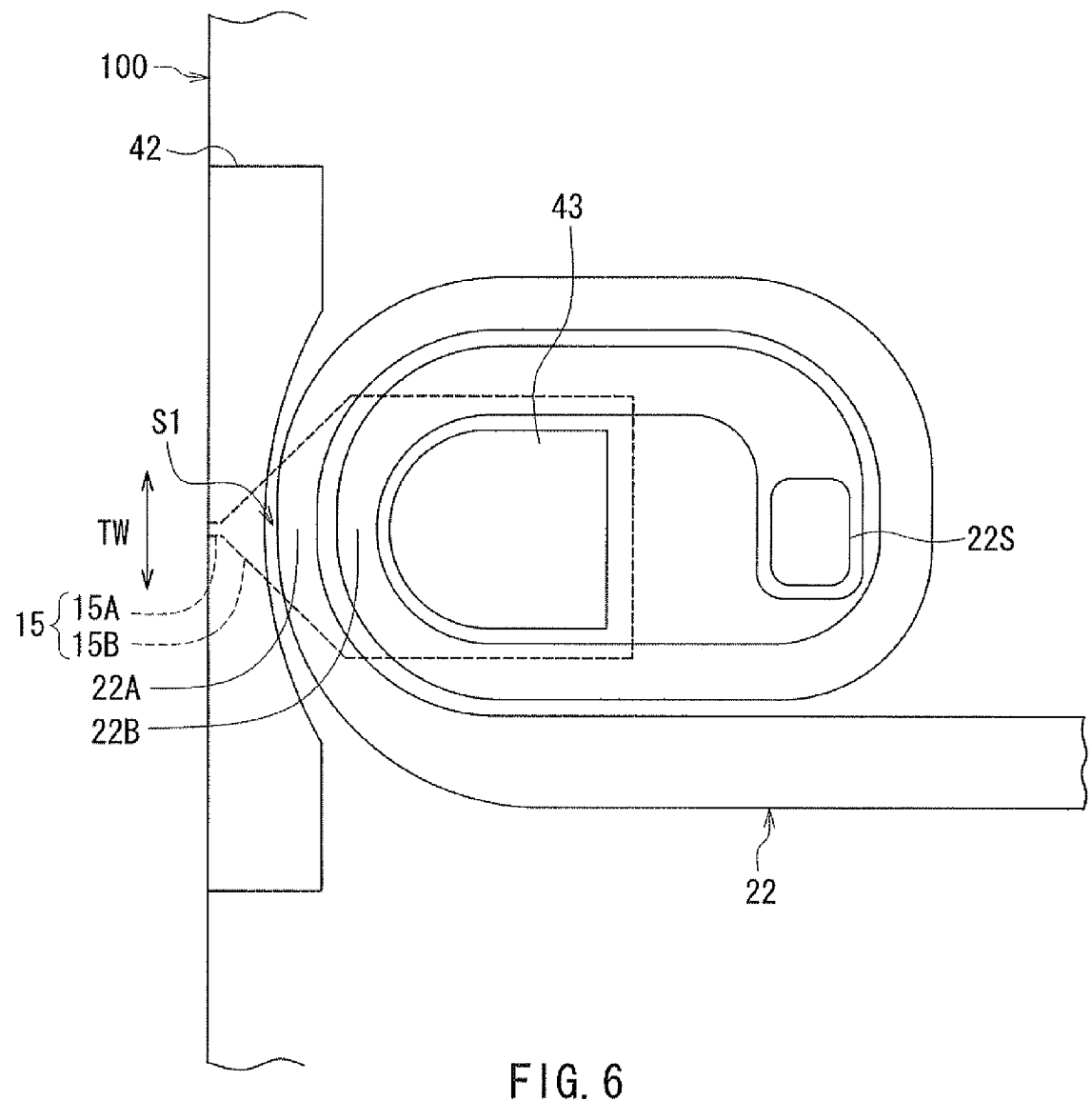
FIG. 6 is a plan view showing a second layer of the first portion of the coil in the magnetic head according to the first embodiment of the invention.

Embodiments of the present invention will now be described in detail with reference to the drawings. First, reference is made to FIG. 1 to FIG. 6 to describe the configuration of a magnetic head according to a first embodiment of the invention. FIG. 1 is a cross-sectional view showing a part of a main pole in the vicinity of a medium facing surface in the magnetic head according to the present embodiment. FIG. 2 is a cross-sectional view of the magnetic head according to the present embodiment. Note that FIG. 1 and FIG. 2 show cross sections perpendicular to the medium facing surface and the top surface of the substrate. The arrows with the symbol T in FIG. 1 and FIG. 2 indicate the direction of travel of the recording medium. FIG. 3 is a front view showing the medium facing surface of the magnetic head according to the present embodiment. FIG. 4 is a plan view showing a second portion of a coil of the magnetic head according to the present embodiment. FIG. 5 is a plan view showing a first layer of a first portion of the coil of the magnetic head according to the present embodiment. FIG. 6 is a plan view showing a second layer of the first portion of the coil of the magnetic head according to the present embodiment. The arrows with the symbol TW in FIG. 3 to FIG. 6 indicate the track width direction.

As shown in FIG. 2 and FIG. 3, the magnetic head for perpendicular magnetic recording (hereinafter simply referred to as the magnetic head) according to the present embodiment includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a first read shield layer 3 made of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 made of a magnetic material and disposed on the second read shield gap film 6.

An end of the MR element 5 is located in a medium facing surface 100 that faces the recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head section 8. The magnetic head further includes a nonmagnetic layer 50 made of a nonmagnetic material and disposed on the second read shield layer 7, and a write head section 9 disposed on the nonmagnetic layer 50. The nonmagnetic layer 50 is made of alumina, for example. The write head section 9 includes a coil, a main pole 15, a write shield 16, and a gap part 17.

The coil produces a magnetic field corresponding to data to be written on the recording medium. The coil includes a first portion 20 and a second portion 10. The first portion 20 and the second portion 10 are both made of a conductive material such as copper. The first portion 20 and the second portion 10 are connected in series or in parallel. The main pole 15 has an end face located in the medium facing surface 100. The main pole 15 allows a magnetic flux corresponding to the magnetic field produced by the coil to pass, and produces a write magnetic field for writing data on the recording medium by means of a perpendicular magnetic recording system. FIG. 1 and FIG. 2 each show a cross section that intersects the end face of the main pole 15 located in the medium facing surface 100 and that is perpendicular to the medium facing surface 100 and the top surface 1a of the substrate 1 (the cross section will hereinafter be referred to as the main cross section).

The write shield 16 has an end face located in the medium facing surface 100. The end face of the write shield 16 includes first to fourth end face portions 16Aa, 16Ba, 16Ca, and 16Da. The first end face portion 16Aa is located forward of the end face of the main pole 15 in the direction T of travel of the recording medium. The second end face portion 16Ba is located backward of the end face of the main pole 15 in the direction T of travel of the recording medium. The third and fourth end face portions 16Ca and 16Da are located on opposite sides of the end face of the main pole 15 in the track width direction TW. In the medium facing surface 100, the first to fourth end face portions 16Aa, 16Ba, 16Ca, and 16Da are arranged to wrap around the end face of the main pole 15.

The write shield 16 is made of a magnetic material. Examples of materials that can be used for the write shield 16 include CoFeN, CoNiFe, NiFe, and CoFe.

The write head section 9 further includes a first return path section 40 and a second return path section 30. The first return path section 40 and the second return path section 30 are both made of a magnetic material. Examples of materials that can be used for the first return path section 40 and the second return path section 30 include CoFeN, CoNiFe, NiFe, and CoFe. The first return path section 40 and the second return path section 30 align along a direction perpendicular to the top surface 1a of the substrate 1 with the main pole 15 interposed therebetween. The first return path section 40 is located forward of the main pole 15 in the direction T of travel of the recording medium, and connects the write shield 16 and part of the main pole 15 away from the medium facing surface 100 to each other, thereby magnetically coupling the write shield 16 and the main pole 15 to each other. The second return path section 30 is located backward of the main pole 15 in the direction T of travel of the recording medium, and connects the write shield 16 and part of the main pole 15 away from the medium facing surface 100 to each other, thereby magnetically coupling the write shield 16 and the main pole 15 to each other.

The second return path section 30 includes magnetic layers 31, 32, 33, 34, 35, and 36. The magnetic layer 31 is located on the nonmagnetic layer 50. The magnetic layers 32 and 33 are both located on the magnetic layer 31. The magnetic layer 32 is located near the medium facing surface 100. The magnetic layer 33 is located farther from the medium facing surface 100 than is the magnetic layer 32. The magnetic layers 31 and 32 have their respective end faces that face toward the medium facing surface 100. These end faces are located at a distance from the medium facing surface 100. As shown in FIG. 4, the second portion 10 of the coil is wound approximately three turns around the magnetic layer 33.

The magnetic head further includes an insulating layer 51 made of an insulating material and disposed on the nonmagnetic layer 50 to surround the magnetic layer 31, an insulating film 52 made of an insulating material and interposed between the second portion 10 and the magnetic layers 31 to 33, an insulating layer 53 made of an insulating material and disposed in the space between adjacent turns of the second portion 10, and an insulating layer 54 made of an insulating material and disposed around the second portion 10 and the magnetic layer 32. The top surfaces of the second portion 10, the magnetic layers 32 and 33, the insulating film 52, and the insulating layers 53 and 54 are even with each other. The insulating layers 51 and 54 and the insulating film 52 are made of alumina, for example. The insulating layer 53 is made of photoresist, for example.

The magnetic layer 34 is disposed over the magnetic layer 32 and the insulating layer 54. The magnetic layer 35 is disposed on the magnetic layer 33. The magnetic layer 34 has an end face located in the medium facing surface 100. The magnetic head further includes an insulating layer 55 made of an insulating material and disposed over the top surfaces of the second portion 10, the insulating film 52 and the insulating layers 53 and 54, and an insulating layer 56 made of an insulating material and disposed on the insulating layer 55 to surround the magnetic layers 34 and 35. The top surfaces of the magnetic layers 34 and 35 and the insulating layer 56 are even with each other. The insulating layers 55 and 56 are made of alumina, for example.

As shown in FIG. 3, the write shield 16 includes a first shield 16A, a second shield 16B, and two side shields 16C and 16D. The two side shields 16C and 16D are located on opposite sides of the main pole 15 in the track width direction TW. The first shield 16A is located forward of the main pole 15 in the direction T of travel of the recording medium. The second shield 16B is located backward of the main pole 15 in the direction T of travel of the recording medium. The side shields 16C and 16D magnetically couple the first shield 16A and the second shield 16B to each other.

As shown in FIG. 1, the first shield 16A includes the first end face portion 16Aa and a first slope 16Ab. The first slope 16Ab serves as a bottom surface. The second shield 16B includes the second end face portion 16Ba, and a top surface that includes a second slope 16Bb. The first slope 16Ab and the second slope 16Bb will be described in detail later. As shown in FIG. 3, the side shield 16C includes the third end face portion 16Ca. The side shield 16D includes the fourth end face portion 16Da.

The second shield 16B is disposed on the magnetic layer 34. The magnetic layer 36 is disposed over the magnetic layer 35 and the insulating layer 56. The magnetic head further includes a nonmagnetic layer 57 made of a nonmagnetic material. The nonmagnetic layer 57 is disposed on part of the top surface of the magnetic layer 34 and on the top surface of the insulating layer 56, and surrounds the second shield 16B and the magnetic layer 36. As shown in FIG. 1, the top surface of the nonmagnetic layer 57 includes: a flat portion UL1 contiguous with the top surface of the second shield 16B; a slope UL2 that is contiguous with the flat portion UL1 and is located farther from the medium facing surface 100 than is the flat portion UL1; and a bottom portion UL3 that is contiguous with the slope UL2 and is located farther from the medium facing surface 100 than is the slope UL2. The nonmagnetic layer 57 is made of alumina, for example.

The main pole 15 has a top surface 15T (see FIG. 1), which is a surface located at a forward end in the direction T of travel of the recording medium, and has a bottom end 15L (see FIG. 1) opposite to the top surface 15T. The main pole 15 further has first and second side parts (see FIG. 3) that are opposite to each other in the track width direction TW. The side shield 16C has a first sidewall opposed to the first side part of the main pole 15. The side shield 16D has a second sidewall opposed to the second side part of the main pole 15.

The gap part 17 is made of a nonmagnetic material and interposed between the main pole 15 and the write shield 16. The gap part 17 includes a first gap layer 19 interposed between the main pole 15 and the first shield 16A, and a second gap layer 18 interposed between the main pole 15 and each of the second shield 16B and the side shields 16C and 16D.

The side shields 16C and 16D are disposed on the second shield 16B and in contact with the top surface of the second shield 16B. The second gap layer 18 is arranged to extend along the sidewalls of the side shields 16C and 16D, the top surface of the second shield 16B, and the top surface of the nonmagnetic layer 57. The second gap layer 18 is made of a nonmagnetic material. The nonmagnetic material employed to form the second gap layer 18 may be an insulating material or a nonmagnetic metal material. Alumina is an example of insulating materials that can be used to form the second gap layer 18. Ru is an example of nonmagnetic metal materials that can be used to form the second gap layer 18. The second gap layer 18 has an opening for exposing the top surface of the magnetic layer 36.

The main pole 15 is disposed over the second shield 16B and the nonmagnetic layer 57 such that the second gap layer 18 is interposed between the main pole 15 and the top surfaces of the second shield 16B and the nonmagnetic layer 57. As shown in FIG. 3, the second gap layer 18 is interposed also between the main pole 15 and each of the side shields 16C and 16D.

The bottom end 15L of the main pole 15 is in contact with the top surface of the magnetic layer 36 at a position away from the medium facing surface 100. The main pole 15 is made of a magnetic metal material. Examples of materials that can be used for the main pole 15 include NiFe, CoNiFe, and CoFe. The shape of the main pole 15 will be described in detail later.

The magnetic head further includes a first nonmagnetic layer (not shown) made of a nonmagnetic material and disposed around the main pole 15 and the side shields 16C and 16D. In the present embodiment, the first nonmagnetic layer is made of a nonmagnetic insulating material such as alumina, in particular.

The magnetic head further includes: a nonmagnetic metal layer 58 made of a nonmagnetic metal material and disposed on part of the top surface 15T of the main pole 15 at a position away from the medium facing surface 100; and an insulating layer 59 made of an insulating material and disposed on the top surface of the nonmagnetic metal layer 58. The nonmagnetic metal layer 58 is made of Ru, NiCr, or NiCu, for example. The insulating layer 59 is made of alumina, for example.

The first gap layer 19 is disposed to cover the main pole 15, the nonmagnetic metal layer 58, and the insulating layer 59. The first gap layer 19 is made of a nonmagnetic material. The material employed for the first gap layer 19 may be a nonmagnetic insulating material such as alumina, or a nonmagnetic conductive material such as Ru, NiCu, Ta, W, NiB, or NiP.

The first shield 16A is disposed over the side shields 16C and 16D and the first gap layer 19, and is in contact with the top surfaces of the side shields 16C and 16D and the first gap layer 19. In the medium facing surface 100, part of the first end face portion 16Aa of the first shield 16A is spaced from the end face of the main pole 15 by a predetermined distance created by the thickness of the first gap layer 19. The thickness of the first gap layer 19 preferably falls within the range of 5 to 60 nm, and may be 30 to 60 nm, for example. The end face of the main pole 15 has a side that is adjacent to the first gap layer 19, and the side defines the track width.

The first return path section 40 includes magnetic layers 41, 42, 43, and 44. The magnetic layer 41 is disposed on the main pole 15 at a position away from the medium facing surface 100.

The first portion 20 of the coil includes a first layer 21 and a second layer 22. As shown in FIG. 5, the first layer 21 is wound one turn around the magnetic layer 41. The magnetic head further includes an insulating film 61 made of an insulating material and interposed between the first layer 21 and each of the first shield 16A, the first gap layer 19 and the magnetic layer 41, and a second nonmagnetic layer (not shown) made of a nonmagnetic material and disposed around the first layer 21 and the first shield 16A. The insulating film 61 is made of alumina, for example. The second nonmagnetic layer is made of an inorganic insulating material, for example. The inorganic insulating material is alumina or silicon oxide, for example. The top surfaces of the first shield 16A, the first layer 21, the magnetic layer 41, the insulating film 61, and the second nonmagnetic layer are even with each other.

The magnetic head further includes an insulating layer 62 made of an insulating material and disposed over the top surfaces of the first layer 21 and the insulating film 61 and part of the top surface of the magnetic layer 41. The insulating layer 62 is made of alumina, for example.

The magnetic layer 42 is disposed over the first shield 16A and the insulating layer 62. The magnetic layer 43 is disposed on the magnetic layer 41. The magnetic layer 42 has a front end face located in the medium facing surface 100, a top surface extending in a direction substantially perpendicular to the medium facing surface 100, and first and second connecting surfaces that connect the front end face and the top surface to each other. In the magnetic layer 42, an end of the first connecting surface is located in the medium facing surface 100, the other end of the first connecting surface is connected to an end of the second connecting surface, and the other end of the second connecting surface is connected to the top surface. The distance from the top surface 1a of the substrate 1 to an arbitrary point on the first connecting surface increases with increasing distance from the arbitrary point to the medium facing surface 100. The second connecting surface is parallel to the medium facing surface 100.

As shown in FIG. 6, the second layer 22 is wound approximately two turns around the magnetic layer 43. The magnetic head further includes an insulating film 64 made of an insulating material and interposed between the second layer 22 and each of the magnetic layers 42 and 43 and the insulating layer 62, an insulating layer 65 made of an insulating material and disposed in the space between adjacent turns of the second layer 22, and an insulating layer 66 made of an insulating material and disposed around the second layer 22 and the magnetic layer 42. The top surfaces of the second layer 22, the magnetic layers 42 and 43, the insulating film 64, and the insulating layers 65 and 66 are even with each other. The magnetic head further includes an insulating layer 67 made of an insulating material and disposed over the top surfaces of the second layer 22 and the insulating film 64. The insulating film 64 and the insulating layers 66 and 67 are made of alumina, for example. The insulating layer 65 is made of photoresist, for example.

The magnetic layer 44 is disposed over the magnetic layers 42 and 43 and the insulating layer 67, and connects the magnetic layer 42 and the magnetic layer 43 to each other. The magnetic layer 44 has an end face facing toward the medium facing surface 100. This end face is located at a distance from the medium facing surface 100. The magnetic head further includes an insulating layer 68 made of an insulating material and disposed around the magnetic layer 44. The insulating layer 68 is made of alumina, for example. The top surfaces of the magnetic layer 44 and the insulating layer 68 are even with each other.

The magnetic head further includes a protective layer 70 made of a nonmagnetic material and disposed to cover the write head section 9. The protective layer 70 is made of, for example, an inorganic insulating material such as alumina.

As has been described, the magnetic head according to the present embodiment includes the medium facing surface 100, the read head section 8, and the write head section 9. The medium facing surface 100 faces the recording medium. The read head section 8 and the write head section 9 are stacked on the substrate 1. Relative to the write head section 9, the read head section 8 is disposed backward in the direction T of travel of the recording medium (i.e., disposed on the leading end side).

The read head section 8 includes: the MR element 5 serving as the read element; the first read shield layer 3 and the second read shield layer 7 for shielding the MR element 5, with their respective portions near the medium facing surface 100 opposed to each other with the MR element 5 therebetween; the first read shield gap film 4 disposed between the MR element 5 and the first read shield layer 3; and the second read shield gap film 6 disposed between the MR element 5 and the second read shield layer 7.

The write head section 9 includes the coil including the first portion 20 and the second portion 10, the main pole 15, the write shield 16, the gap part 17, the first return path section 40, and the second return path section 30. The write shield 16 includes the first shield 16A, the second shield 16B, and the two side shields 16C and 16D. The gap part 17 includes the second gap layer 18 and the first gap layer 19. The first return path section 40 and the second return path section 30 align along the direction perpendicular to the top surface 1a of the substrate 1 with the main pole 15 interposed therebetween.

The second return path section 30 includes the magnetic layers 31 to 36, and is located backward of the main pole 15 in the direction T of travel of the recording medium. As shown in FIG. 2, the second return path section 30 connects the write shield 16 and part of the main pole 15 away from the medium facing surface 100 to each other so that a second space S2 is defined by the main pole 15, the gap part 17 (the gap layer 18), the write shield 16, and the second return path section 30 (the magnetic layers 31 to 36).

The magnetic layers 32 and 34 magnetically couple the second shield 16B of the write shield 16 and the magnetic layer 31 to each other. In the present embodiment, the magnetic layer 34 is connected to the second shield 16B. The magnetic layer 32 magnetically couples the magnetic layer 34 and the magnetic layer 31 to each other. The magnetic layer 34 has an end face that is located in the medium facing surface 100 at a position backward of the second end face portion 16Ba of the second shield 16B in the direction T of travel of the recording medium. In the main cross section, the magnetic layer 31 is greater than the second shield 16B in length in a direction perpendicular to the medium facing surface 100. In the main cross section, the magnetic layers 32 and 34 are greater than the second shield 16B and smaller than the magnetic layer 31 in length in the direction perpendicular to the medium facing surface 100.

Neither of the magnetic layers 31 and 32 is exposed in the medium facing surface 100. Each of the magnetic layers 31 and 32 has an end face facing toward the medium facing surface 100 and located at a distance from the medium facing surface 100. Part of the insulating layer 51 is interposed between the medium facing surface 100 and the aforementioned end face of the magnetic layer 31. Part of the insulating layer 54 is interposed between the medium facing surface 100 and the aforementioned end face of the magnetic layer 32.

The first return path section 40 includes the magnetic layers 41 to 44, and is located forward of the main pole 15 in the direction T of travel of the recording medium. The first return path section 40 connects the write shield 16 and part of the main pole 15 away from the medium facing surface 100 to each other so that a first space S1 is defined by the main pole 15, the gap part 17 (the gap layer 19), the write shield 16, and the first return path section 40 (the magnetic layers 41 to 44).

The magnetic layer 42 magnetically couples the first shield 16A of the write shield 16 and the magnetic layer 44 to each other. The magnetic layer 42 has the front end face located in the medium facing surface 100 at a position forward of the first end face portion 16Aa of the first shield 16A in the direction T of travel of the recording medium. The magnetic layer 42 further has the top surface, and the first and second connecting surfaces that connect the front end face and the top surface to each other. Part of the insulating layer 66 is interposed between the medium facing surface 100 and the first and second connecting surfaces of the magnetic layer 42. In the main cross section, the magnetic layer 44 is greater than the first shield 16A in length in the direction perpendicular to the medium facing surface 100. In the main cross section, the magnetic layer 42 is greater than the first shield 16A and smaller than the magnetic layer 44 in length in the direction perpendicular to the medium facing surface 100.

The magnetic layer 44 is not exposed in the medium facing surface 100. The magnetic layer 44 has an end face facing toward the medium facing surface 100 and located at a distance from the medium facing surface 100. Part of the insulating layer 68 is interposed between the medium facing surface 100 and the aforementioned end face of the magnetic layer 44.

The first portion 20 and the second portion 10 of the coil will now be described in detail with reference to FIG. 4 to FIG. 6. FIG. 4 is a plan view showing the second portion 10. The second portion 10 is wound approximately three turns around the magnetic layer 33 which constitutes part of the second return path section 30. The second portion 10 includes three coil elements 10A, 10B, and 10C extending to pass between the magnetic layer 32 and the magnetic layer 33, in particular, within the second space S2. Note that the coil elements refer to part of the coil winding. The coil elements 10A, 10B, and 10C align in this order in the direction perpendicular to the medium facing surface 100, the coil element 10A being closest to the medium facing surface 100. The second portion 10 has a coil connection part 10E electrically connected to the first portion 20.

FIG. 5 is a plan view showing the first layer 21 of the first portion 20. The first layer 21 is wound one turn around the magnetic layer 41 which constitutes part of the first return path section 40. The first layer 21 includes a coil element 21A extending to pass between the first shield 16A and the magnetic layer 41, in particular, within the first space S1. The first layer 21 has a coil connection part 21S electrically connected to the coil connection part 10E of the second portion 10, and a coil connection part 21E electrically connected to the second layer 22. The coil connection part 21S is electrically connected to the coil connection part 10E via first to third connection layers of columnar shape (not shown) that penetrate a plurality of layers interposed between the first layer 21 and the second portion 10. The first to third connection layers are stacked in this order on the coil connection part 10E. The coil connection part 21S is disposed on the third connection layer. The first to third connection layers are made of a conductive material such as copper.

FIG. 6 is a plan view showing the second layer 22 of the first portion 20. The second layer 22 is wound approximately two turns around the magnetic layer 43 which constitutes part of the first return path section 40. The second layer 22 includes two coil elements 22A and 22B extending to pass between the magnetic layer 42 and the magnetic layer 43, in particular, within the first space S1. The coil elements 22A and 22B align in this order in the direction perpendicular to the medium facing surface 100, the coil element 22A being closer to the medium facing surface 100. The second layer 22 has a coil connection part 22S penetrating the insulating layer 62 and electrically connected to the coil connection part 21E of the first layer 21. In the example shown in FIG. 4 to FIG. 6, the first portion 20 and the second portion 10 are connected in series.

The coil elements 21A, 22A, and 22B extend to pass through the first space S1. Hereinafter, the coil elements extending to pass through the first space S1 will also be referred to as the first coil elements, and the coil elements extending to pass through the second space S2 will also be referred to as the second coil elements.

The shape of the main pole 15 will now be described in detail with reference to FIG. 1 and FIG. 4 to FIG. 6. As shown in FIG. 4 to FIG. 6, the main pole 15 includes a track width defining portion 15A and a wide portion 15B. The track width defining portion 15A has an end face located in the medium facing surface 100, and an end opposite to the end face. The wide portion 15B is connected to the end of the track width defining portion 15A. As shown in FIG. 1, the main pole 15 has: the top surface 15T which is the surface located at the forward end in the direction T of travel of the recording medium; the bottom end 15L opposite to the top surface 15T; the first side part; and the second side part. The width of the top surface 15T in the track width direction TW is greater in the wide portion 15B than in the track width defining portion 15A.

In the track width defining portion 15A, the width of the top surface 15T in the track width direction TW is generally constant regardless of the distance from the medium facing surface 100. In the wide portion 15B, the width of the top surface 15T in the track width direction TW is, for example, equal to that in the track width defining portion 15A when seen at the boundary between the track width defining portion 15A and the wide portion 15B, and gradually increases with increasing distance from the medium facing surface 100, then becoming constant. Here, the length of the track width defining portion 15A in the direction perpendicular to the medium facing surface 100 will be referred to as the neck height. The neck height falls within the range of 0 to 0.3 µm, for example. A zero neck height means that no track width defining portion 15A exists and an end face of the wide portion 15B is thus located in the medium facing surface 100.

At least one of the top surface 15T and the bottom end 15L of the main pole 15 includes a first, a second, a third, and a fourth portion that are contiguously arranged in this order of increasing distance from the medium facing surface 100. In the present embodiment, in particular, both of the top surface 15T and the bottom end 15L include the aforementioned first to fourth portions. The first portion, the second portion, the third portion, and the fourth portion of the top surface 15T will hereinafter be represented by the symbols 15T1, 15T2, 15T3, and 15T4, respectively. The first portion, the second portion, the third portion, and the fourth portion of the bottom end 15L will hereinafter be represented by the symbols 15L1, 15L2, 15L3, and 15L4, respectively.

The first portion 15T1 of the top surface 15T has a first end located in the medium facing surface 100 and a second end opposite to the first end. The second portion 15T2 is connected to the second end of the first portion 15T1. The third portion 15T3 has a third end connected to the second portion 15T2 and a fourth end that is located farther from the medium facing surface 100 than is the third end. The fourth portion 15T4 is connected to the fourth end of the third portion 15T3.

The first portion 15L1 of the bottom end 15L has a first end located in the medium facing surface 100 and a second end opposite to the first end. The second portion 15L2 is connected to the second end of the first portion 15L1. The third portion 15L3 has a third end connected to the second portion 15L2 and a fourth end that is located farther from the medium facing surface 100 than is the third end. Each of the first to third portions 15L1 to 15L3 may be an edge formed by two intersecting planes, or may be a plane connecting two planes to each other. The fourth portion 15L4 is a plane connected to the fourth end of the third portion 15L3.

The end face of the main pole 15 has an end located forward in the direction T of travel of the recording medium and an end located backward in the direction T of travel of the recording medium. The end of the end face of the main pole 15 located forward in the direction T of travel of the recording medium also serves as the first end of the first portion 15T1 of the top surface 15T. The end of the end face of the main pole 15 located backward in the direction T of travel of the recording medium also serves as the first end of the first portion 15L1 of the bottom end 15L. Here, as shown in FIG. 1, assume a first virtual plane P1 and a second virtual plane P2. The first virtual plane P1 passes through the end of the end face of the main pole 15 located forward in the direction T of travel of the recording medium (the first end of the first portion 15T1 of the top surface 15T) and is perpendicular to the medium facing surface 100 and to the direction T of travel of the recording medium. The second virtual plane P2 passes through the end of the end face of the main pole 15 located backward in the direction T of travel of the recording medium (the first end of the first portion 15L1 of the bottom end 15L) and is perpendicular to the medium facing surface 100 and to the direction T of travel of the recording medium.

The first portion 15T1 of the top surface 15T is inclined relative to the first and second virtual planes P1 and P2 and the medium facing surface 100 such that the second end of the first portion 15T1 is located farther from the first and second virtual planes P1 and P2 than is the first end of the first portion 15T1. In other words, the first portion 15T1 is inclined such that the second end of the first portion 15T1 is located forward of the first end of the first portion 15T1 in the direction T of travel of the recording medium. The second and fourth portions 15T2 and 15T4 are substantially parallel to the first and second virtual planes P1 and P2. The third portion 15T3 is inclined relative to the first and second virtual planes P1 and P2 and the medium facing surface 100 such that the fourth end of the third portion 15T3 is located farther from the first and second virtual planes P1 and P2 than is the third end of the third portion 15T3. In other words, the third portion 15T3 is inclined such that the fourth end of the third portion 15T3 is located forward of the third end of the third portion 15T3 in the direction T of travel of the recording medium.

The first portion 15L1 of the bottom end 15L is inclined relative to the first and second virtual planes P1 and P2 and the medium facing surface 100 such that the second end of the first portion 15L1 is located farther from the first and second virtual planes P1 and P2 than is the first end of the first portion 15L1. In other words, the first portion 15L1 is inclined such that the second end of the first portion 15L1 is located backward of the first end of the first portion 15L1 in the direction T of travel of the recording medium. The second and fourth portions 15L2 and 15L4 are substantially parallel to the first and second virtual planes P1 and P2. The third portion 15L3 is inclined relative to the first and second virtual planes P1 and P2 and the medium facing surface 100 such that the fourth end of the third portion 15L3 is located farther from the first and second virtual planes P1 and P2 than is the third end of the third portion 15L3. In other words, the third portion 15L3 is inclined such that the fourth end of the third portion 15L3 is located backward of the third end of the third portion 15L3 in the direction T of travel of the recording medium.

The first shield 16A of the write shield 16 includes a portion interposed between the third portion 15T3 of the top surface 15T and the medium facing surface 100. As described previously, the first shield 16A has the first slope 16Ab serving as the bottom surface. The first slope 16Ab includes a portion that is opposed to the first portion 15T1 of the top surface 15T with the first gap layer 19 of the gap part 17 therebetween. The first slope 16Ab is inclined relative to the first and second virtual planes P1 and P2 and the medium facing surface 100.

The second shield 16B of the write shield 16 includes a portion interposed between the third portion 15L3 of the bottom end 15L and the medium facing surface 100. The second shield 16B has the top surface including the second slope 16Bb. The second slope 16Bb is inclined relative to the first and second virtual planes P1 and P2 and the medium facing surface 100. The top surface of the second shield 16B may further include a flat portion that is contiguous with the second slope 16Bb and is located farther from the medium facing surface 100 than is the second slope 16Bb. The flat portion is substantially parallel to the first and second virtual planes P1 and P2.

The top surface of the nonmagnetic layer 57 includes the flat portion UL1, the slope UL2, and the bottom portion UL3. The flat portion UL1 and the bottom portion UL3 are substantially parallel to the first and second virtual planes P1 and P2. The slope UL2 is inclined relative to the first and second virtual planes P1 and P2 and the medium facing surface 100. The first portion 15L1 is opposed to the second slope 16Bb with the second gap layer 18 of the gap part 17 interposed therebetween. The second portion 15L2 is opposed to the flat portion UL1 with the second gap layer 18 interposed therebetween. The third portion 15L3 is opposed to the slope UL2 with the second gap layer 18 interposed therebetween. The fourth portion 15L4 is opposed to the bottom portion UL3 with the second gap layer 18 interposed therebetween.

Here, as shown in FIG. 1, the length of the first portion 15T1 of the top surface 15T in the direction perpendicular to the medium facing surface 100 will be represented by the symbol $L_{A1}$, the length of the first portion 15L1 of the bottom end 15L in the direction perpendicular to the medium facing surface 100 will be represented by the symbol $L_{B1}$, and the length of the first slope 16Ab in the direction perpendicular to the medium facing surface 100 will be represented by the symbol $L_C$. In the present embodiment, the length $L_{A1}$ is smaller than the lengths $L_{B1}$ and $L_C$. The length $L_{A1}$ falls within the range of 0.05 to 0.15 µm, for example. The length $L_{B1}$ falls within the range of 0.1 to 0.5 µm, for example. The length $L_C$ falls within the range of 0.2 to 0.6 µm, for example.

As shown in FIG. 1, the length of the second portion 15T2 of the top surface 15T in the direction perpendicular to the medium facing surface 100 will be represented by the symbol $L_{A2}$, and the length of the second portion 15L2 of the bottom end 15L in the direction perpendicular to the medium facing surface 100 will be represented by the symbol $L_{B2}$. The length $L_{A2}$ falls within the range of 0.2 to 0.6 µm, for example. The length $L_{B2}$ falls within the range of 0.2 to 0.6 µm, for example.

Note that FIG. 1 is illustrated such that the distance from the medium facing surface 100 to the boundary between the second portion 15T2 and the third portion 15T3 of the top surface 15T (which is the same as the sum of the length $L_{A1}$ and the length $L_{A2}$) is equal to the distance from the medium facing surface 100 to the boundary between the second portion 15L2 and the third portion 15L3 of the bottom end 15L (which is the same as the sum of the length $L_{B1}$ and the length $L_{B2}$). However, these distances may be different from each other. FIG. 1 is also illustrated such that the distance from the medium facing surface 100 to the boundary between the third portion 15T3 and the fourth portion 15T4 of the top surface 15T is equal to the distance from the medium facing surface 100 to the boundary between the third portion 15L3 and the fourth portion 15L4 of the bottom end 15L. However, these distances may be different from each other. Note that the neck height can be set to any value independently of the lengths $L_{A1}$ and $L_{B1}$ and the distances mentioned above.

As shown in FIG. 1, the angle of inclination of the first portion 15T1 of the top surface 15T relative to the first virtual plane P1 will be represented by the symbol $\theta_{T1}$, and the angle of inclination of the first portion 15L1 of the bottom end 15L relative to the second virtual plane P2 will be represented by the symbol $\theta_{L1}$. The angle of inclination $\theta_{T1}$ falls within the range of 22° to 35°, for example. The angle of inclination $\theta_{L1}$ falls within the range of 30° to 50°, for example.

As shown in FIG. 1, assume also a virtual plane P3 and a virtual plane P4. The virtual plane P3 passes through the third end of the third portion 15T3 of the top surface 15T and is parallel to the first and second virtual planes P1 and P2. The virtual plane P4 passes through the third end of the third portion 15L3 of the bottom end 15L and is parallel to the first and second virtual planes P1 and P2. The angle of inclination of the third portion 15T3 relative to the virtual plane P3 will be represented by the symbol $\theta_{T3}$, and the angle of inclination of the third portion 15L3 relative to the virtual plane P4 will be represented by the symbol $\theta_{L3}$. The angles of inclination $\theta_{T3}$ and $\theta_{L3}$ both fall within the range of 22° to 60°, for example.

The second and fourth portions 15T2 and 15T4 of the top surface 15T and the second and fourth portions 15L2 and 15L4 of the bottom end 15L are substantially parallel to the first and second virtual planes P1 and P2. As shown in FIG. 1, the thickness of the main pole 15 in the medium facing surface 100, i.e., the distance between the first virtual plane P1 and the second virtual plane P2, will be represented by the symbol D0. The distance between the second portion 15T2 of the top surface 15T and the first virtual plane P1 will be represented by the symbol D1. The distance between the second portion 15L2 of the bottom end 15L and the second virtual plane P2 will be represented by the symbol D2. In the present embodiment, the distance D2 is greater than the distance D1. The distance D0 falls within the range of 0.05 to 0.1 µm, for example. The distance D1 falls within the range of 0.02 to 0.1 µm, for example. The distance D2 falls within the range of 0.1 to 0.5 µm, for example.

The distance between the fourth portion 15T4 of the top surface 15T and the virtual plane P3 will be represented by the symbol D3. The distance between the fourth portion 15L4 of the bottom end 15L and the virtual plane P4 will be represented by the symbol D4. The distances D3 and D4 both fall within the range of 0.1 to 0.5 µm, for example.

The end face of the main pole 15 located in the medium facing surface 100 has a first side adjacent to the first gap layer 19, a second side connected to a first end of the first side, and a third side connected to a second end of the first side. The first side also serves as the end of the end face of the main pole 15 located forward in the direction T of travel of the recording medium, and also serves as the first end of the first portion 15T1 of the top surface 15T. The first side defines the track width. The position of an end of a record bit to be recorded on the recording medium depends on the position of the first side. The end face of the main pole 15 located in the medium facing surface 100 decreases in width in the track width direction TW with increasing distance from the first side, that is, with increasing distance from the first virtual plane P1. Each of the second side and the third side forms an angle of, for example, 7° to 17°, or preferably 10° to 15°, relative to a direction perpendicular to the first virtual plane P1. The first side has a length in the range of 0.05 to 0.20 for example.

The function and effects of the magnetic head according to the present embodiment will now be described. The magnetic head writes data on the recording medium by using the write head section 9 and reads data stored on the recording medium by using the read head section 8. In the write head section 9, the coil including the first portion 20 and the second portion 10 produces magnetic fields corresponding to data to be written on the recording medium. A magnetic flux corresponding to the magnetic field produced by the first portion 20 passes through the first return path section 40 and the main pole 15. A magnetic flux corresponding to the magnetic field produced by the second portion 10 passes through the second return path section 30 and the main pole 15. Consequently, the main pole 15 allows the magnetic flux corresponding to the magnetic field produced by the first portion 20 and the magnetic flux corresponding to the magnetic field produced by the second portion 10 to pass.

The first portion 20 and the second portion 10 may be connected in series or in parallel. In either case, the first portion 20 and the second portion 10 are connected such that the magnetic flux corresponding to the magnetic field produced by the first portion 20 and the magnetic flux corresponding to the magnetic field produced by the second portion 10 flow in the same direction through the main pole 15.

The main pole 15 allows the magnetic fluxes corresponding to the magnetic fields produced by the coil to pass as mentioned above, and produces a write magnetic field for writing data on the recording medium by means of the perpendicular magnetic recording system.

The write shield 16 captures a disturbance magnetic field applied to the magnetic head from the outside thereof. This makes it possible to prevent erroneous writing on the recording medium induced by the disturbance magnetic field intensively captured into the main pole 15. The write shield 16 also functions to capture a magnetic flux that is produced from the end face of the main pole 15 and spreads in directions other than the direction perpendicular to the plane of the recording medium, and to thereby prevent the magnetic flux from reaching the recording medium.

Furthermore, the write shield 16, the first return path section 40, and the second return path section 30 function to allow a magnetic flux that has been produced from the end face of the main pole 15 and has magnetized the recording medium to flow back. More specifically, a part of the magnetic flux that has been produced from the end face of the main pole 15 and has magnetized the recording medium flows back to the main pole 15 through the write shield 16 and the first return path section 40. Another part of the magnetic flux that has been produced from the end face of the main pole 15 and has magnetized the recording medium flows back to the main pole 15 through the write shield 16 and the second return path section 30.

The write shield 16 includes the first shield 16A, the second shield 16B, and the two side shields 16C and 16D. The present embodiment thus makes it possible that, in regions both backward and forward of the end face of the main pole 15 in the direction T of travel of the recording medium and regions on opposite sides of the end face of the main pole 15 in the track width direction TW, a magnetic flux that is produced from the end face of the main pole 15 and spreads in directions other than the direction perpendicular to the plane of the recording medium can be captured and thereby prevented from reaching the recording medium. Consequently, the present embodiment makes it possible to prevent adjacent track erasure induced by a skew. The first shield 16A and the second shield 16B contribute not only to the prevention of adjacent track erasure induced by a skew but also to an increase in the gradient of the write magnetic field. The side shields 16C and 16D greatly contribute to the prevention of adjacent track erasure, in particular. According to the present embodiment, such functions of the write shield 16 serve to increase the recording density.

Furthermore, as shown in FIG. 3, the present embodiment is configured so that in the medium facing surface 100, the distance between the first and second side parts of the main pole 15 in the track width direction TW, i.e., the width of the end face of the main pole 15, decreases with increasing distance from the first virtual plane P1. According to the present embodiment, this feature also serves to prevent adjacent track erasure induced by a skew.

The present embodiment is also configured so that in the medium facing surface 100, the distance between the first and second sidewalls of the side shields 16C and 16D in the track width direction TW decreases with increasing distance from the first virtual plane P1, as does the distance between the first and second side parts of the main pole 15. The present embodiment thus allows both the distance between the first side part and the first sidewall and the distance between the second side part and the second sidewall to be small and constant in the medium facing surface 100. This configuration allows the side shields 16C and 16D to efficiently capture the magnetic flux that is produced from the end face of the main pole 15 and spreads out to opposite areas in the track width direction TW. Consequently, according to the present embodiment, it is possible to enhance the function of the side shields 16C and 16D in particular, and to thereby enable more effective prevention of adjacent track erasure induced by a skew.

The write shield 16 cannot capture much magnetic flux if the write shield 16 is not magnetically connected with any magnetic layer having a sufficiently large volume enough to accommodate the magnetic flux captured by the write shield 16. In the present embodiment, there are provided the first return path section 40 (the magnetic layers 41 to 44) which magnetically couples the first shield 16A of the write shield 16 and the main pole 15 to each other, and the second return path section 30 (the magnetic layers 31 to 36) which magnetically couples the second shield 16B of the write shield 16 and the main pole 15 to each other. Such a configuration allows the magnetic flux captured by the write shield 16 to flow into the main pole 15 by way of the first return path section 40 and the second return path section 30. In the present embodiment, the first return path section 40, the second return path section 30 and the main pole 15, which are magnetic layers large in volume, are magnetically connected to the write shield 16. This allows the write shield 16 to capture much magnetic flux, so that the above-described effect of the write shield 16 can be exerted effectively.

Furthermore, in the present embodiment, the second shield 16B is provided in addition to the second return path section 30. In the main cross section, the magnetic layer 31, which is located farthest from the main pole 15 among the magnetic layers that constitute the second return path section 30, is greater than the second shield 16B in length in the direction perpendicular to the medium facing surface 100. The second portion 10 of the coil passes through the space S2. Such a structure is more advantageous than a structure where the magnetic layer 31 also serves as the second shield. More specifically, according to the present embodiment, it is possible to bring the second shield 16B and the main pole 15 into sufficiently close proximity to each other. This enhances the function of the second shield 16B.

Now, a description will be made as to the role of the magnetic layers 32 and 34. First, suppose a case where the magnetic layers 32 and 34 are not provided and thus the second shield 16B and the magnetic layer 31 are not magnetically coupled to each other. In this case, the magnetic flux that has been captured by the second shield 16B or the side shields 16C and 16D and directed downward cannot flow toward the magnetic layer 31, and thus returns so as to proceed upward. This causes the second shield 16B or the side shields 16C and 16D to produce upwardly and downwardly directed magnetic fluxes. As a result, part of the magnetic flux captured by the second shield 16B or the side shields 16C and 16D leaks out of the medium facing surface 100. This may cause adjacent track erasure. In contrast to this, if the second shield 16B and the magnetic layer 31 are magnetically coupled to each other by the magnetic layers 32 and 34, the magnetic flux captured by the side shields 16C and 16D is divided to flow upward and downward, and the magnetic flux captured by the second shield 16B is mainly directed downward. This can prevent the adjacent track erasure that may be caused by part of the magnetic flux captured by the second shield 16B or the side shields 16C and 16D being leaked out of the medium facing surface 100.

The above description relating to the magnetic layers 32 and 34 also applies to the magnetic layer 42. More specifically, if the first shield 16A and the magnetic layer 44 are magnetically coupled to each other by the magnetic layer 42, the magnetic flux captured by the side shields 16C and 16D is divided into an upward flux and a downward flux, and the magnetic flux captured by the first shield 16A flows mainly upward. This can prevent the adjacent track erasure that may be caused by part of the magnetic flux captured by the first shield 16A or the side shields 16C and 16D being leaked out of the medium facing surface 100.

If the second shield 16B is excessively long in the direction perpendicular to the medium facing surface 100 in the main cross section, flux leakage from the main pole 15 to the second shield 16B increases and the main pole 15 thus becomes unable to direct much magnetic flux to the medium facing surface 100. It is therefore necessary that the second shield 16B is not excessively long in the direction perpendicular to the medium facing surface 100 in the main cross section. In the main cross section, if the length of each of the magnetic layers 32 and 34 in the direction perpendicular to the medium facing surface 100 is equal to or smaller than that of the second shield 16B, the magnetic layers 32 and 34 cannot direct much magnetic flux from the second shield 16B to the magnetic layer 31. In the present embodiment, in contrast, the magnetic layers 32 and 34 are configured so that in the main cross section, the length of each of the magnetic layers 32 and 34 in the direction perpendicular to the medium facing surface 100 is greater than that of the second shield 16B and smaller than that of the magnetic layer 31. Consequently, the present embodiment allows the magnetic layers 32 and 34 to direct much magnetic flux from the second shield 16B to the magnetic layer 31.

Likewise, in the present embodiment, the magnetic layer 42 is configured so that in the main cross section, the length of the magnetic layer 42 in the direction perpendicular to the medium facing surface 100 is greater than that of the first shield 16A and smaller than that of the magnetic layer 44. Consequently, the present embodiment allows the magnetic layer 42 to direct much magnetic flux from the first shield 16A to the magnetic layer 44.

The magnetic layer 32 is disposed between the medium facing surface 100 and the second portion 10 of the coil. If the end face of the magnetic layer 32 is exposed over a large area in the medium facing surface 100, heat that is generated by the second portion 10 of the coil may cause the magnetic layer 32 to expand and thereby cause protrusion of the end face of the magnetic layer 32, which is part of the medium facing surface 100.

In the present embodiment, the insulating layer 54 which is harder than the magnetic layer 32 is provided between the magnetic layer 32 and the medium facing surface 100. The insulating layer 54 exists over a larger area than does the magnetic layer 32. The insulating layer 54 therefore functions to prevent changes in the position of the magnetic layer 32 induced by the heat generated by the second portion 10. Thus, the present embodiment makes it possible to prevent part of the medium facing surface 100 from protruding due to the heat generated by the second portion 10.

Now, a detailed description will be given of the features of the shape of the main pole 15 and the effects resulting therefrom. In the present embodiment, the top surface 15T of the main pole 15 includes the first and third portions 15T1 and 15T3 which are inclined relative to the first and second virtual planes P1 and P2 and the medium facing surface 100. According to the present embodiment, this makes it possible to reduce the thickness of the main pole 15 in the medium facing surface 100 and sufficiently increase the thickness of a portion of the main pole 15 that is located farther from the medium facing surface 100 than is the third portion 15T3. Furthermore, in the present embodiment, the bottom end 15L of the main pole 15 includes the first and third portions 15L1 and 15L3 which are inclined relative to the first and second virtual planes P1 and P2 and the medium facing surface 100. According to the present embodiment, this makes it possible to reduce the thickness of the main pole 15 in the medium facing surface 100 and sufficiently increase the thickness of a portion of the main pole 15 that is located farther from the medium facing surface 100 than is the third portion 15L3. According to the present embodiment, since the main pole 15 has a small thickness in the medium facing surface 100, it is possible to prevent adjacent track erasure induced by a skew. On the other hand, since a portion of the main pole 15 away from the medium facing surface 100 has a large thickness, it is possible for the main pole 15 to direct much magnetic flux to the medium facing surface 100, and this makes it possible to improve write characteristics such as the overwrite property.

The first shield 16A of the write shield 16 includes a portion interposed between the medium facing surface 100 and the third portion 15T3 of the top surface 15T. The second shield 16B of the write shield 16 includes a portion interposed between the medium facing surface 100 and the third portion 15L3 of the bottom end 15L. A smaller distance between the third portion 15T3 and the first shield 16A would increase magnetic flux leakage from the third portion 15T3 to the first shield 16A and thereby cause degradation of write characteristics. Likewise, a smaller distance between the third portion 15L3 and the second shield 16B would increase magnetic flux leakage from the third portion 15L3 to the second shield 16B and thereby cause degradation of write characteristics.

In the present embodiment, the top surface 15T of the main pole 15 includes the second portion 15T2. This makes the distance between the third portion 15T3 and the first shield 16A greater than that in the case where the second portion 15T2 is not provided. Likewise, the bottom end 15L of the main pole 15 includes the second portion 15L2. This makes the distance between the third portion 15L3 and the second shield 16B greater than that in the case where the second portion 15L2 is not provided. According to the present embodiment, these features serve to prevent write characteristics from being degraded by magnetic flux leakage from the main pole 15 to the write shield 16.

In the present embodiment, the top surface 15T is configured so that the second and fourth portions 15T2 and 15T4 are substantially parallel to the first and second virtual planes P1 and P2 while the third portion 15T3 is inclined relative to the first and second virtual planes P1 and P2 and the medium facing surface 100. Consequently, as compared with a case where the third portion 15T3 is perpendicular to the first and second virtual planes P1 and P2, the present embodiment makes it possible to increase the angles of two corners that are formed between the third portion 15T3 and the second and fourth portions 15T2 and 15T4 and thereby prevent magnetic flux leakage from these corners to the first shield 16A. Likewise, the bottom end 15L is configured so that the second and fourth portions 15L2 and 15L4 are substantially parallel to the first and second virtual planes P1 and P2 while the third portion 15L3 is inclined relative to the first and second virtual planes P1 and P2 and the medium facing surface 100. Consequently, as compared with a case where the third portion 15L3 is perpendicular to the first and second virtual planes P1 and P2, the present embodiment makes it possible to increase the angles of two corners that are formed between the third portion 15L3 and the second and fourth portions 15L2 and 15L4 and thereby prevent magnetic flux leakage from these corners to the second shield 16B.

According to the present embodiment, the above-described features of the shape of the main pole 15 make it possible to prevent the skew-induced problems and provide improved write characteristics.

The position of an end of the record bit to be recorded on the recording medium depends on the position of an end of the end face of the main pole 15 located in the medium facing surface 100, the end being located forward in the direction T of travel of the recording medium. Accordingly, in order to define the position of the end of the record bit accurately, it is particularly important for the first shield 16A, of the first and second shields 16A and 16B, to be capable of capturing as much magnetic flux as possible. In the present embodiment, the first shield 16A is greater in volume than the second shield 16B and is thus capable of capturing more magnetic flux than the second shield 16B.

Now, a detailed description will be given of the features of the relationship between the main pole 15 and the write shield 16 and the effects resulting therefrom. In the present embodiment, the length $L_{A1}$ of the first portion 15T1 in the direction perpendicular to the medium facing surface 100 is smaller than the length $L_C$ of the first slope 16Ab in the direction perpendicular to the medium facing surface 100. If the length $L_{A1}$ is equal to the length $L_C$ shown in FIG. 1, the first portion 15T1 and the first slope 16Ab are opposed to each other over a large area with a small spacing therebetween. This leads to a problem that a large amount of magnetic flux leaks from the main pole 15 to the first shield 16A, and causes degradation in write characteristics such as the overwrite property. To prevent this, the length Lc may be reduced to make the relationship between the lengths $L_{A1}$ and $L_C$ opposite to that shown in FIG. 1. This, however, reduces the volume of the first shield 16A of the write shield 16 which is located forward of the main pole 15 in the direction T of travel of the recording medium, and thereby compromises the function of the write shield. More specifically, a reduction in the volume of the first shield 16A is likely to cause magnetic flux saturation in the first shield 16A. This in turn leads to magnetic flux leakage from the first shield 16A to the medium facing surface 100, raising a problem that the magnetic flux leakage may result in accidental erasure of data stored on the recording medium.

In the present embodiment, the length $L_{A1}$ is made smaller than the length $L_C$ to allow the first portion 15T1 and the first slope 16Ab to be opposed to each other over a smaller area. This makes it possible to prevent magnetic flux leakage from the main pole 15 to the first shield 16A without compromising the function of the write shield 16. However, since this causes the distance D1 between the second portion 15T2 of the top surface 15T and the first virtual plane P1 to be small, the thickness of the main pole 15 in the medium facing surface 100 cannot be sufficiently reduced by the first portion 15T1.

To cope with this, in the present embodiment, the distance D2 between the second portion 15L2 of the bottom end 15L and the second virtual plane P2 is made greater than the distance D1 between the second portion 15T2 of the top surface 15T and the first virtual plane P1, and the length $L_{A1}$ of the first portion 15T1 of the top surface 15T is made smaller than the length $L_{B1}$ of the first portion 15L1 of the bottom end 15L. This makes it possible to reduce the thickness of the main pole 15 in the medium facing surface 100 and sufficiently increase the distance between the second portion 15T2 of the top surface 15T and the second portion 15L2 of the bottom end 15L while preventing magnetic flux leakage from the main pole 15 to the first shield 16A as described above.

According to the present embodiment, the above-described features of the relationship between the main pole 15 and the write shield 16 make it possible to prevent the skew-induced problems and provide improved write characteristics without compromising the function of the write shield 16 (the first shield 16A).

A method of manufacturing the magnetic head according to the present embodiment will now be described. In the method of manufacturing the magnetic head according to the present embodiment, first, as shown in FIG. 2 and FIG. 3, the insulating layer 2, the first read shield layer 3, and the first read shield gap film 4 are formed in this order on the substrate 1. Next, the MR element 5 and not-shown leads connected to the MR element 5 are formed on the first read shield gap film 4. The MR element 5 and the leads are then covered with the second read shield gap film 6. Then, the second read shield layer 7 and the nonmagnetic layer 50 are formed in this order on the second read shield gap film 6.

Next, the magnetic layer 31 is formed on the nonmagnetic layer 50 by frame plating, for example. Then, the insulating layer 51 is formed over the entire top surface of the stack. The insulating layer 51 is then polished by, for example, chemical mechanical polishing (hereinafter referred to as CMP), until the magnetic layer 31 is exposed. The top surfaces of the magnetic layer 31 and the insulating layer 51 are thereby made even with each other.

Next, the magnetic layers 32 and 33 are formed on the magnetic layer 31 by frame plating, for example. The insulating film 52 is then formed over the entire top surface of the stack. Where alumina is employed as the material of the insulating film 52, the insulating film 52 is formed by atomic layer deposition, for example. Next, the second portion 10 of the coil is formed by frame plating, for example. The insulating layer 53 is then formed in the space between adjacent turns of the second portion 10. The second portion 10 and the insulating layer 53 are formed such that their top surfaces are higher in level than the top surface of the portion of the insulating film 52 lying on the magnetic layers 32 and 33. Next, the insulating layer 54 is formed over the entire top surface of the stack. The second portion 10, the insulating film 52, and the insulating layers 53 and 54 are then polished by, for example, CMP, until the magnetic layers 32 and 33 are exposed. The top surfaces of the second portion 10, the magnetic layers 32 and 33, the insulating film 52, and the insulating layers 53 and 54 are thereby made even with each other.

Next, the insulating layer 55 is formed over the entire top surface of the stack. The insulating layer 55 is then selectively etched by, for example, ion beam etching (hereinafter referred to as IBE) so that the top surfaces of the magnetic layers 32 and 33, part of the top surface of the insulating layer 54, and the coil connection part 10E of the second portion 10 are exposed. Then, the magnetic layer 34 is formed over the magnetic layer 32 and the insulating layer 54, the magnetic layer 35 is formed on the magnetic layer 33, and a first connection layer (not shown) is formed on the coil connection part 10E of the second portion 10 by frame plating, for example. Next, the insulating layer 56 is formed over the entire top surface of the stack. The insulating layer 56 is then polished by, for example, CMP, until the magnetic layers 34 and 35 and the first connection layer are exposed. The top surfaces of the magnetic layers 32 and 33, the first connection layer, and the insulating layer 56 are thereby made even with each other.

Reference is now made to FIG. 7A through FIG. 18B to describe a series of steps to be performed after the aforementioned step up to the step of forming the first layer 21 of the first portion 20 of the coil. FIG. 7A through FIG. 18B each show a stack of layers in the process of manufacturing the magnetic head. FIG. 7A to FIG. 18A each show a cross section perpendicular to the medium facing surface 100 and the top surface 1a of the substrate 1, or the main cross section, in particular. FIG. 7B to FIG. 18B each show a cross section of the stack taken at the position where the medium facing surface 100 is to be formed. The parts that are closer to the substrate 1 than is the second read shield layer 7 are not shown in FIG. 7A through FIG. 18B. The symbol "ABS" in FIG. 7A to FIG. 18A indicates the position where the medium facing surface 100 is to be formed.

Figure 7A:
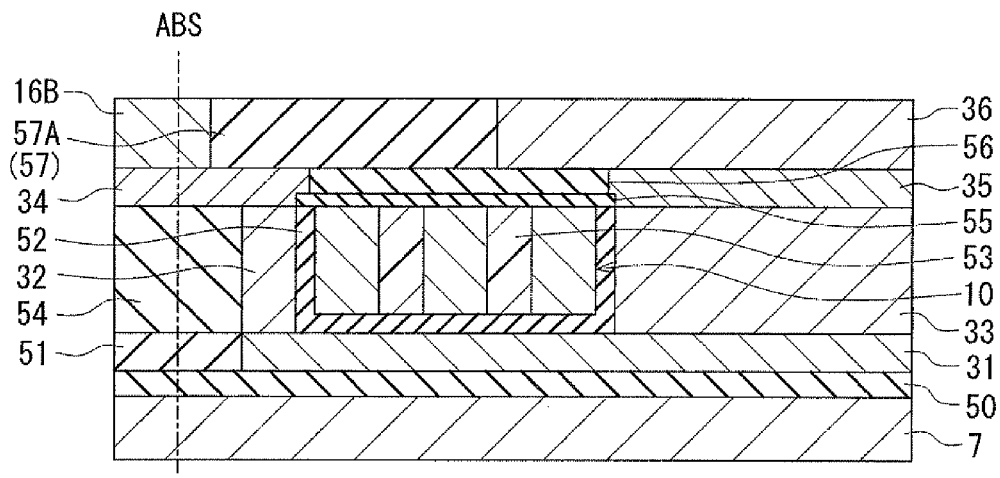
FIG. 7A and FIG. 7B are cross-sectional views showing a step of a method of manufacturing the magnetic head according to the first embodiment of the invention.
Figure 7B:
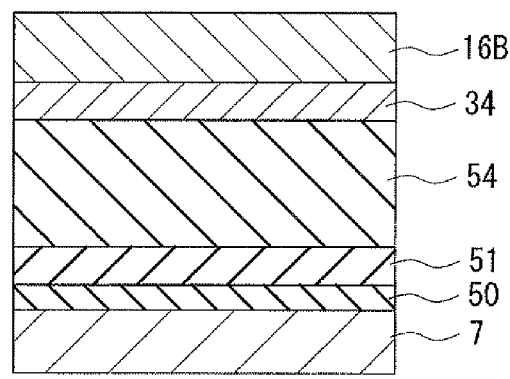

In the step shown in FIG. 7A and FIG. 7B, first, the second shield 16B is formed on the magnetic layer 34, the magnetic layer 36 is formed over the magnetic layer 35 and the insulating layer 56, and a second connection layer (not shown) is formed on the first connection layer by frame plating, for example. The second shield 16B has an initial top surface including a portion that is to be etched later into the second slope 16Bb. Next, the nonmagnetic layer 57 is formed over the entire top surface of the stack. The nonmagnetic layer 57 is then polished by, for example, CMP, until the second shield 16B, the magnetic layer 36, and the second connection layer are exposed. The initial top surface of the second shield 16B and top surfaces of the magnetic layer 36, the second connection layer and the nonmagnetic layer 57 are thereby made even with each other. The nonmagnetic layer 57 after being polished includes a portion to be etched 57A that is located in a region between the second shield 16B and the magnetic layer 36.

Figure 8A:
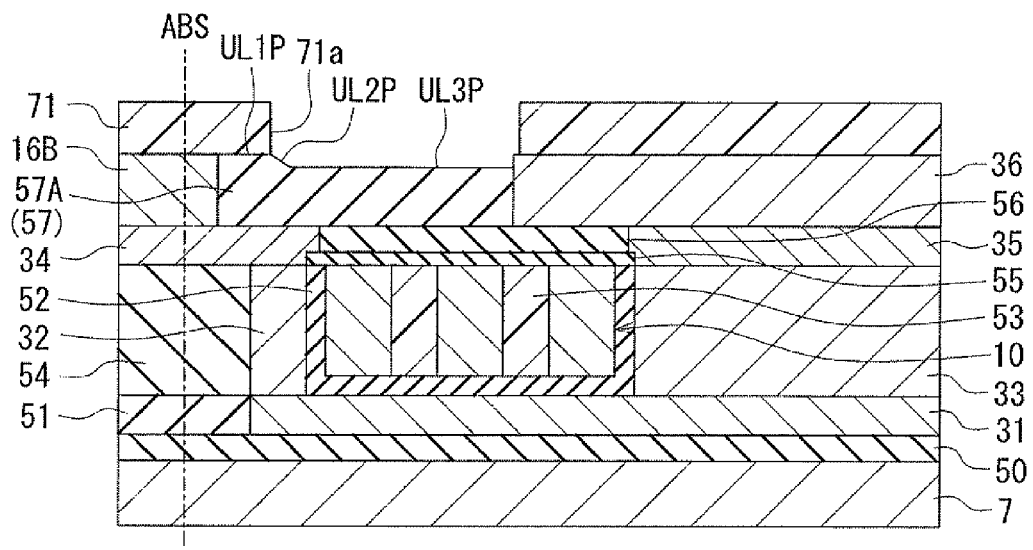
FIG. 8A and FIG. 8B are cross-sectional views showing a step that follows the step shown in FIG. 7A and FIG. 7B.
Figure 8B:
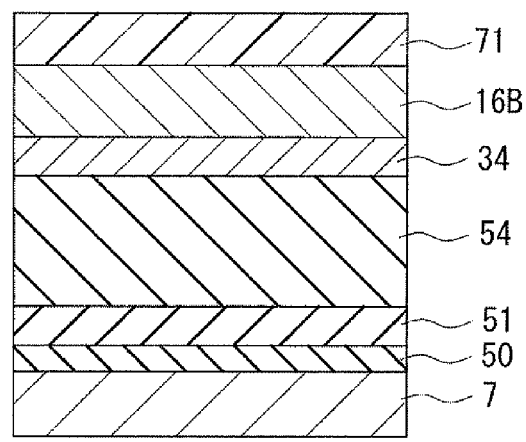

FIG. 8A and FIG. 8B show the next step. In this step, first, a mask 71 is formed over the second shield 16B, the magnetic layer 36, the second connection layer, and the nonmagnetic layer 57. The mask 71 is formed by patterning a photoresist layer. The mask 71 has an opening 71a for exposing the top surface of the portion to be etched 57A except a part thereof located in the vicinity of the boundary between the second shield 16B and the portion to be etched 57A. As shown in FIG. 8A, the mask 71 does not cover a part of the magnetic layer 36 located in the vicinity of the boundary between the magnetic layer 36 and the portion to be etched 57A.

Next, the portion to be etched 57A is taper-etched by, for example, reactive ion etching (hereinafter referred to as RIE), using the mask 71 and the magnetic layer 36 as an etching mask. This step will be referred to as the first etching step. The mask 71 is then removed.

As shown in FIG. 8A, the taper-etching of the portion to be etched 57A provides the portion 57A with an initial slope UL2P and an initial bottom portion UL3P. The initial slope UL2P and the initial bottom portion UL3P are formed in this order so as to be contiguous with a portion of the top surface of the portion to be etched 57A as originally formed, the portion remaining after this etching. The remaining portion of the top surface of the portion to be etched 57A as originally formed will hereinafter be referred to as the initial top surface and represented by the symbol UL1P. The first etching step proceeds until the initial bottom portion UL3P reaches a level between the top and bottom surfaces of the portion to be etched 57A as originally formed.

Where the portion to be etched 57A (the nonmagnetic layer 57) is formed of alumina, an etching gas containing $BCl_3$, $Cl_2$ and $CF_4$, for example, is used for RIE to taper-etch the portion to be etched 57A in the first etching step. $BCl_3$ and $Cl_2$ are main components that contribute to the etching of the portion to be etched 57A. $CF_4$ is a gas for forming, during the etching of the portion to be etched 57A, a sidewall-protecting film on the sidewall of the groove formed by the etching. The etching gas containing $CF_4$ serves to form the sidewall-protecting film on the sidewall of the groove during the etching of the portion to be etched 57A, thereby serving to make the initial slope UL2P inclined relative to the direction perpendicular to the medium facing surface 100 to be formed later.

Figure 9A:
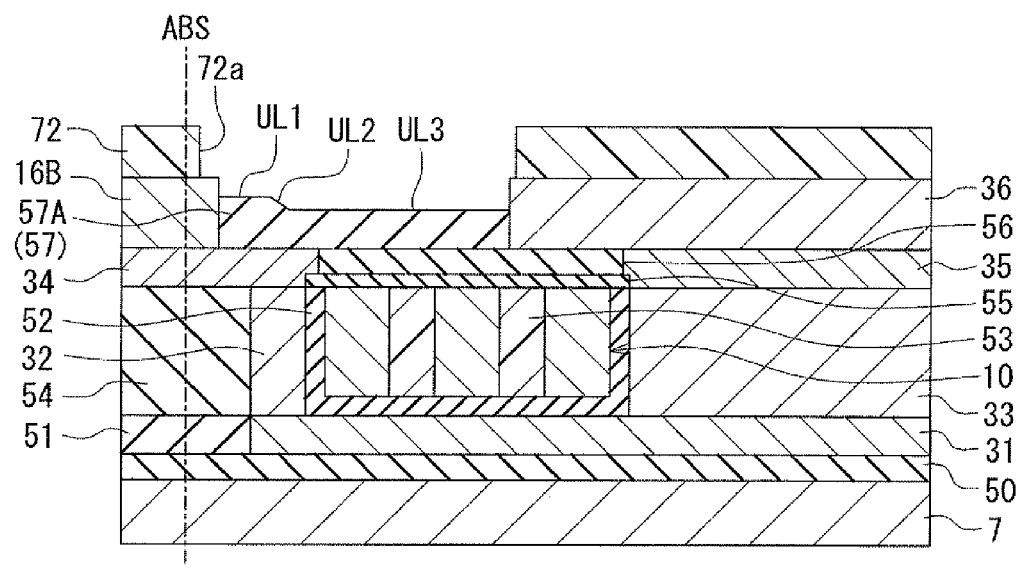
FIG. 9A and FIG. 9B are cross-sectional views showing a step that follows the step shown in FIG. 8A and FIG. 8B.
Figure 9B:
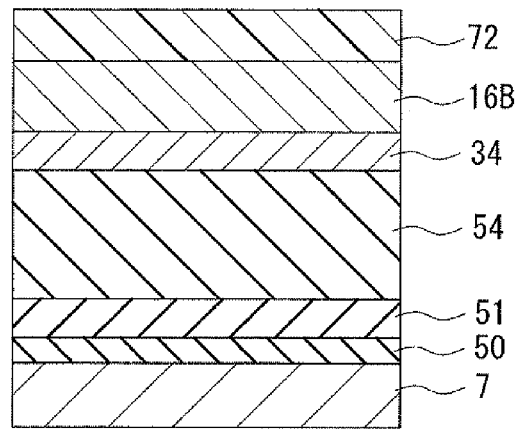

FIG. 9A and FIG. 9B show the next step. In this step, first, a mask 72 is formed over the second shield 16B, the magnetic layer 36, the second connection layer, and the nonmagnetic layer 57. The mask 72 is formed by patterning a photoresist layer. The mask 72 has an opening 72a for exposing the initial top surface UL1P, the initial slope UL2P, and the initial bottom portion UL3P of the portion to be etched 57A. As shown in FIG. 9A, the mask 72 does not cover a part of the second shield 16B located in the vicinity of the boundary between the second shield 16B and the portion to be etched 57A and a part of the magnetic layer 36 located in the vicinity of the boundary between the magnetic layer 36 and the portion to be etched 57A.

Next, the portion to be etched 57A is vertically etched by, for example, RIE, using the mask 72, the second shield 16B and the magnetic layer 36 as an etching mask. This step will be referred to as the second etching step. The mask 72 is then removed.

Where the portion to be etched 57A (the nonmagnetic layer 57) is formed of alumina, an etching gas containing $BCl_3$ and $Cl_2$, for example, is used for RIE to etch the portion to be etched 57A in the second etching step. In the second etching step, portions of the portion to be etched 57A lying under the initial top surface UL1P, the initial slope UL2P and the initial bottom portion UL3P are etched to form the flat portion UL1, the slope UL2, and the bottom portion UL3. The angle of inclination of the slope UL2 is equal or nearly equal to the angle of inclination $\theta_{L3}$ of the third portion 15L3 of the bottom end 15L of the main pole 15 to be formed later. The flat portion UL1 and the bottom portion UL3 extend in a direction substantially perpendicular to the medium facing surface 100 to be formed later.

Figure 10A:
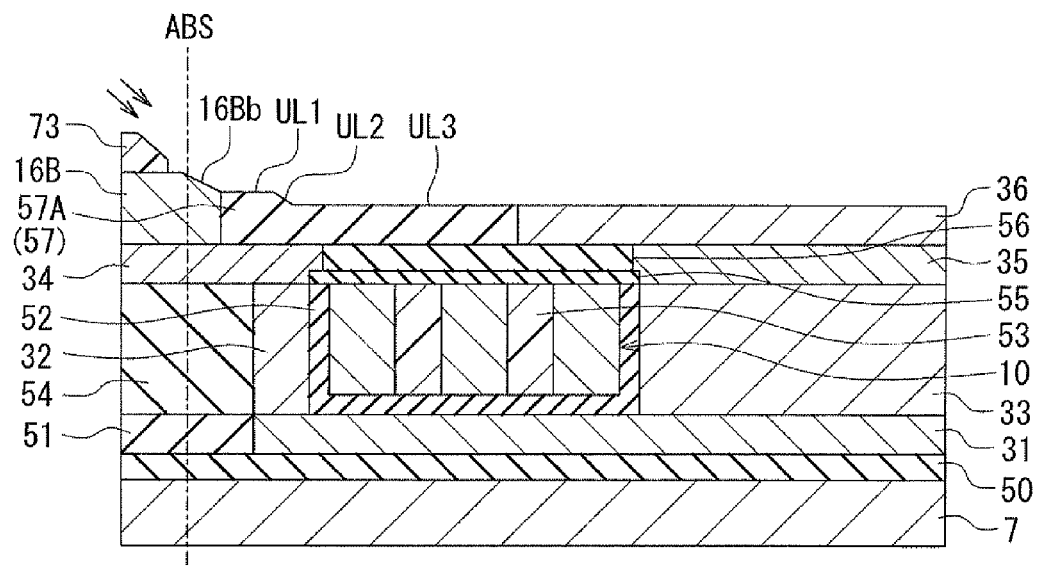
FIG. 10A and FIG. 10B are cross-sectional views showing a step that follows the step shown in FIG. 9A and FIG. 9B.
Figure 10B:
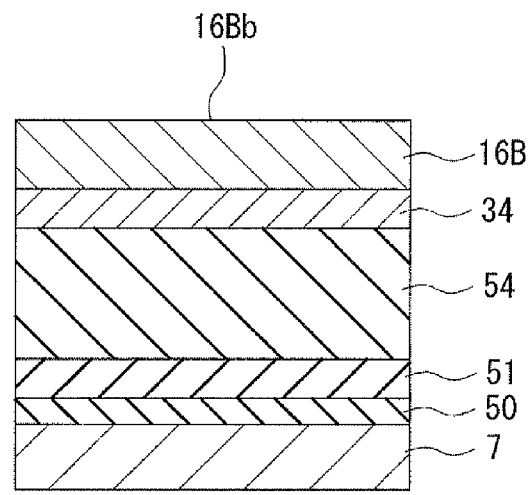

FIG. 10A and FIG. 10B show the next step. In this step, first, a mask 73 is formed on the second shield 16B. The mask 73 is formed by patterning a photoresist layer. The mask 73 does not cover the portion of the initial top surface of the second shield 16B that is to be etched later into the second slope 16Bb.

The portion of the initial top surface of the second shield 16B and the top surface of the magnetic layer 36 are then etched by using the mask 73 as the etching mask. This etching is performed to provide the second shield 16B with the second slope 16Bb as shown in FIG. 10A. This step will be referred to as the third etching step. The mask 73 is then removed.

In the third etching step, the initial top surface of the second shield 16B is etched by, for example, IBE with ion beams made to travel in a direction inclined relative to the direction perpendicular to the top surface 1a of the substrate 1. The arrows in FIG. 10A indicate the direction of travel of the ion beams. Performing IBE in such a manner makes the second slope 16Bb be inclined relative to the direction perpendicular to the medium facing surface 100 to be formed later. The angle of inclination of the second slope 16Bb is equal or nearly equal to the angle of inclination $\theta_{L1}$ of the first portion 15L1 of the bottom end 15L of the main pole 15 to be formed later.

A series of steps from the step shown in FIG. 8A and FIG. 8B to the step shown in FIG. 10A and FIG. 10B serve to determine the shape of the bottom end 15L of the main pole 15. As will be described later, the shapes of the first to fourth portions 15L1 to 15L4 of the bottom end 15L are defined by the second slope 16Bb, the flat portion UL1, the slope UL2, and the bottom portion UL3.

Figure 11A:
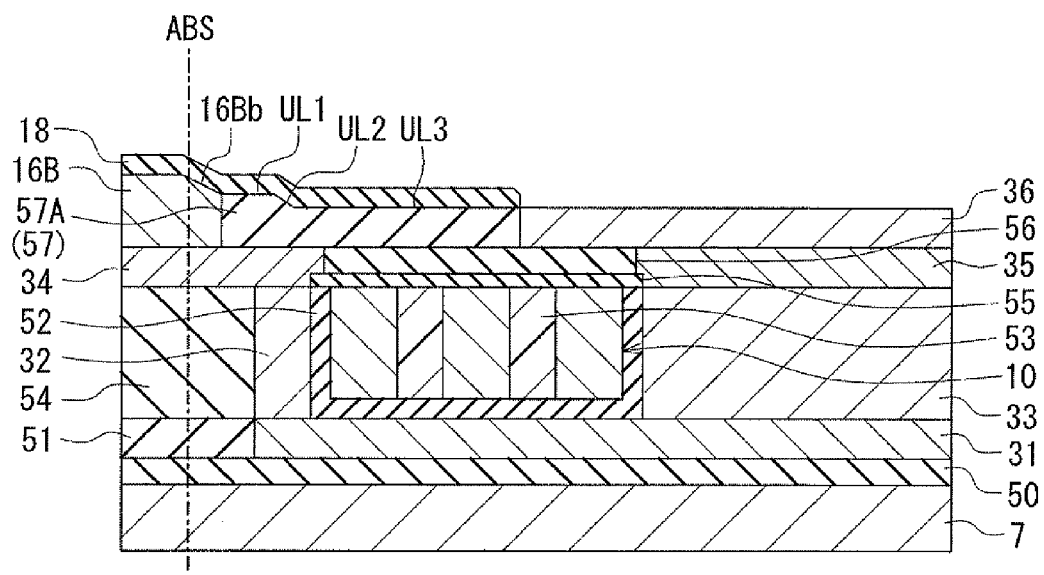
FIG. 11A and FIG. 11B are cross-sectional views showing a step that follows the step shown in FIG. 10A and FIG. 10B.
Figure 11B:
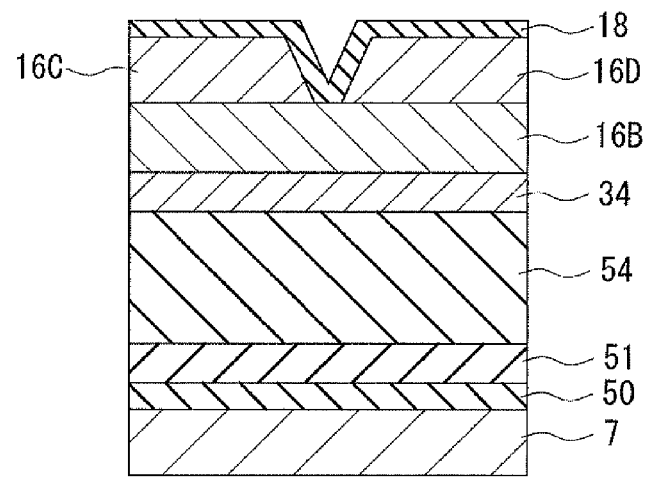

FIG. 11A and FIG. 11B show the next step. In this step, first, the side shields 16C and 16D are formed on the second shield 16B. Here, a method of forming the side shields 16C and 16D will be described by way of example. In the method, first, a photoresist layer made of a positive photoresist is patterned by photolithography to form a first resist layer on regions of the top surface of the second shield 16B where the side shields 16C and 16D are to be formed later. The first resist layer has two portions that have shapes corresponding to the shapes of the side shields 16C and 16D to be formed later. Next, a separating film made of a nonmagnetic material is formed to cover the first resist layer. The separating film is provided to prevent the first resist layer of a positive photoresist from being mixed with a photoresist layer of a negative photoresist to be formed later. Examples of materials suitable for the separating film include alumina and a synthetic resin.

Next, a second resist layer is formed on the separating film by patterning a photoresist layer of a negative photoresist by photolithography. The second resist layer is to later become a mold. The second resist layer has two openings that have shapes corresponding to the shapes of the side shields 16C and 16D to be formed later. Next, by performing wet etching, for example, the separating film is removed in the part thereof not covered by the second resist layer. The first and second resist layers are then exposed to light. Thereafter, the first resist layer is removed from the two openings of the second resist layer by using an alkaline developer, for example. When the first resist layer is removed or after the first resist layer has been removed, the separating film is removed in the part thereof extending along the wall faces of the two openings of the second resist layer. As a result of this step, the second resist layer becomes the mold which is formed in a region excluding the regions where the side shields 16C and 16D are to be formed later. Next, the side shields 16C and 16D are formed on the top surface of the second shield 16B by performing plating without forming any seed layer. The side shields 16C and 16D are respectively formed in the two openings of the mold. The mold and the separating film are then removed.

FIG. 11B shows the side shields 16C and 16D thus formed. The side shields 16C and 16D have mutually opposing sidewalls in the vicinity of the position ABS where the medium facing surface 100 is to be formed. The top surface of the second shield 16B is exposed between the sidewalls of the side shields 16C and 16D.

In the step shown in FIG. 11A and FIG. 11B, the second gap layer 18 is then formed to cover the second shield 16B and the side shields 16C and 16D. Where alumina is employed as the material of the second gap layer 18, the second gap layer 18 is formed by atomic layer deposition, for example. Where Ru is employed as the material of the second gap layer 18, the second gap layer 18 is formed by chemical vapor deposition, for example. Although not shown, a seed layer is then formed over the entire top surface of the stack by sputtering or ion beam deposition, for example. The second gap layer 18 and the seed layer are then selectively etched to form therein openings for exposing the top surface of the magnetic layer 36 and openings for exposing the top surface of the second connection layer.

Figure 12A:
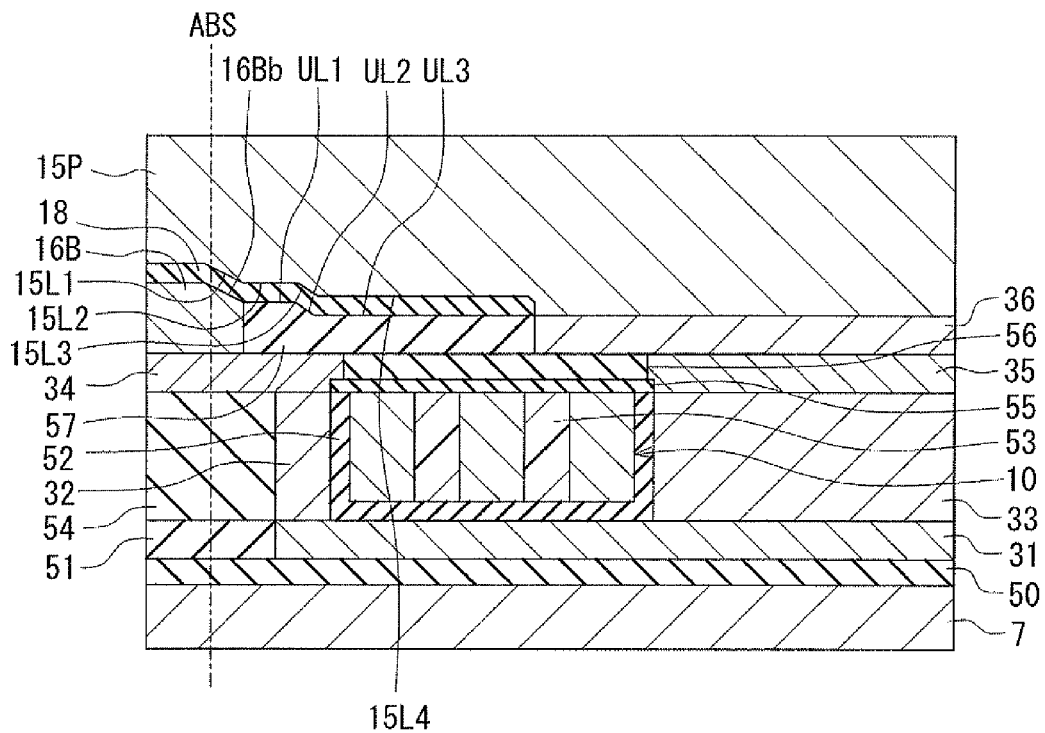
FIG. 12A and FIG. 12B are cross-sectional views showing a step that follows the step shown in FIG. 11A and FIG. 11B.
Figure 12B:
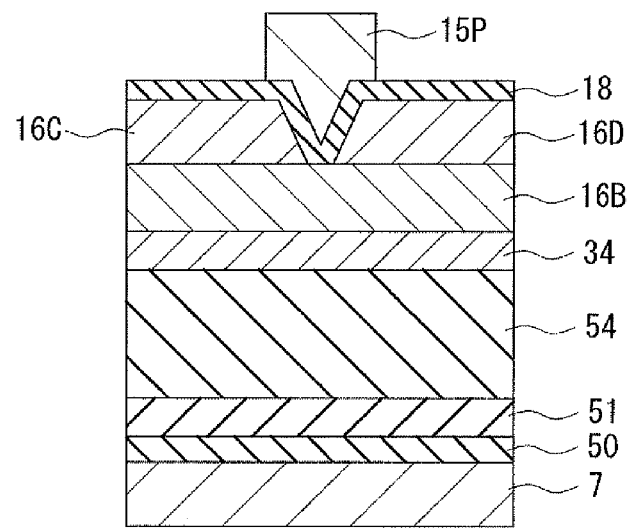

FIG. 12A and FIG. 12B show the next step. In this step, a magnetic layer 15P and a not-shown third connection layer are formed by frame plating, for example. The magnetic layer 15P is to become the main pole 15 later. The magnetic layer 15P and the third connection layer are formed such that their top surfaces are higher in level than the top surfaces of portions of the seed layer lying on the side shields 16C and 16D.

The magnetic layer 15P has a bottom end including a portion that is to later become the bottom end 15L of the main pole 15. This portion includes the first to fourth portions 15L1 to 15L4. The shapes of the first to fourth portions 15L1 to 15L4 of the bottom end of the magnetic layer 15P are defined by the second slope 16Bb, the flat portion UL1, the slope UL2, and the bottom portion UL3. In other words, the shapes of the first to fourth portions 15L1 to 15L4 follow the shapes of the second slope 16Bb, the flat portion UL1, the slope UL2, and the bottom portion UL3.

Figure 13A:
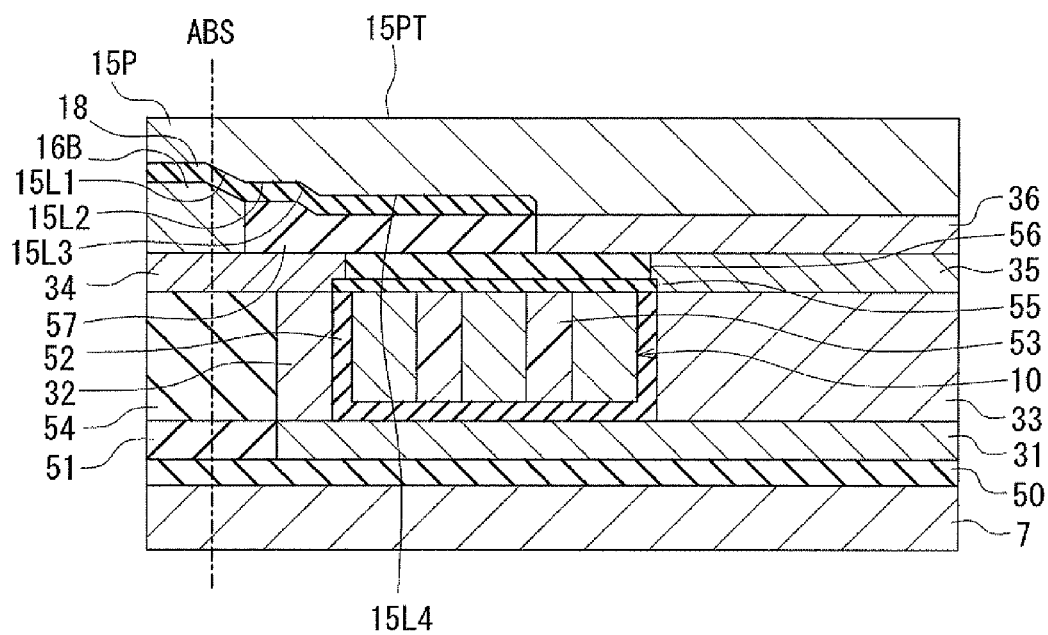
FIG. 13A and FIG. 13B are cross-sectional views showing a step that follows the step shown in FIG. 12A and FIG. 12B.
Figure 13B:
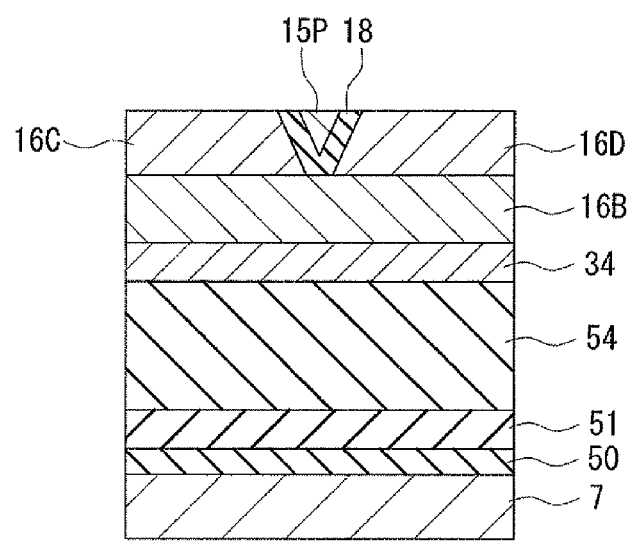

FIG. 13A and FIG. 13B show the next step. In this step, first, the first nonmagnetic layer is formed to cover the second gap layer 18, the magnetic layer 15P and the third connection layer. The magnetic layer 15P, the second gap layer 18, the third connection layer, and the first nonmagnetic layer are then polished by, for example, CMP, until the side shields 16C and 16D are exposed. The magnetic layer 15P after being polished has a top surface 15PT including a portion that is to later become the fourth portion 15T4 of the top surface 15T of the main pole 15.

Figure 14A:
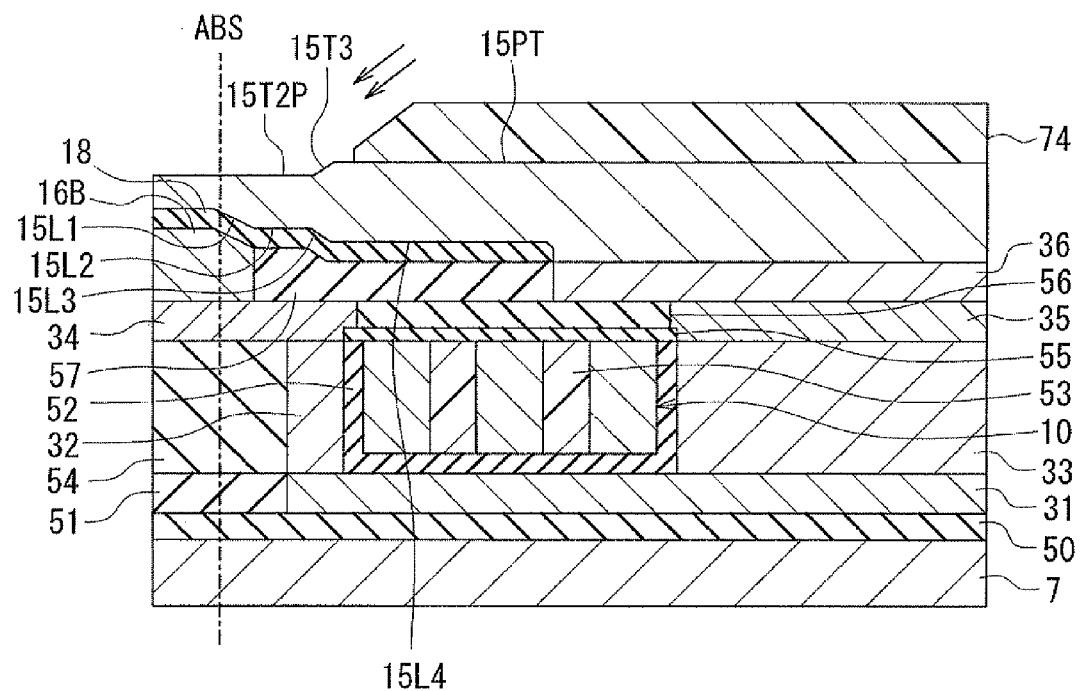
FIG. 14A and FIG. 14B are cross-sectional views showing a step that follows the step shown in FIG. 13A and FIG. 13B.
Figure 14B:
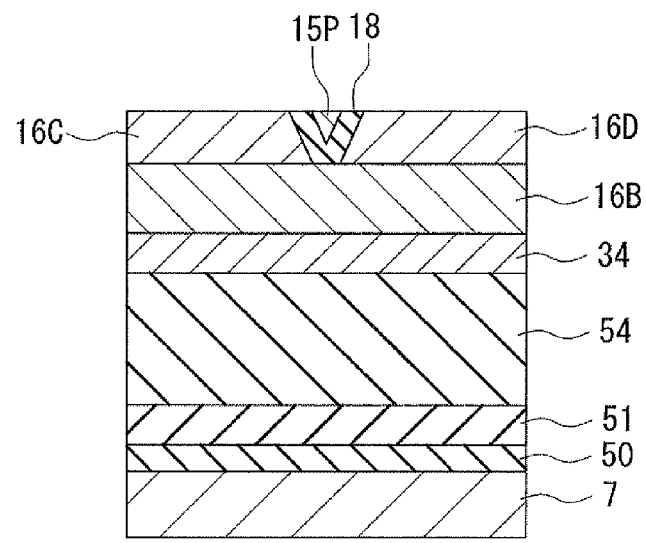

FIG. 14A and FIG. 14B show the next step. In this step, first, a mask 74 is formed on the top surface 15PT of the magnetic layer 15P. The mask 74 is formed by patterning a photoresist layer. The mask 74 does not cover a part of the magnetic layer 15P located in the vicinity of the position ABS where the medium facing surface 100 is to be formed.

Then, portions of the magnetic layer 15P, the side shields 16C and 16D and the second gap layer 18 in the vicinity of the position ABS where the medium facing surface 100 is to be formed are etched by using the mask 74 as the etching mask. This etching is performed to provide the magnetic layer 15P with a flat portion 15T2P and the third portion 15T3 which is a slope. This step will be referred to as the fourth etching step. The mask 74 is then removed.

In the fourth etching step, the magnetic layer 15P is etched by, for example, IBE with ion beams made to travel in a direction inclined relative to the direction perpendicular to the top surface 1a of the substrate 1. The arrows in FIG. 14A indicate the direction of travel of the ion beams. Performing IBE in such a manner makes the third portion 15T3 be a plane inclined relative to the direction perpendicular to the medium facing surface 100 to be formed later. The flat portion 15T2P includes a portion that is to later become the second portion 15T2 of the top surface 15T of the main pole 15.

Figure 15A:
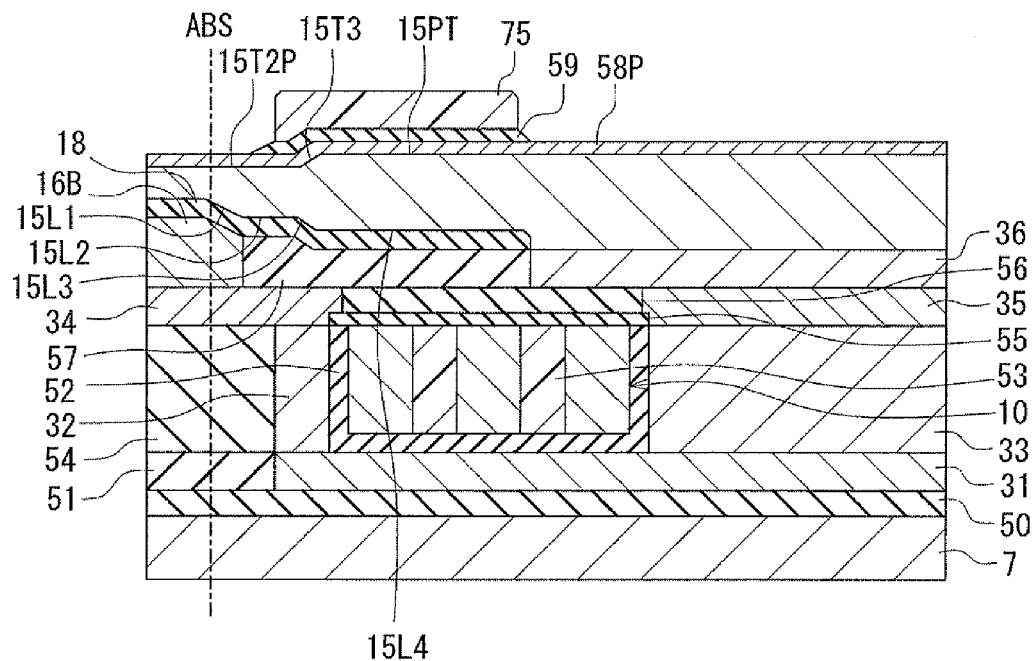
FIG. 15A and FIG. 15B are cross-sectional views showing a step that follows the step shown in FIG. 14A and FIG. 14B.
Figure 15B:
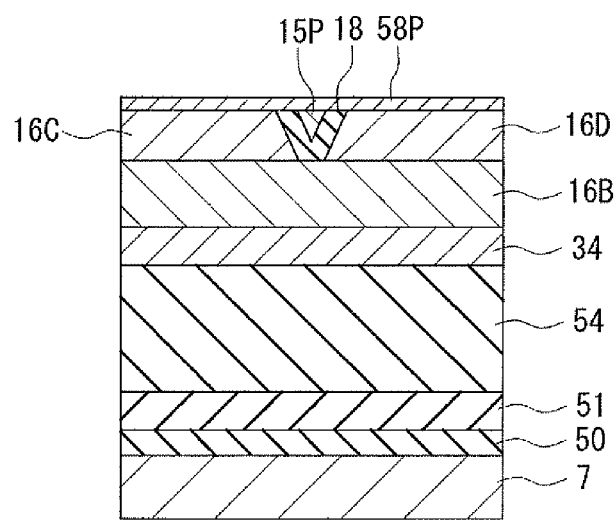

FIG. 15A and FIG. 15B show the next step. In this step, first, a first mask layer 58P and a second mask layer are formed over the magnetic layer 15P and the side shields 16C and 16D. The first mask layer 58P and the second mask layer are to later become the nonmagnetic metal layer 58 and the insulating layer 59, respectively. Next, a mask 75 is formed on the second mask layer. The mask 75 is formed by patterning a photoresist layer. The mask 75 does not cover a part of the second mask layer that is located in the vicinity of the position ABS where the medium facing surface 100 is to be formed and another part of the second mask layer that is located away from the position ABS where the medium facing surface 100 is to be formed.

Next, the second mask layer is taper-etched by, for example, RIE, using the mask 75 as the etching mask. This etching is performed to expose a part of the top surface of the first mask layer 58P located in the vicinity of the position ABS where the medium facing surface 100 is to be formed and to expose another part of the top surface of the first mask layer 58P located away from the position ABS where the medium facing surface 100 is to be formed. The taper-etching of the second mask layer provides the second mask layer with a slope that faces toward the position ABS where the medium facing surface 100 is to be formed, as shown in FIG. 15A. This makes the second mask layer into the insulating layer 59. The etching conditions for the second mask layer are the same as the etching conditions employed in the first etching step. The mask 75 is then removed.

Figure 16A:
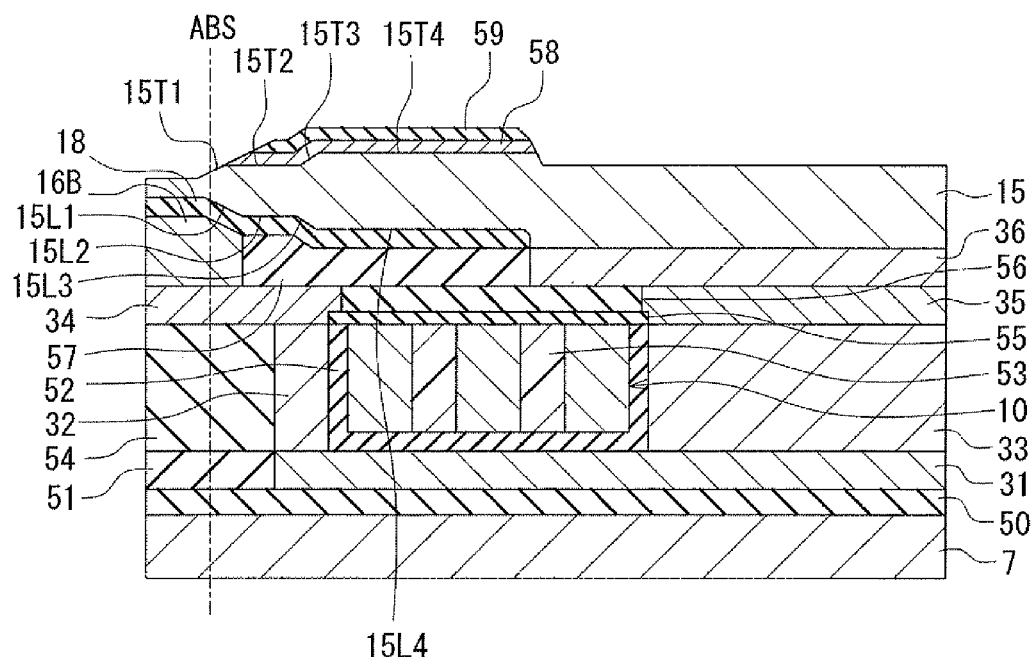
FIG. 16A and FIG. 16B are cross-sectional views showing a step that follows the step shown in FIG. 15A and FIG. 15B.
Figure 16B:
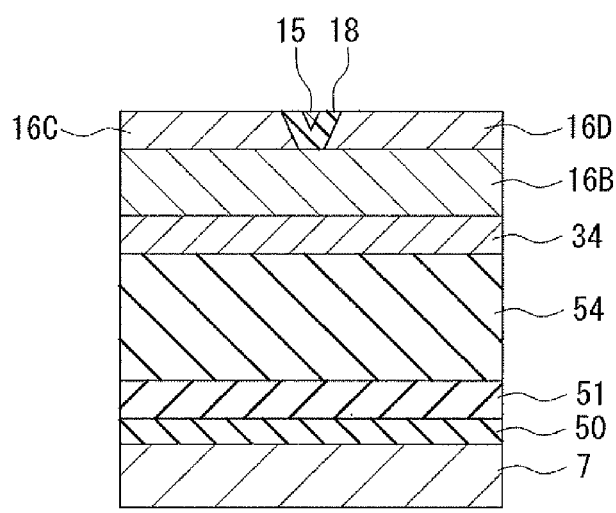

FIG. 16A and FIG. 16B show the next step. In this step, IBE, for example, is performed with the insulating layer 59 used as an etching mask to etch portions of the magnetic layer 15P, the side shields 16C and 16D, the second gap layer 18 and the first mask layer 58P located in the vicinity of the position ABS where the medium facing surface 100 is to be formed and other portions of the magnetic layer 15P and the first mask layer 58P located away from the position ABS where the medium facing surface 100 is to be formed. This makes the first mask layer 58P and the magnetic layer 15P into the nonmagnetic metal layer 58 and the main pole 15, respectively. This step will be referred to as the fifth etching step.

Where IBE is employed to etch the portions of the magnetic layer 15P, the side shields 16C and 16D and the second gap layer 18, the etching is performed such that ion beams travel in a direction at an angle of 40° to 75° relative to the direction perpendicular to the top surface 1a of the substrate 1 and that the direction of travel of the ion beams is caused to rotate as viewed in the direction perpendicular to the top surface 1a of the substrate 1. Performing IBE in such a manner provides the first mask layer 58P with a slope contiguous with the slope of the insulating layer 59, and provides the magnetic layer 15P with the first portion 15T1 which is a slope contiguous with the slope of the first mask layer 58P. As the result of the etching, the remaining portion of the flat portion 15T2P makes the second portion 15T2 and the remaining portion of the top surface 15PT makes the fourth portion 15T4.

A series of steps from the step shown in FIG. 13A and FIG. 13B to the step shown in FIG. 16A and FIG. 16B serve to determine the shape of the top surface 15T of the main pole 15.

Figure 17A:
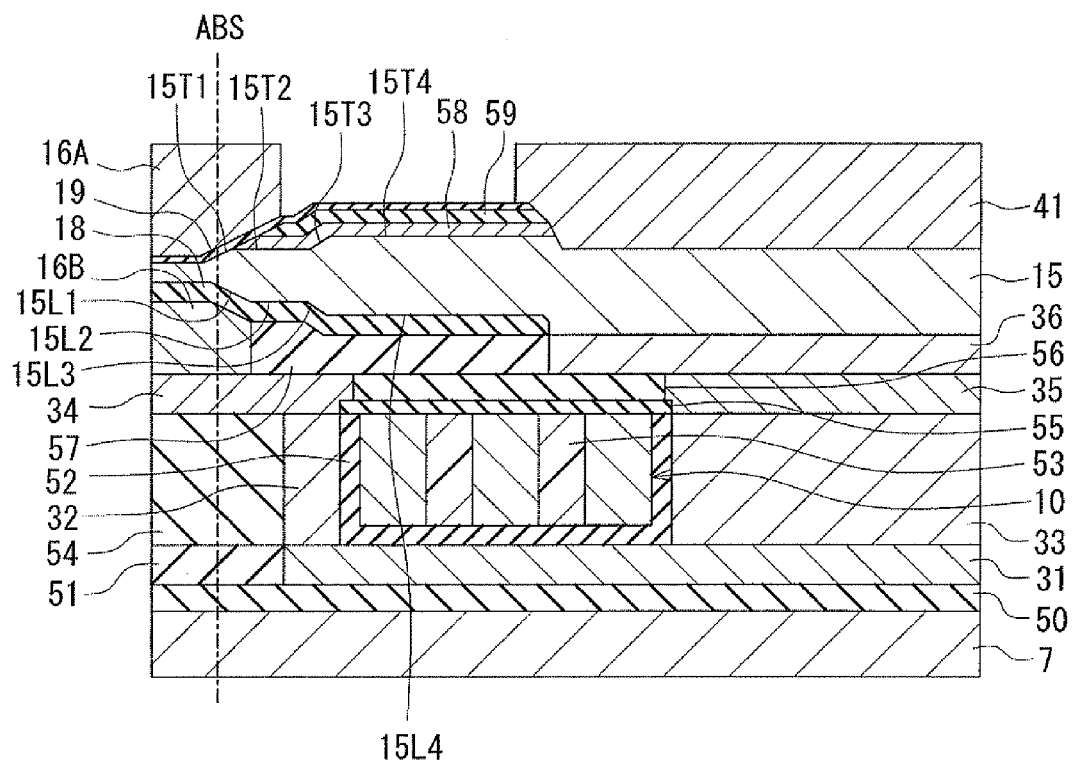
FIG. 17A and FIG. 17B are cross-sectional views showing a step that follows the step shown in FIG. 16A and FIG. 16B.
Figure 17B:
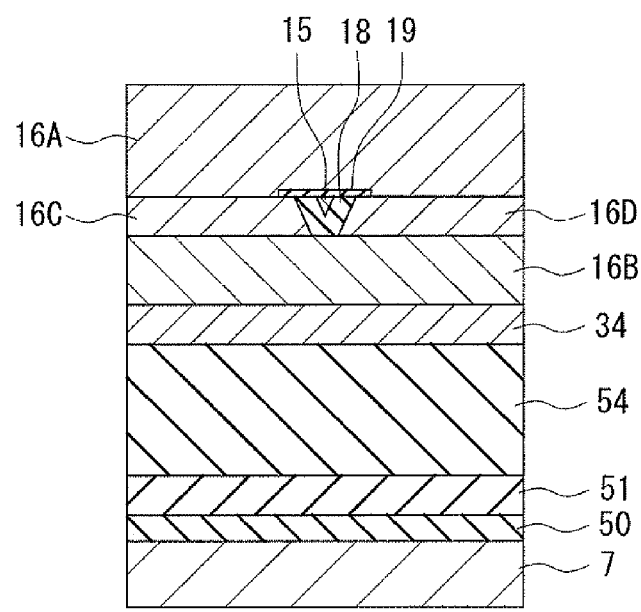

FIG. 17A and FIG. 17B show the next step. In this step, first, the first gap layer 19 is formed over the entire top surface of the stack by sputtering or chemical vapor deposition, for example. The first gap layer 19, the nonmagnetic metal layer 58, and the insulating layer 59 are then selectively etched by, for example, IBE, so that part of the top surface 15T of the main pole 15, part of each of the top surfaces of the side shields 16C and 16D, and the top surface of the third connection layer are exposed. Then, by performing frame plating, for example, the first shield 16A is formed over the side shields 16C and 16D and the first gap layer 19, and the magnetic layer 41 is formed on the main pole 15.

Figure 18A:
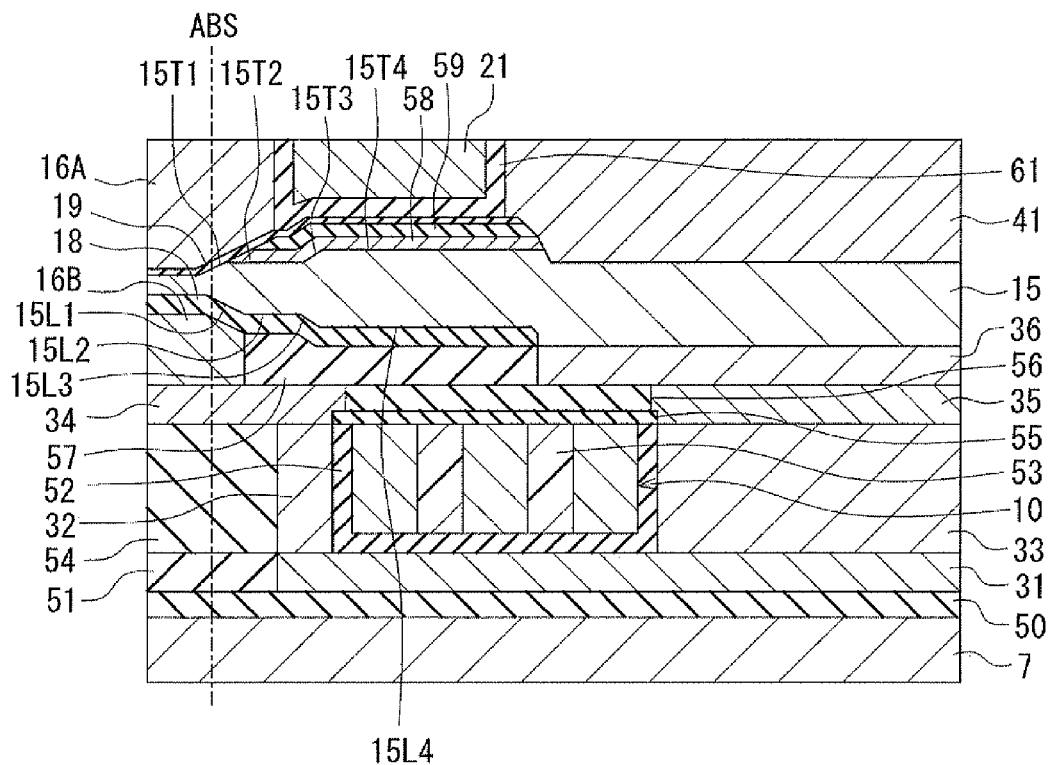
FIG. 18A and FIG. 18B are cross-sectional views showing a step that follows the step shown in FIG. 17A and FIG. 17B.
Figure 18B:
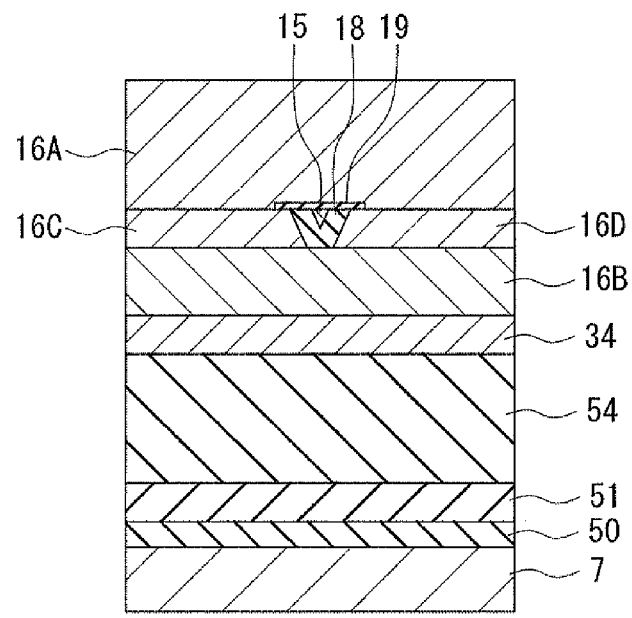

FIG. 18A and FIG. 18B show the next step. In this step, first, the insulating film 61 is formed over the entire top surface of the stack. Where alumina is employed as the material of the insulating film 61, the insulating film 61 is formed by atomic layer deposition, for example. Next, the insulating film 61 is selectively etched by, for example, IBE, so that the top surface of the third connection layer is exposed. The first layer 21 of the first portion 20 of the coil is then formed by frame plating, for example. The first layer 21 is formed such that its top surface is higher in level than the top surface of a portion of the insulating film 61 lying over the first shield 16A and the magnetic layer 41. Next, the second nonmagnetic layer is formed over the entire top surface of the stack. The first layer 21, the insulating film 61, and the second nonmagnetic layer are then polished by, for example, CMP, until the first shield 16A and the magnetic layer 41 are exposed. The top surfaces of the first shield 16A, the first layer 21, the magnetic layer 41, the insulating film 61, and the second nonmagnetic layer are thereby made even with each other.

Steps that follow the step of FIG. 18A and FIG. 18B will now be described with reference to FIG. 2 and FIG. 3. First, the insulating layer 62 is formed over the entire top surface of the stack. The insulating layer 62 is then selectively etched by, for example, IBE, so that the top surface of the first shield 16A and part of the top surface of the magnetic layer 41 are exposed. Then, by performing frame plating, for example, the magnetic layer 42 is formed over the first shield 16A and the insulating layer 62 and the magnetic layer 43 is formed on the magnetic layer 41. The insulating film 64 is then formed over the entire top surface of the stack. Where alumina is employed as the material of the insulating film 64, the insulating film 64 is formed by atomic layer deposition, for example. Next, the insulating layer 62 and the insulating film 64 are selectively etched by, for example, IBE, so that the coil connection part 21E of the first layer 21 is exposed.

Then, the second layer 22 of the first portion 20 of the coil is formed by frame plating, for example. Next, the insulating layer 65 is formed in the space between adjacent turns of the second layer 22. The second layer 22 and the insulating layer 65 are formed such that their top surfaces are higher in level than the top surface of the portion of the insulating film 64 lying on the magnetic layers 42 and 43. Part of the magnetic layer 42 is then etched to form the first and second connecting surfaces mentioned previously. This etching is performed by IBE, for example. Next, the insulating layer 66 is formed over the entire top surface of the stack. The second layer 22, the insulating film 64, and the insulating layers 65 and 66 are then polished by, for example, CMP, until the magnetic layers 42 and 43 are exposed. The top surfaces of the magnetic layers 42 and 43, the second layer 22, the insulating film 64, and the insulating layers 65 and 66 are thereby made even with each other.

Next, the insulating layer 67 is formed over the entire top surface of the stack. The insulating layer 67 is then selectively etched by, for example, IBE, so that the top surfaces of the magnetic layers 42 and 43 are exposed. Next, the magnetic layer 44 is formed over the magnetic layers 42 and 43 and the insulating layer 67 by frame plating, for example. Then, the insulating layer 68 is formed over the entire top surface of the stack. The insulating layer 68 is then polished by, for example, CMP, until the magnetic layer 44 is exposed. The top surfaces of the magnetic layer 44 and the insulating layer 68 are thereby made even with each other.

Next, the protective layer 70 is formed to cover the entire top surface of the stack. Wiring, terminals and other components are then formed on the protective layer 70, and the substrate 1 is cut near the position ABS where the medium facing surface 100 is to be formed. The cut surface is polished into the medium facing surface 100, and then fabrication of flying rails and other processes are performed to complete the magnetic head.

Modification Examples

Figure 19:
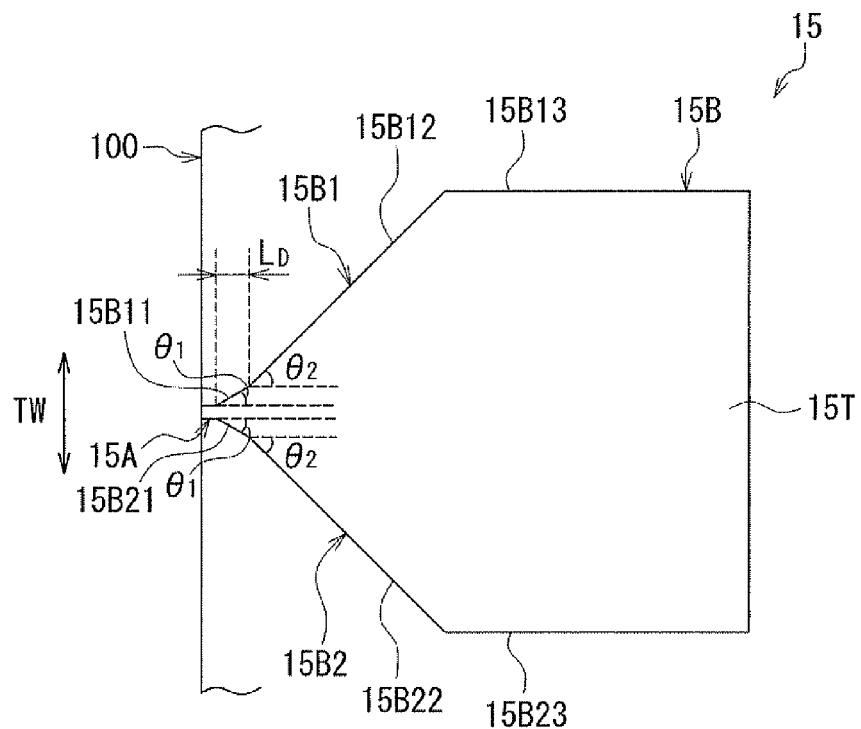
FIG. 19 is a plan view showing the top surface of a main pole of a first modification example of the first embodiment of the invention.
Figure 20:
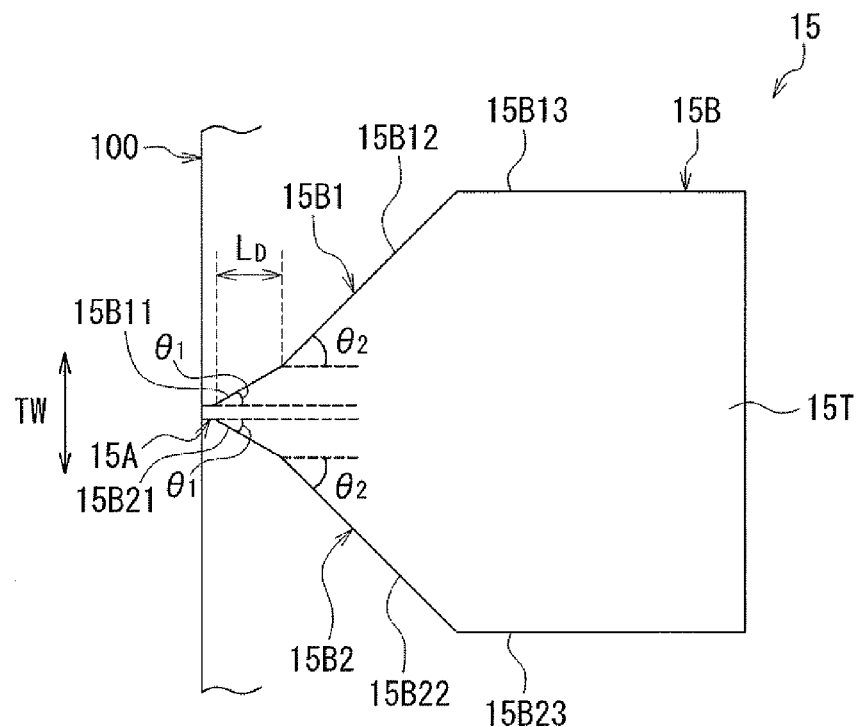
FIG. 20 is a plan view showing the top surface of a main pole of a second modification example of the first embodiment of the invention.

Main poles of first and second modification examples of the present embodiment will now be described with reference to FIG. 19 and FIG. 20. FIG. 19 is a plan view showing the top surface of the main pole of the first modification example of the present embodiment. FIG. 20 is a plan view showing the top surface of the main pole of the second modification example of the present embodiment.

In the main pole 15 of each of the first and second modification examples, the top surface 15T in the wide portion 15B has two sides 15B1 and 15B2 that are located at opposite ends in the track width direction TW. The side 15B1 includes a portion 15B11, a portion 15B12, and a portion 15B13 that are contiguously arranged in this order of increasing distance from the medium facing surface 100. The side 15B2 includes a portion 15B21, a portion 15B22, and a portion 15B23 that are contiguously arranged in this order of increasing distance from the medium facing surface 100. The portions 15B11 and 15B21 are inclined relative to the direction perpendicular to the medium facing surface 100 such that the distance between the portions 15B11 and 15B21 increases with increasing distance from the medium facing surface 100. The portions 15B12 and 15B22 are inclined, at an angle different from the angle at which the portions 15B11 and 15B21 are inclined, relative to the direction perpendicular to the medium facing surface 100 such that the distance between the portions 15B12 and 15B22 increases with increasing distance from the medium facing surface 100. The portions 15B13 and 15B23 extend in a direction substantially perpendicular to the medium facing surface 100.

The portion 15B11 and the portion 15B21 form the same angle relative to the direction perpendicular to the medium facing surface 100. This angle will hereinafter be represented by the symbol $\theta_1$. The angle $\theta_1$ falls within the range of 25° to 35°, for example. The portion 15B12 and the portion 15B22 form the same angle relative to the direction perpendicular to the medium facing surface 100. This angle will hereinafter be represented by the symbol $\theta_2$. The angle $\theta_2$ is greater than the angle $\theta_1$, and falls within the range of 35° to 50°, for example.

The portion 15B11 and the portion 15B21 have the same length in the direction perpendicular to the medium facing surface 100. This length will hereinafter be represented by the symbol $L_D$. The length $L_D$ falls within the range of 0.5 to 1.0 μm, for example. The length $L_D$ in the first modification example and that in the second modification example are different from each other. By way of example, the length $L_D$ in the first modification example is 0.5 μm and that in the second modification example is 1.0 μm.

Second Embodiment

Figure 21:
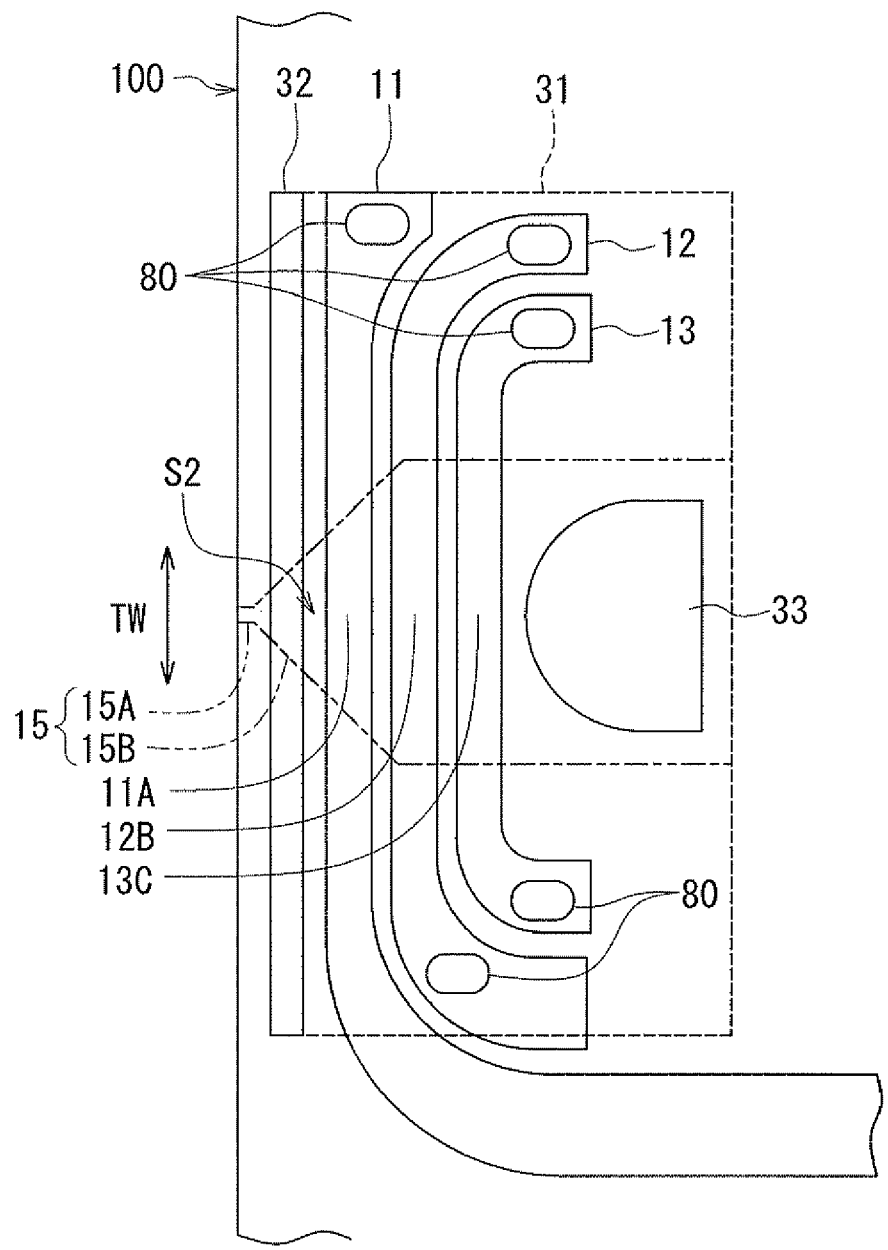
FIG. 21 is a plan view showing a plurality of second coil elements of a coil in a magnetic head according to a second embodiment of the invention.
Figure 22:
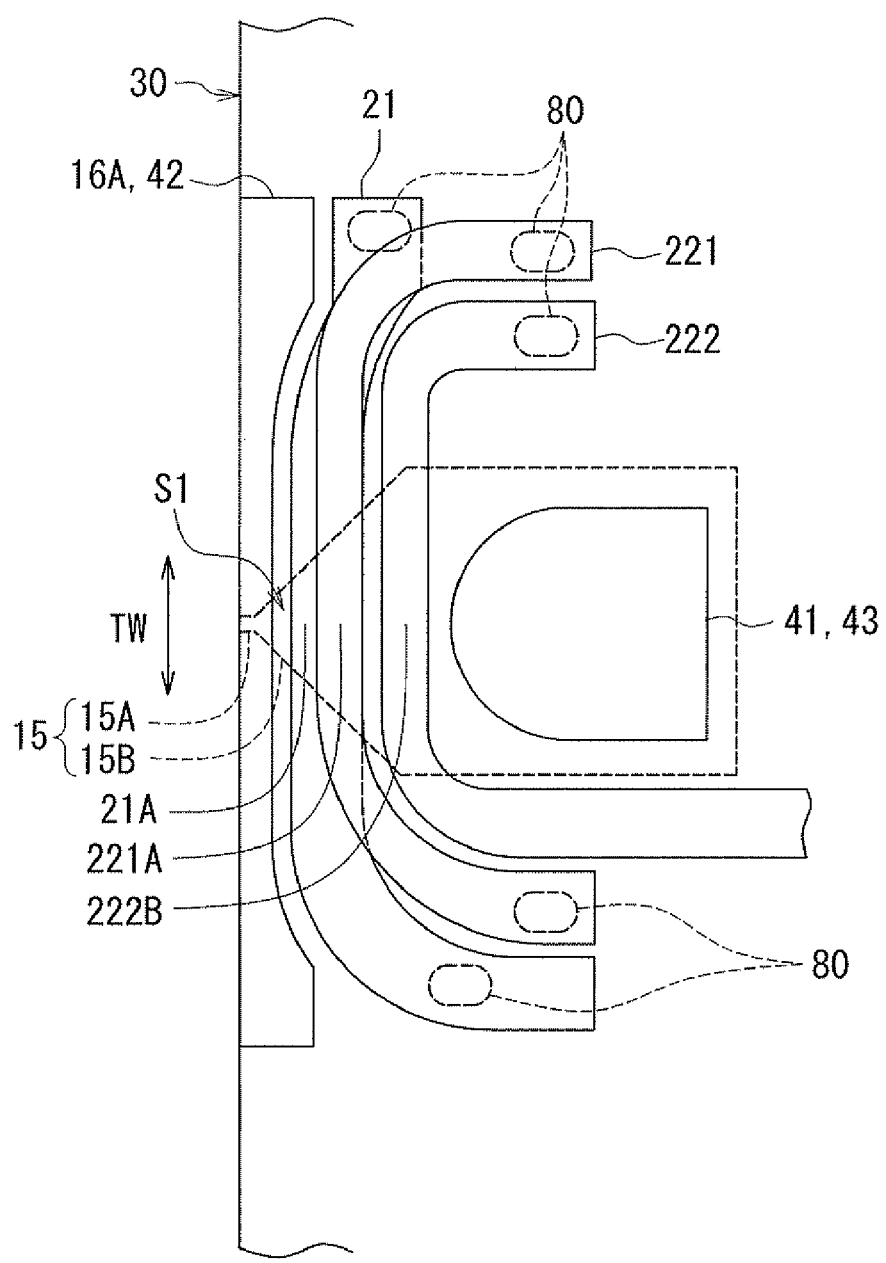
FIG. 22 is a plan view showing a plurality of first coil elements of the coil in the magnetic head according to the second embodiment of the invention.

A magnetic head according to a second embodiment of the invention will now be described with reference to FIG. 21 and FIG. 22. FIG. 21 is a plan view showing a plurality of second coil elements of the coil of the magnetic head according to the present embodiment. FIG. 22 is a plan view showing a plurality of first coil elements of the coil of the magnetic head according to the present embodiment.

The configuration of the magnetic head according to the present embodiment is different from that of the magnetic head according to the first embodiment in the following respects. In the magnetic head according to the present embodiment, the coil is wound approximately three turns around the main pole 15. The coil of the present embodiment has three line-shaped portions 11, 12, and 13 shown in FIG. 21, instead of the second portion 10 of the first embodiment shown in FIG. 4. The coil of the present embodiment further has a first layer 21 shaped as shown in FIG. 22, instead of the first layer 21 of the first embodiment shown in FIG. 5. The coil of the present embodiment further has two line-shaped portions 221 and 222 shown in FIG. 22, instead of the second layer 22 of the first embodiment shown in FIG. 6.

As shown in FIG. 21, the line-shaped portions 11, 12, and 13 respectively include second coil elements 11A, 12B, and 13C extending to pass through the second space S2. The second coil elements 11A, 12B, and 13C align in this order in the direction perpendicular to the medium facing surface 100, the coil element 11A being closest to the medium facing surface 100.

As shown in FIG. 22, the first layer 21 of the present embodiment includes a first coil element 21A extending to pass through the first space S1. The coil element 21A passes between the first shield 16A and the magnetic layer 41, in particular. As shown in FIG. 22, the line-shaped portions 221 and 222 respectively include first coil elements 221A and 222B extending to pass through the first space S1. The first coil elements 221A and 222B align in this order in the direction perpendicular to the medium facing surface 100, the coil element 221A being closer to the medium facing surface 100. The coil elements 221A and 222B pass between the magnetic layer 42 and the magnetic layer 43, in particular.

The line-shaped portions 11, 12, and 13 are electrically connected to the first layer 21 and the line-shaped portions 221 and 222 via five columnar connection layers 80, which penetrate a plurality of layers interposed therebetween, so as to form a coil that is wound helically around the main pole 15.

The remainder of configuration, function and effects of the present embodiment are similar to those of the first embodiment.

Third Embodiment

Figure 23:
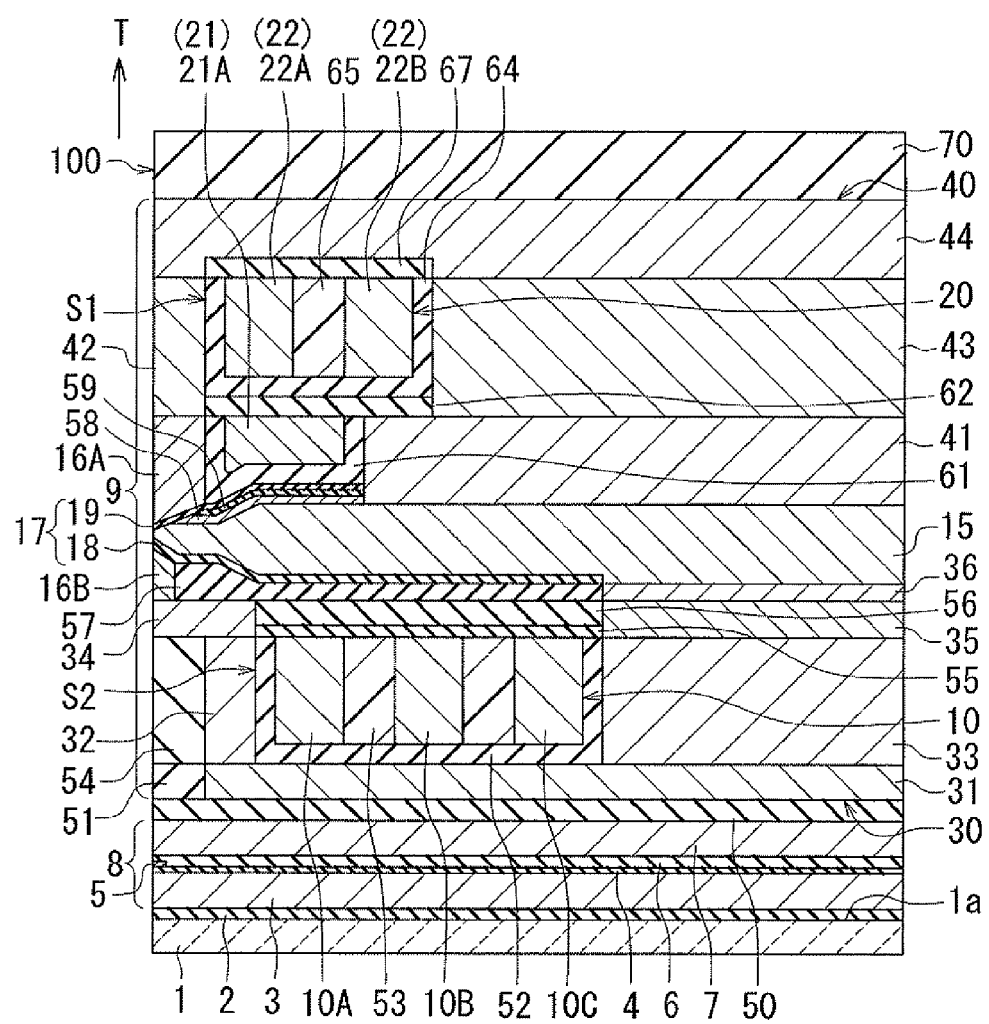
FIG. 23 is a cross-sectional view of a magnetic head according to a third embodiment of the invention.

A magnetic head according to a third embodiment of the invention will now be described with reference to FIG. 23. FIG. 23 is a cross-sectional view of the magnetic head according to the present embodiment. Note that FIG. 23 shows a cross section perpendicular to the medium facing surface and the top surface of the substrate, or the main cross section, in particular.

The configuration of the magnetic head according to the present embodiment is different from that of the magnetic head according to the first embodiment in the following respects. In the magnetic head according to the present embodiment, the magnetic layer 42 does not have the first and second connecting surfaces. The top surface of the magnetic layer 42 extends to the medium facing surface 100 and is connected to the front end face of the magnetic layer 42. In the magnetic head according to the present embodiment, the magnetic layer 44 has an end face located in the medium facing surface 100.

The coil of the present embodiment may be configured to be helically wound around the main pole 15 as in the second embodiment. The remainder of configuration, function and effects of the present embodiment are similar to those of the first or second embodiment.

Fourth Embodiment

Figure 24:
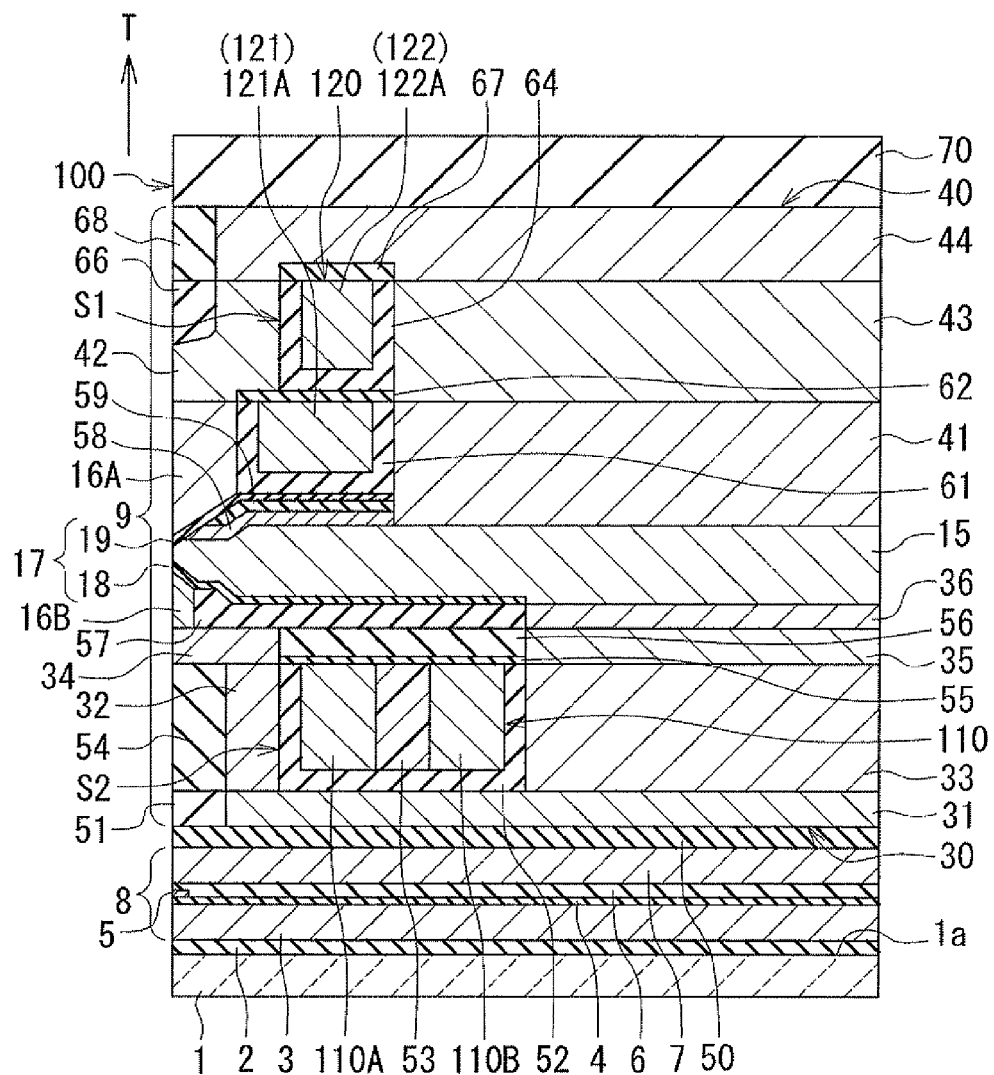
FIG. 24 is a cross-sectional view of a magnetic head according to a fourth embodiment of the invention.
Figure 25:
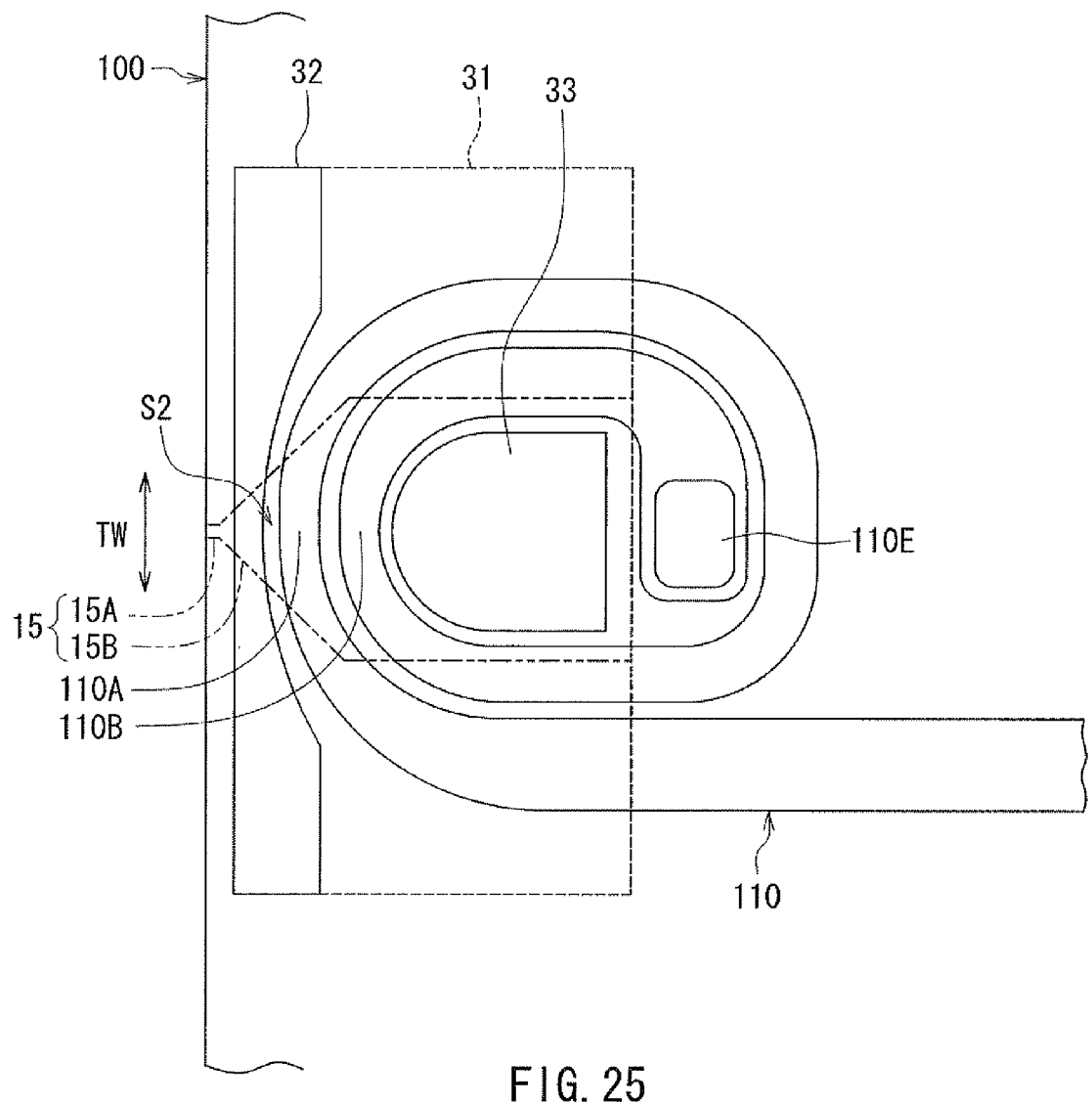
FIG. 25 is a plan view showing a second portion of a coil in the magnetic head according to the fourth embodiment of the invention.
Figure 26:
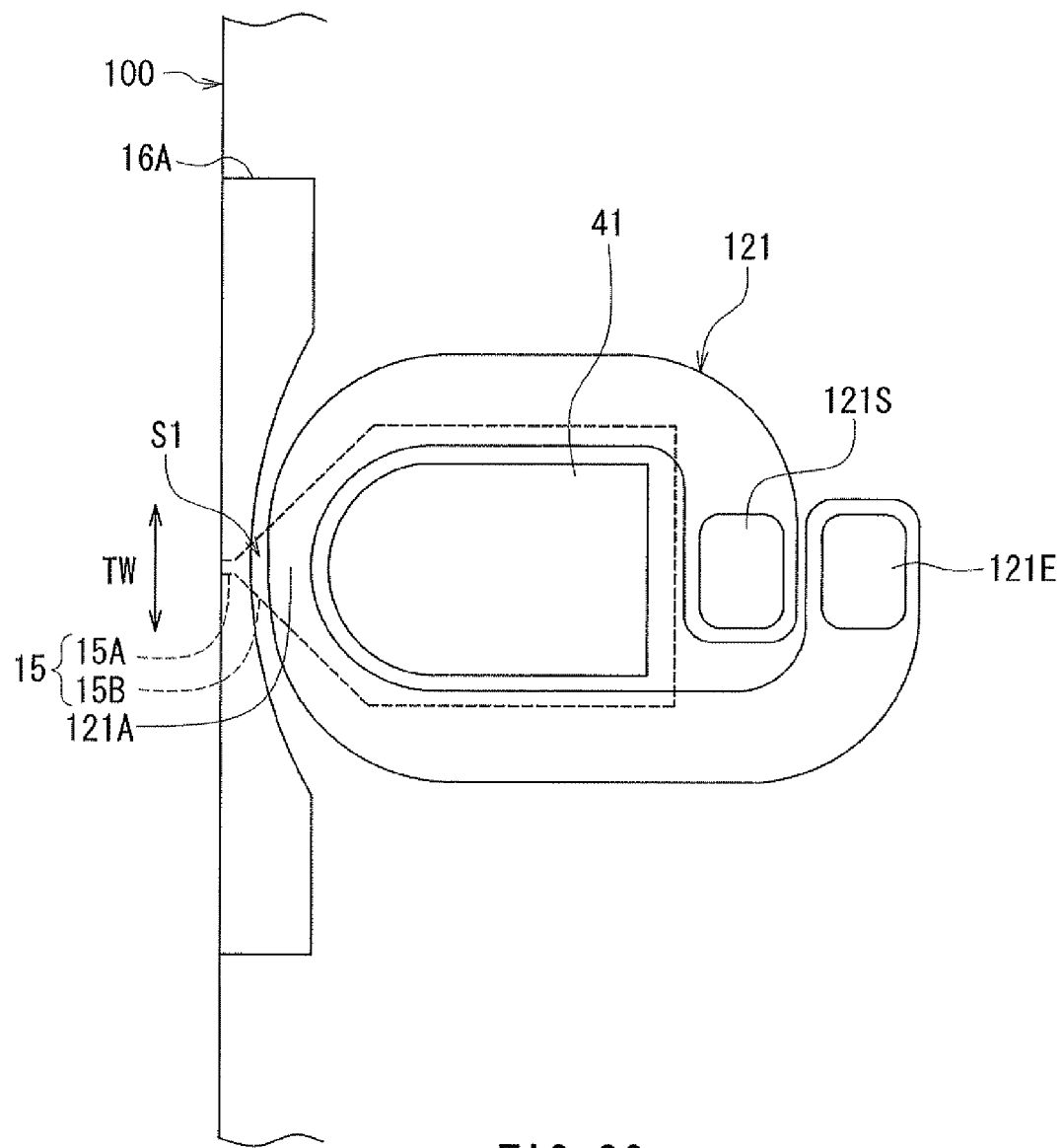
FIG. 26 is a plan view showing a first layer of a first portion of the coil in the magnetic head according to the fourth embodiment of the invention.
Figure 27:
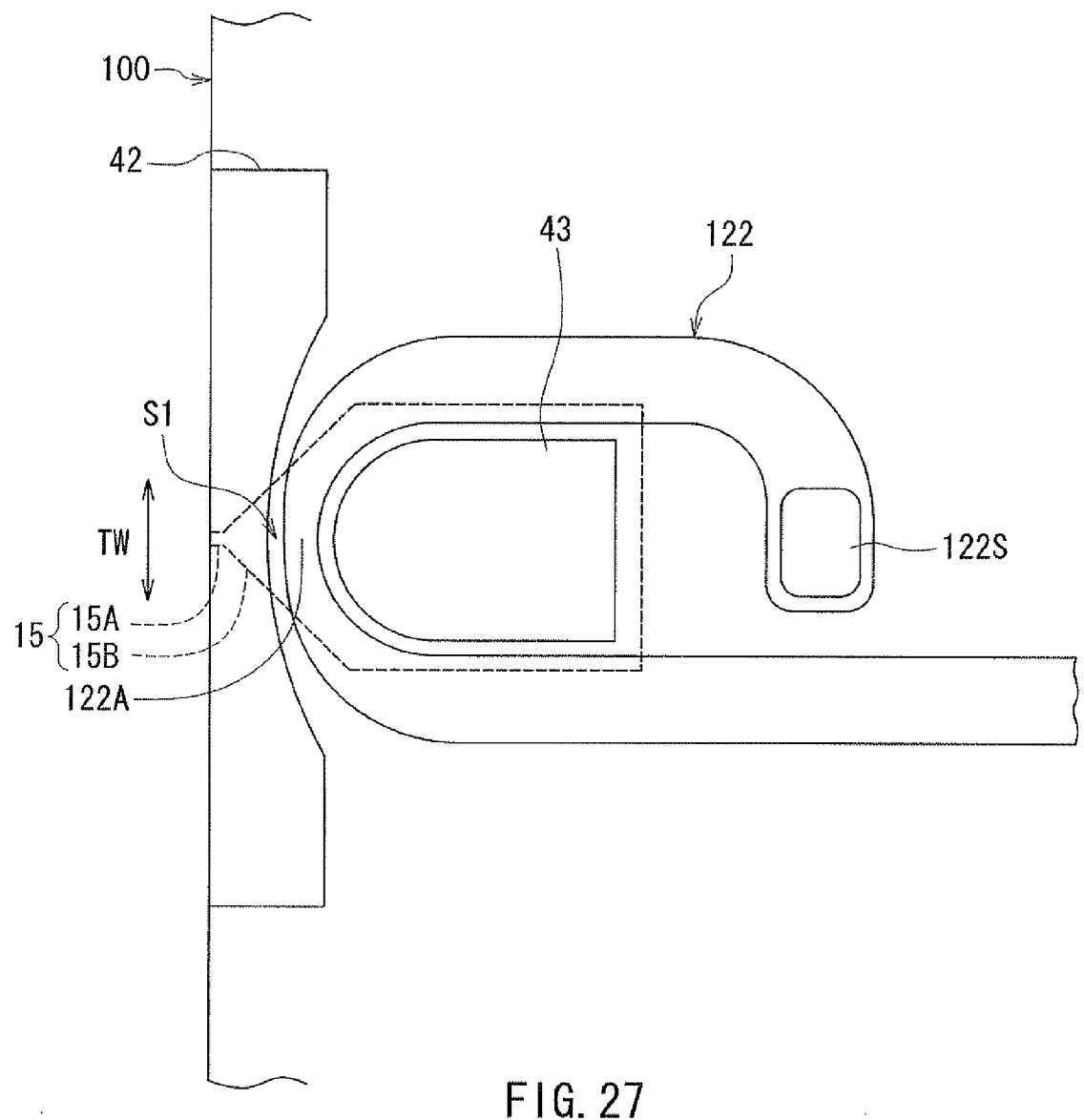
FIG. 27 is a plan view showing a second layer of the first portion of the coil in the magnetic head according to the fourth embodiment of the invention.

A magnetic head according to a fourth embodiment of the invention will now be described with reference to FIG. 24 to FIG. 27. FIG. 24 is a cross-sectional view of the magnetic head according to the present embodiment. Note that FIG. 24 shows a cross section perpendicular to the medium facing surface and the top surface of the substrate, or the main cross section, in particular. FIG. 25 is a plan view showing a second portion of the coil of the magnetic head according to the present embodiment. FIG. 26 is a plan view showing a first layer of a first portion of the coil of the magnetic head according to the present embodiment. FIG. 27 is a plan view showing a second layer of the first portion of the coil of the magnetic head according to the present embodiment.

The configuration of the magnetic head according to the present embodiment is different from that of the magnetic head according to the first embodiment in the following respects. The coil of the present embodiment includes a first portion 120 and a second portion 110, instead of the first portion 20 and the second portion 10 of the first embodiment. As shown in FIG. 25, the second portion 110 is wound approximately two turns around the magnetic layer 33 which constitutes part of the second return path section 30.

The first portion 120 of the coil includes a first layer 121 and a second layer 122. As shown in FIG. 26, the shape and location of the first layer 121 are the same as those of the first layer 21 of the first embodiment. As shown in FIG. 27, the second layer 122 is wound approximately one turn around the magnetic layer 43 which constitutes part of the first return path section 40. The magnetic head according to the present embodiment does not have the insulating layer 65.

Now, the first portion 120 and the second portion 110 of the coil will be described in more detail with reference to FIG. 25 to FIG. 27. As shown in FIG. 25, the second portion 110 includes two second coil elements 110A and 110B extending to pass between the magnetic layer 32 and the magnetic layer 33, in particular, within the second space S2. The second coil elements 110A and 110B align in this order in the direction perpendicular to the medium facing surface 100, the coil element 110A being closer to the medium facing surface 100. The second portion 110 has a coil connection part 110E electrically connected to the first portion 120.

As shown in FIG. 26, the first layer 121 of the first portion 120 includes a first coil element 121A extending to pass between the first shield 16A and the magnetic layer 41, in particular, within the first space S1. The first layer 121 has a coil connection part 121S electrically connected to the coil connection part 110E of the second portion 110, and a coil connection part 121E electrically connected to the second layer 122. The coil connection part 121S is electrically connected to the coil connection part 110E via a columnar connection layer (not shown) that penetrates a plurality of layers interposed between the first layer 121 and the second portion 110.

As shown in FIG. 27, the second layer 122 of the first portion 120 includes a first coil element 122A extending to pass between the magnetic layer 42 and the magnetic layer 43, in particular, within the first space S1. The second layer 122 has a coil connection part 122S penetrating the insulating layer 62 and the insulating film 64 and electrically connected to the coil connection part 121E of the first layer 121. In the example shown in FIG. 25 to FIG. 27, the first portion 120 and the second portion 110 are connected in series.

The coil of the present embodiment may be configured to be helically wound around the main pole 15 as in the second embodiment. The configuration of the magnetic head according to the present embodiment except the coil may be the same as that of the magnetic head according to the third embodiment. The remainder of configuration, function and effects of the present embodiment are similar to those of the first, second, or third embodiment.

Fifth Embodiment

Figure 28:
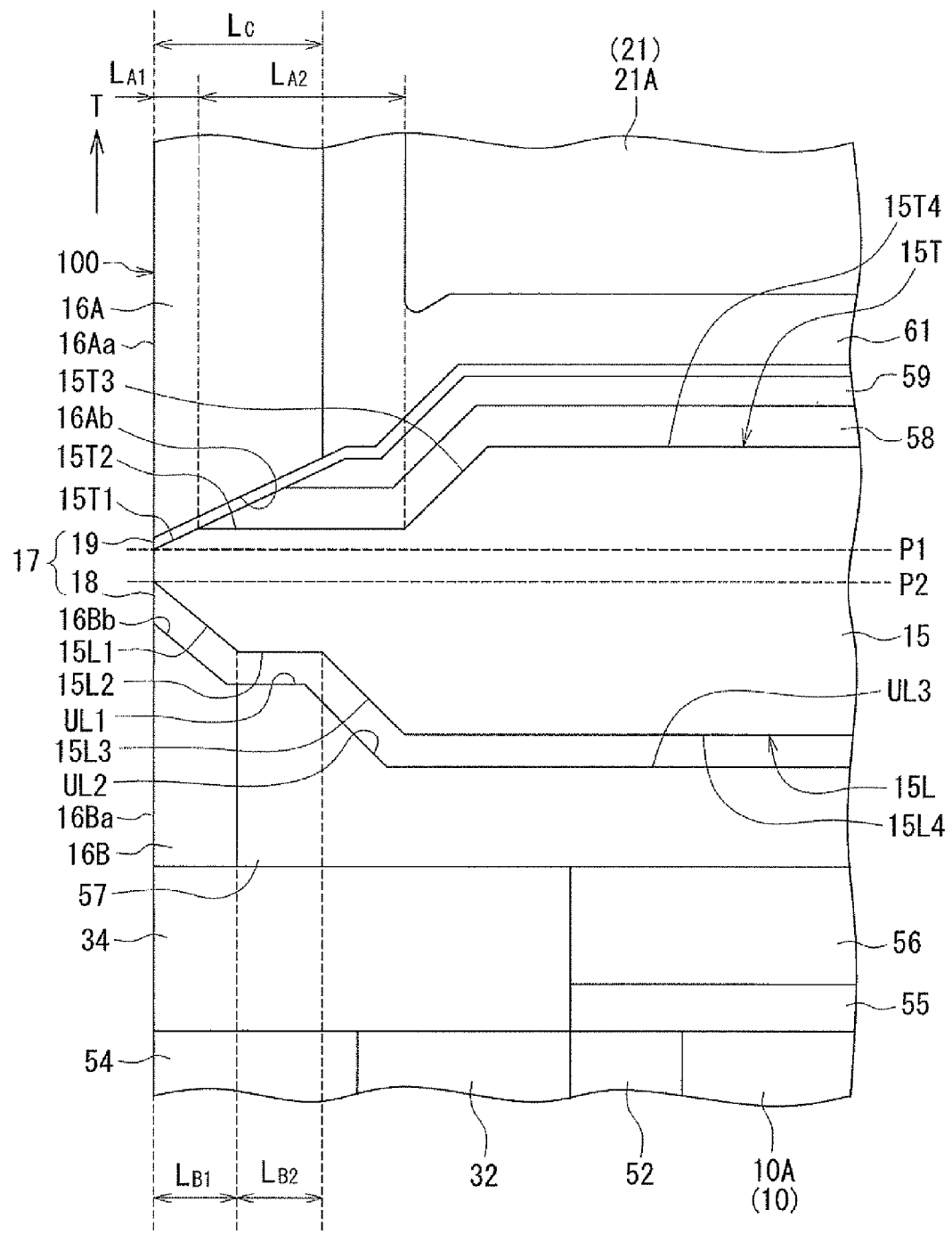
FIG. 28 is a cross-sectional view showing a part of the main pole in the vicinity of the medium facing surface in a magnetic head according to a fifth embodiment of the invention.

A magnetic head according to a fifth embodiment of the invention will now be described with reference to FIG. 28. FIG. 28 is a cross-sectional view showing a part of the main pole in the vicinity of the medium facing surface in the magnetic head according to the present embodiment. Note that FIG. 28 shows a cross section perpendicular to the medium facing surface and the top surface of the substrate, or the main cross section, in particular.

The configuration of the magnetic head according to the present embodiment is different from that of the magnetic head according to the first embodiment in the following respects. In the magnetic head according to the present embodiment, the distance from the medium facing surface 100 to the boundary between the second portion 15L2 and the third portion 15L3 of the bottom end 15L (which is the same as the sum of the length $L_{B1}$ and the length $L_{B2}$) is smaller than the distance from the medium facing surface 100 to the boundary between the second portion 15T2 and the third portion 15T3 of the top surface 15T (which is the same as the sum of the length $L_{A1}$ and the length $L_{A2}$).

Note that FIG. 28 is illustrated such that the distance from the medium facing surface 100 to the boundary between the second portion 15T2 and the third portion 15T3 of the top surface 15T is equal to the distance from the medium facing surface 100 to the boundary between the third portion 15L3 and the fourth portion 15L4 of the bottom end 15L. However, these distances may be different from each other.

As compared with the first embodiment, the present embodiment allows the thickness of the main pole 15 to be reduced more gradually with increasing proximity to the medium facing surface 100. This makes it possible to prevent magnetic flux leakage from inside to outside the main pole 15 due to a sudden decrease in the thickness of the main pole 15.

The magnetic head according to the present embodiment may have the same configuration as that of the magnetic head according to any of the second to fourth embodiments except for the above-described differences. The remainder of configuration, function and effects of the present embodiment are similar to those of any of the first to fourth embodiments.

Sixth Embodiment

Figure 29:
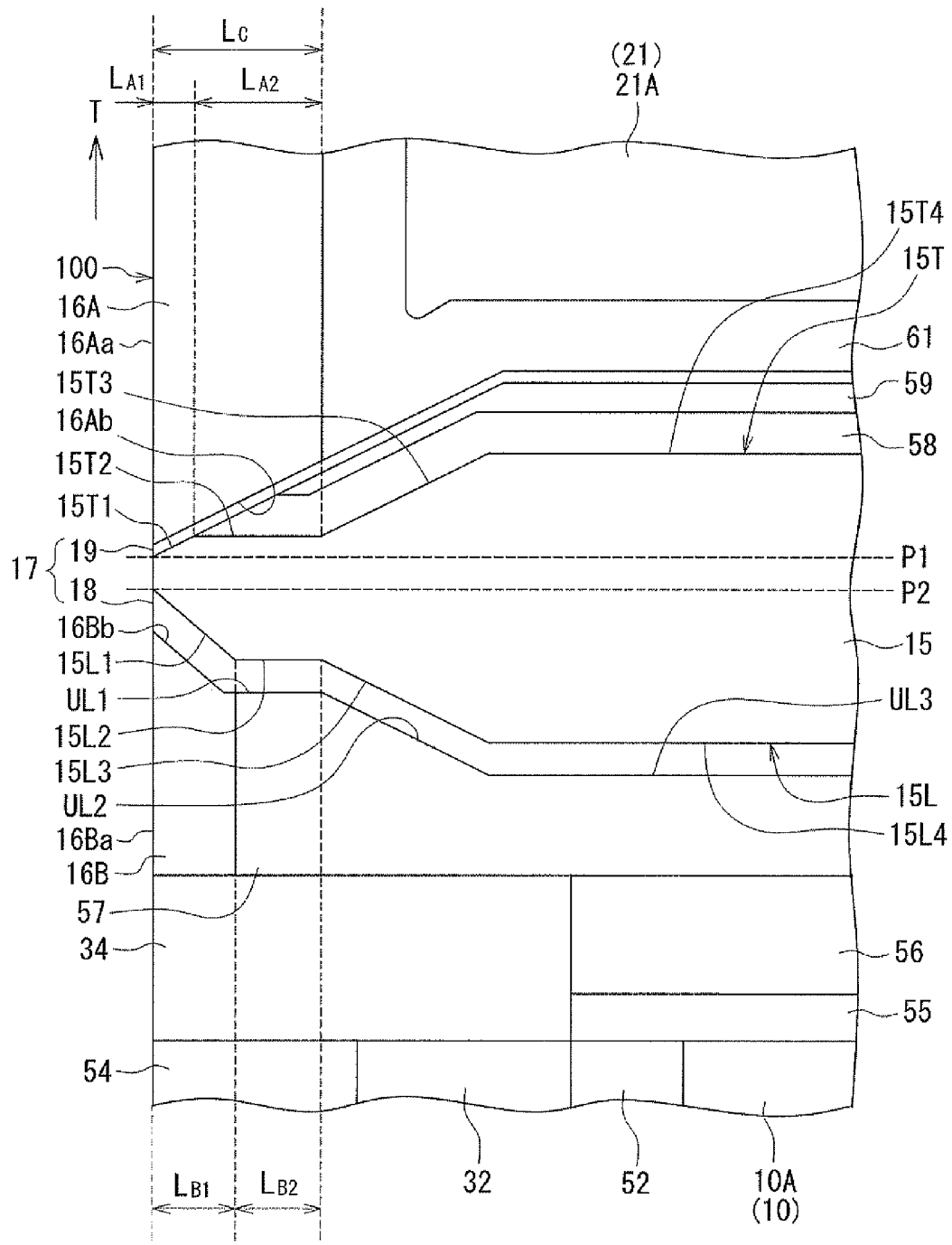
FIG. 29 is a cross-sectional view showing a part of the main pole in the vicinity of the medium facing surface in a magnetic head according to a sixth embodiment of the invention.

A magnetic head according to a sixth embodiment of the invention will now be described with reference to FIG. 29. FIG. 29 is a cross-sectional view showing a part of the main pole in the vicinity of the medium facing surface in the magnetic head according to the present embodiment. Note that FIG. 29 shows a cross section perpendicular to the medium facing surface and the top surface of the substrate, or the main cross section, in particular.

The configuration of the magnetic head according to the present embodiment is different from that of the magnetic head according to the first embodiment in the following respects. The magnetic head according to the present embodiment is configured so that the first portion 15T1 of the top surface 15T of the main pole 15 and the respective slopes of the nonmagnetic metal layer 58 and the insulating layer 59 facing toward the medium facing surface 100 form a one-plane slope. The top surface of the insulating layer 59 is contiguous with this slope. Furthermore, the first gap layer 19 is formed on top of the aforementioned one-plane slope and the top surface of the insulating layer 59.

According to the present embodiment, it is possible to form the first gap layer 19 on an underlayer having reduced asperities. This allows the first gap layer 19 to be formed with high quality. Furthermore, since the present embodiment also allows the first gap layer 19 to have reduced asperities, it becomes easy to form another layer on the first gap layer 19.

The magnetic head according to the present embodiment may have the same configuration as that of the magnetic head according to any of the second to fourth embodiments except for the above-described differences. The remainder of configuration, function and effects of the present embodiment are similar to those of any of the first to fourth embodiments.

Seventh Embodiment

Figure 30:
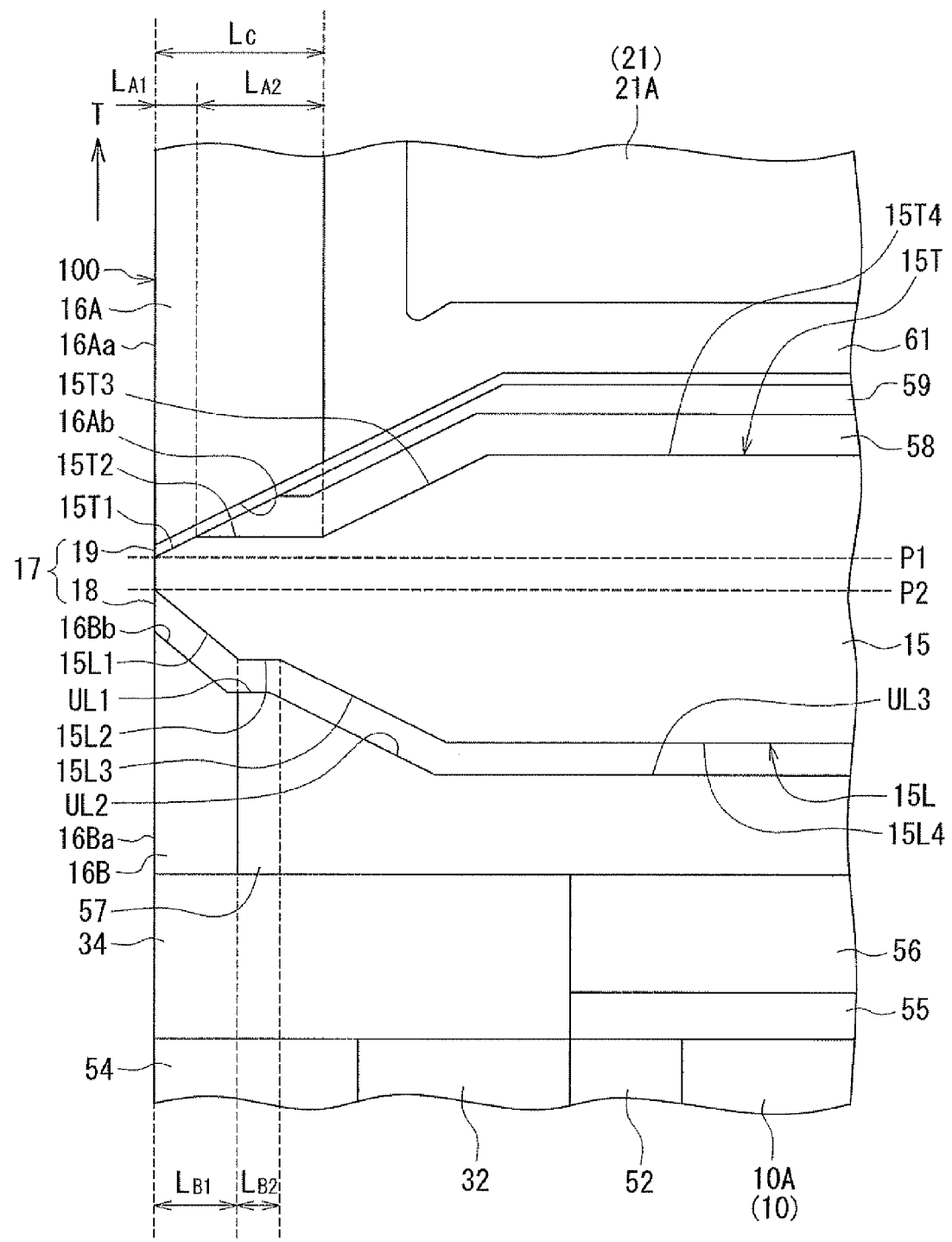
FIG. 30 is a cross-sectional view showing a part of the main pole in the vicinity of the medium facing surface in a magnetic head according to a seventh embodiment of the invention.

A magnetic head according to a seventh embodiment of the invention will now be described with reference to FIG. 30. FIG. 30 is a cross-sectional view showing a part of the main pole in the vicinity of the medium facing surface in the magnetic head according to the present embodiment. Note that FIG. 30 shows a cross section perpendicular to the medium facing surface and the top surface of the substrate, or the main cross section, in particular.

The configuration of the magnetic head according to the present embodiment is different from that of the magnetic head according to the sixth embodiment in the following respects. In the magnetic head according to the present embodiment, the distance from the medium facing surface 100 to the boundary between the second portion 15L2 and the third portion 15L3 of the bottom end 15L (which is the same as the sum of the length $L_{B1}$ and the length $L_{B2}$) is smaller than the distance from the medium facing surface 100 to the boundary between the second portion 15T2 and the third portion 15T3 of the top surface 15T (which is the same as the sum of the length $L_{A1}$ and the length $L_{A2}$), as with the fifth embodiment.

The remainder of configuration, function and effects of the present embodiment are similar to those of the fifth or sixth embodiment.

Eighth Embodiment

Figure 31:
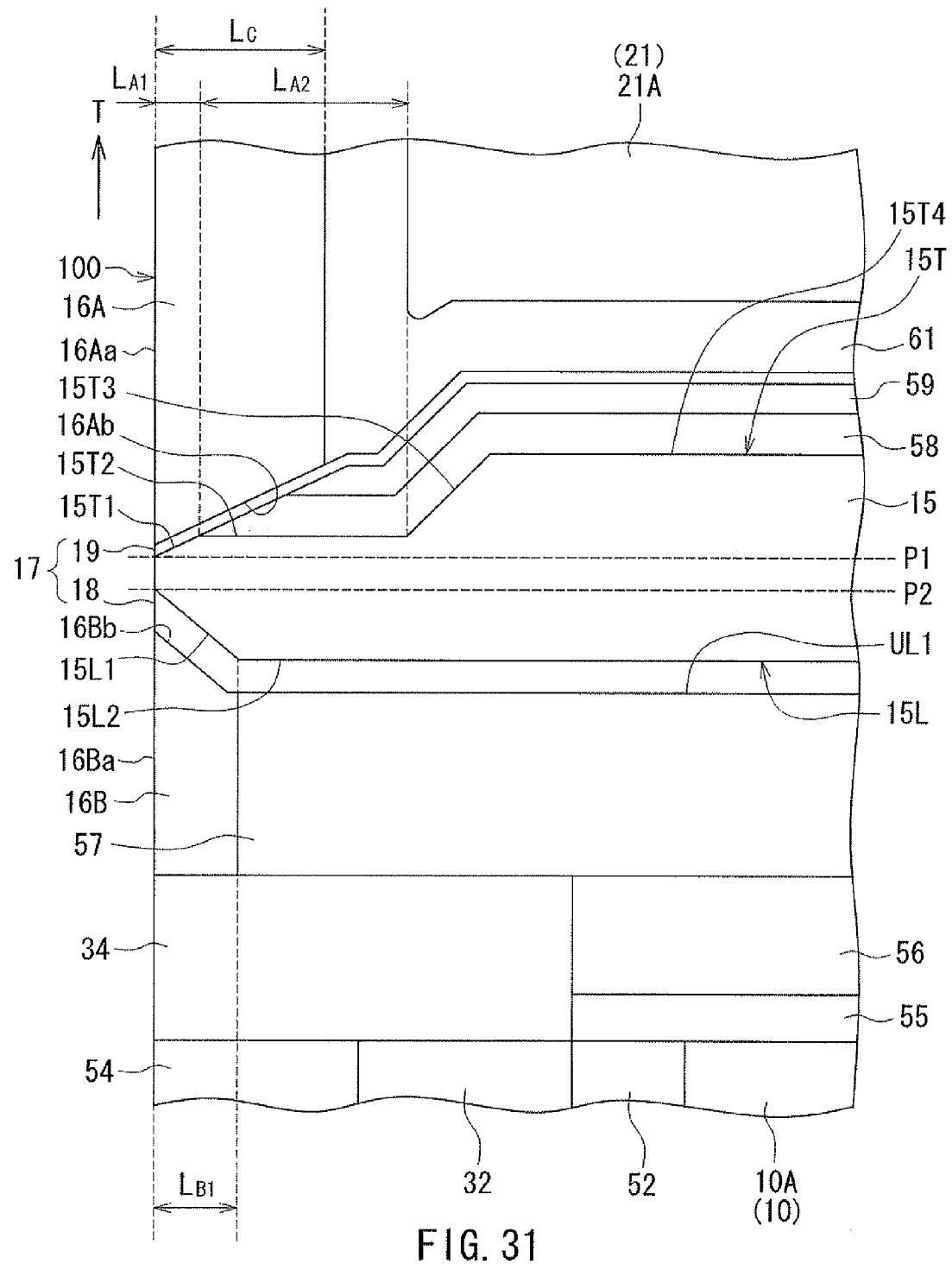
FIG. 31 is a cross-sectional view showing a part of the main pole in the vicinity of the medium facing surface in a magnetic head according to an eighth embodiment of the invention.

A magnetic head according to an eighth embodiment of the invention will now be described with reference to FIG. 31. FIG. 31 is a cross-sectional view showing a part of the main pole in the vicinity of the medium facing surface in the magnetic head according to the present embodiment. Note that FIG. 31 shows a cross section perpendicular to the medium facing surface and the top surface of the substrate, or the main cross section, in particular.

The configuration of the magnetic head according to the present embodiment is different from that of the magnetic head according to the first embodiment in the following respects. The magnetic head according to the present embodiment is configured so that the bottom end 15L of the main pole 15 includes the first and second portions 15L1 and 15L2 and does not include the third and fourth portions 15L3 and 15L4, among the first to fourth portions 15L1 to 15L4 of the first embodiment shown in FIG. 1. The first portion 15L1 of the present embodiment corresponds to "the inclined portion of the bottom end of the main pole" according to the invention. The second portion 15L2 of the present embodiment is a plane connected to the second end of the first portion 15L1.

Furthermore, the magnetic head according to the present embodiment is configured so that the top surface of the nonmagnetic layer 57 includes the flat portion UL1 and does not include the slope UL2 and the bottom portion UL3, among the flat portion UL1, the slope UL2 and the bottom portion UL3 of the first embodiment shown in FIG. 1.

In the method of manufacturing the magnetic head according to the present embodiment, the process for determining the shape of the bottom end 15L of the main pole 15 is different from that of the first embodiment in the following respects. In the present embodiment, the step of FIG. 8A and FIG. 8B described in relation to the first embodiment is not performed. Furthermore, in the step of FIG. 9A and FIG. 9B described in relation to the first embodiment, the top surface of the portion to be etched 57A of the nonmagnetic layer 57 is vertically etched to form the flat portion UL1.

Among the effects provided by the magnetic head according to the first embodiment, the effect resulting from the features of the shape of the bottom end 15L of the main pole 15 cannot be provided by the present embodiment. However, the present embodiment can provide the effect resulting from the features of the shape of the top surface 15T of the main pole 15.

Furthermore, the present embodiment is configured so that in the direction perpendicular to the medium facing surface 100, the length Lai of the first portion 15T1 of the top surface 15T is smaller than the length $L_{B1}$ of the first portion 15L1 (the inclined portion) of the bottom end 15L and the length $L_C$ of the first slope 16Ab of the first shield 16A. The present embodiment can provide the effect resulting from this feature as with the first embodiment.

The magnetic head according to the present embodiment may have the same configuration as that of the magnetic head according to any of the second to fourth embodiments except for the above-described differences. The remainder of configuration, function and effects of the present embodiment are similar to those of any of the first to fourth embodiments.

Ninth Embodiment

Figure 32:
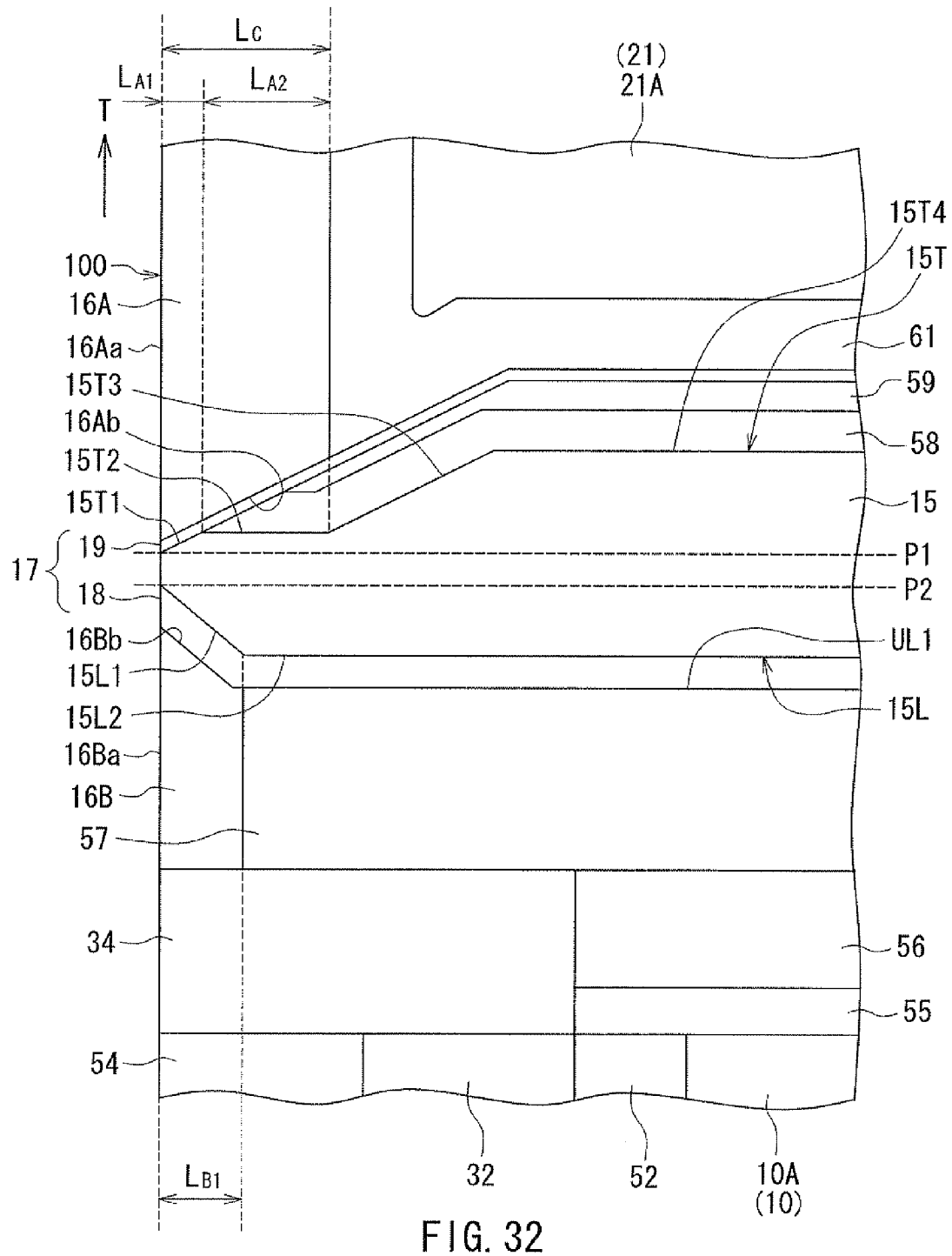
FIG. 32 is a cross-sectional view showing a part of the main pole in the vicinity of the medium facing surface in a magnetic head according to a ninth embodiment of the invention.

A magnetic head according to a ninth embodiment of the invention will now be described with reference to FIG. 32. FIG. 32 is a cross-sectional view showing a part of the main pole in the vicinity of the medium facing surface in the magnetic head according to the present embodiment. Note that FIG. 32 shows a cross section perpendicular to the medium facing surface and the top surface of the substrate, or the main cross section, in particular.

The configuration of the magnetic head according to the present embodiment is different from that of the magnetic head according to the sixth embodiment in the following respects. The shape of the bottom end 15L of the main pole 15 of the present embodiment is the same as that of the bottom end 15L of the main pole 15 of the eighth embodiment. More specifically, the bottom end 15L includes the first and second portions 15L1 and 15L2 and does not include the third and fourth portions 15L3 and 15L4, among the first to fourth portions 15L1 to 15L4 of the sixth embodiment shown in FIG. 29.

The shape of the nonmagnetic layer 57 of the present embodiment is the same as that of the nonmagnetic layer 57 of the eighth embodiment. More specifically, the top surface of the nonmagnetic layer 57 includes the flat portion UL1 and does not include the slope UL2 and the bottom portion UL3, among the flat portion UL1, the slope UL2 and the bottom portion UL3 of the sixth embodiment shown in FIG. 29.

The remainder of configuration, function and effects of the present embodiment are similar to those of the sixth or eighth embodiment.

Tenth Embodiment

Figure 33:
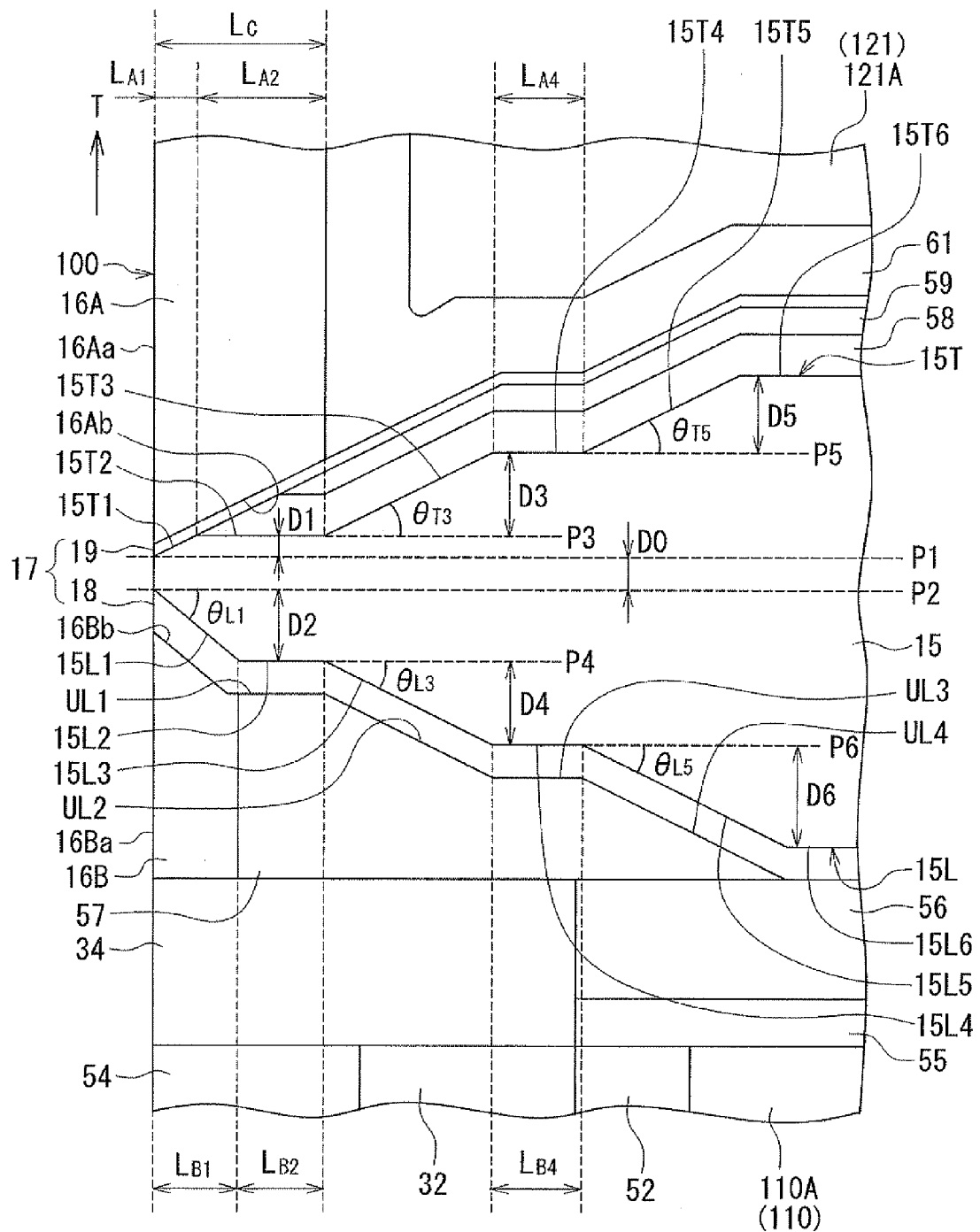
FIG. 33 is a cross-sectional view showing a part of the main pole in the vicinity of the medium facing surface in a magnetic head according to a tenth embodiment of the invention.

A magnetic head according to a tenth embodiment of the invention will now be described with reference to FIG. 33. FIG. 33 is a cross-sectional view showing a part of the main pole in the vicinity of the medium facing surface in the magnetic head according to the present embodiment. Note that FIG. 33 shows a cross section perpendicular to the medium facing surface and the top surface of the substrate, or the main cross section, in particular.

The configuration of the magnetic head according to the present embodiment is different from that of the magnetic head according to the fourth embodiment in the following respects. First, the main pole 15 of the present embodiment is different from the main pole 15 of the first embodiment in the following respects. The top surface 15T of the main pole 15 of the present embodiment includes a fifth portion 15T5 and a sixth portion 15T6 in addition to the first to fourth portions 15T1 to 15T4 of the first embodiment shown in FIG. 1. The fifth portion 15T5 is contiguous with the fourth portion 15T4 and is located farther from the medium facing surface 100 than is the fourth portion 15T4. The sixth portion 15T6 is contiguous with the fifth portion 15T5 and is located farther from the medium facing surface 100 than is the fifth portion 15T5.

The fifth portion 15T5 has a fifth end connected to the fourth portion 15T4, and a sixth end that is located farther from the medium facing surface 100 than is the fifth end. The fifth portion 15T5 is inclined relative to the first and second virtual planes P1 and P2 and the medium facing surface 100 such that the sixth end of the fifth portion 15T5 is located farther from the first and second virtual planes P1 and P2 than is the fifth end of the fifth portion 15T5. In other words, the fifth portion 15T5 is inclined such that the sixth end of the fifth portion 15T5 is located forward of the fifth end of the fifth portion 15T5 in the direction T of travel of the recording medium. The sixth portion 15T6 is substantially parallel to the first and second virtual planes P1 and P2.

The bottom end 15L of the main pole 15 of the present embodiment includes a fifth portion 15L5 and a sixth portion 15L6 in addition to the first to fourth portions 15L1 to 15L4 of the first embodiment shown in FIG. 1. The fifth portion 15L5 is contiguous with the fourth portion 15L4 and is located farther from the medium facing surface 100 than is the fourth portion 15L4. The sixth portion 15L6 is contiguous with the fifth portion 15L5 and is located farther from the medium facing surface 100 than is the fifth portion 15L5.

The fifth portion 15L5 has a fifth end connected to the fourth portion 15L4, and a sixth end that is located farther from the medium facing surface 100 than is the fifth end. The fifth portion 15L5 is inclined relative to the first and second virtual planes P1 and P2 and the medium facing surface 100 such that the sixth end of the fifth portion 15L5 is located farther from the first and second virtual planes P1 and P2 than is the fifth end of the fifth portion 15L5. In other words, the fifth portion 15L5 is inclined such that the sixth end of the fifth portion 15L5 is located backward of the fifth end of the fifth portion 15L5 in the direction T of travel of the recording medium. The sixth portion 15L6 is substantially parallel to the first and second virtual planes P1 and P2.

The nonmagnetic layer 57 of the present embodiment is different from the nonmagnetic layer 57 of the first embodiment in the following respects. The top surface of the nonmagnetic layer 57 of the present embodiment includes a slope UL4 in addition to the flat portion UL1, the slope UL2, and the bottom portion UL3 of the first embodiment shown in FIG. 1. The slope UL4 is contiguous with the bottom portion UL3 and is located farther from the medium facing surface 100 than is the bottom portion UL3. The slope UL4 is inclined relative to the first and second virtual planes P1 and P2 and the medium facing surface 100. The slope UL4 has a bottom end located on the top surface of the insulating layer 56. The fifth portion 15L5 is opposed to the slope UL4 with the second gap layer 18 of the gap part 17 interposed therebetween. The sixth portion 15L6 is opposed to the top surface of the insulating layer 56 with the second gap layer 18 interposed therebetween.

Here, as shown in FIG. 33, the length of the fourth portion 15T4 of the top surface 15T in the direction perpendicular to the medium facing surface 100 will be represented by the symbol $L_{A4}$, and the length of the fourth portion 15L4 of the bottom end 15L in the direction perpendicular to the medium facing surface 100 will be represented by the symbol $L_{B4}$. The lengths $L_{A4}$ and $L_{B4}$ both fall within the range of 0.2 to 0.6 μm, for example.

Note that FIG. 33 is illustrated such that the distance from the medium facing surface 100 to the boundary between the fourth portion 15T4 and the fifth portion 15T5 of the top surface 15T is equal to the distance from the medium facing surface 100 to the boundary between the fourth portion 15L4 and the fifth portion 15L5 of the bottom end 15L. However, these distances may be different from each other. FIG. 33 is also illustrated such that the distance from the medium facing surface 100 to the boundary between the fifth portion 15T5 and the sixth portion 15T6 of the top surface 15T is different from the distance from the medium facing surface 100 to the boundary between the fifth portion 15L5 and the sixth portion 15L6 of the bottom end 15L. However, these distances may be equal to each other.

The sixth portion 15T6 of the top surface 15T and the sixth portion 15L6 of the bottom end 15L are substantially parallel to the first and second virtual planes P1 and P2. Here, as shown in FIG. 33, assume a virtual plane P5 and a virtual plane P6. The virtual plane P5 passes through the fifth end of the fifth portion 15T5 of the top surface 15T and is parallel to the first and second virtual planes P1 and P2. The virtual plane P6 passes through the fifth end of the fifth portion 15L5 of the bottom end 15L and is parallel to the first and second virtual planes P1 and P2. The distance between the sixth portion 15T6 of the top surface 15T and the virtual plane P5 will be represented by the symbol D5. The distance between the sixth portion 15L6 of the bottom end 15L and the virtual plane P6 will be represented by the symbol D6. The distances D5 and D6 both fall within the range of 0.1 to 0.5 μm, for example. The angle of inclination of the fifth portion 15T5 relative to the virtual plane P5 will be represented by the symbol $\theta_{T5}$, and the angle of inclination of the fifth portion 15L5 relative to the virtual plane P6 will be represented by the symbol $\theta_{L5}$. The angles of inclination $\theta_{T5}$ and $\theta_{L5}$ both fall within the range of 22° to 60°, for example.

A method of manufacturing the magnetic head according to the present embodiment will now be described. In the method of manufacturing the magnetic head according to the present embodiment, the process for determining the shape of the bottom end 15L of the main pole 15 and the process for determining the shape of the top surface 15T of the main pole 15 are different from those of the first embodiment.

First, a description will be given of the process for determining the shape of the bottom end 15L of the main pole 15 of the present embodiment. In the present embodiment, the following step is performed after the step of FIG. 8A and FIG. 8B described in relation to the first embodiment and before the step of FIG. 9A and FIG. 9B described in relation to the first embodiment. Initially, a first mask is formed over the second shield 16B, the magnetic layer 36, the second connection layer, and the nonmagnetic layer 57. The first mask is formed by patterning a photoresist layer. The first mask has an opening for exposing a part of the initial bottom portion UL3P of the portion to be etched 57A of the nonmagnetic layer 57. The first mask covers the initial top surface UL1P, the initial slope UL2P, and another part of the initial bottom portion UL3P of the portion to be etched 57A. The first mask does not cover a part of the magnetic layer 36 located in the vicinity of the boundary between the magnetic layer 36 and the portion to be etched 57A.

Next, the portion to be etched 57A is taper-etched by, for example, RIE, using the first mask as the etching mask. The etching conditions for the portion to be etched 57A are the same as the etching conditions employed in the first etching step described in relation to the first embodiment. The taper-etching of the portion to be etched 57A provides the portion 57A with a second initial slope and a second initial bottom portion. The second initial slope and the second initial bottom portion are formed in this order so as to be contiguous with a portion of the initial bottom portion UL3P that remains after this etching. This etching proceeds until the second initial bottom portion reaches a level between the initial bottom portion UL3P and the bottom surface of the portion to be etched 57A as originally formed. The first mask is then removed.

Furthermore, in the present embodiment, the step of FIG. 9A and FIG. 9B (the second etching step) described in relation to the first embodiment is different from that in the first embodiment in the following respects. The second etching step of the present embodiment proceeds until the bottom of the groove to be formed by the etching in the portion to be etched 57A reaches the top surface of the insulating layer 56. In the second etching step of the present embodiment, portions of the portion to be etched 57A lying under the initial top surface UL1P, the initial slope UL2P, the initial bottom portion UL3P and the second initial slope are etched to form the flat portion UL1, the slope UL2, the bottom portion UL3, and the slope UL4. The angle of inclination of the slope UL4 is equal or nearly equal to the angle of inclination $\theta_{L5}$ of the fifth portion 15L5 of the bottom end 15L of the main pole 15 to be formed later.

The process for determining the shape of the top surface 15T of the main pole 15 of the present embodiment will now be described. In the present embodiment, the top surface 15PT of the magnetic layer 15P after the step of FIG. 13A and FIG. 13B described in relation to the first embodiment includes a portion that is to later become the sixth portion 15T6 of the top surface 15T of the main pole 15. In the present embodiment, the following step is performed in place of the step of FIG. 14A and FIG. 14B described in relation to the first embodiment. First, a second mask is formed on the top surface 15PT of the magnetic layer 15P. The second mask is formed by patterning a photoresist layer. The second mask does not cover a part of the magnetic layer 15P located in the vicinity of the position ABS where the medium facing surface 100 is to be formed.

Then, portions of the magnetic layer 15P, the side shields 16C and 16D and the second gap layer 18 in the vicinity of the position ABS where the medium facing surface 100 is to be formed are etched by using the second mask as the etching mask. This etching is performed so that part of the top surface 15PT of the magnetic layer 15P is etched to provide the magnetic layer 15P with a second flat portion and the fifth portion 15T5 which is a slope. The etching conditions for the magnetic layer 15P are the same as the etching conditions employed in the fourth etching step described in relation to the first embodiment. The second flat portion includes a portion that is to later become the fourth portion 15T4 of the top surface 15T of the main pole 15. The second mask is then removed.

Next, a third mask is formed on the portion of the top surface 15PT of the magnetic layer 15P remaining after the above-described etching step and on top of the fifth portion 15T5 and part of the second flat portion. The third mask is formed by patterning a photoresist layer. The third mask does not cover a part of the magnetic layer 15P located in the vicinity of the position ABS where the medium facing surface 100 is to be formed.

Then, portions of the magnetic layer 15P, the side shields 16C and 16D and the second gap layer 18 in the vicinity of the position ABS where the medium facing surface 100 is to be formed are etched by using the third mask as the etching mask. This etching is performed so that part of the second flat portion of the magnetic layer 15P is etched to provide the magnetic layer 15P with the flat portion 15T2P and the third portion 15T3 which is a slope. The etching conditions for the magnetic layer 15P are the same as the etching conditions employed in the fourth etching step described in relation to the first embodiment. The third mask is then removed.

According to the present embodiment, the top surface 15T of the main pole 15 includes the fifth and sixth portions 15T5 and 15T6, and the bottom end 15L of the main pole 15 includes the fifth and sixth portions 15L5 and 15L6. This allows the effects resulting from the features of the shape of the main pole 15 described in relation to the first embodiment to become more noticeable.

The shapes and locations of the first to third portions 15T1 to 15T3 of the top surface 15T of the main pole 15 of the present embodiment and the shapes and locations of the first to third portions 15L1 to 15L3 of the bottom end 15L of the main pole 15 of the present embodiment may be the same as those of any of the first and fifth to seventh embodiments. Note that FIG. 33 is illustrated such that the length Lc of the first slope 16Ab in the direction perpendicular to the medium facing surface 100 is equal to the distance from the medium facing surface 100 to the boundary between the second portion 15T2 and the third portion 15T3 of the top surface 15T (which is the same as the sum of the length $L_{A1}$ and the length $L_{A2}$). However, they may be different from each other. The remainder of configuration, function and effects of the present embodiment are similar to those of any of the fourth to seventh embodiments.

Eleventh Embodiment

Figure 34:
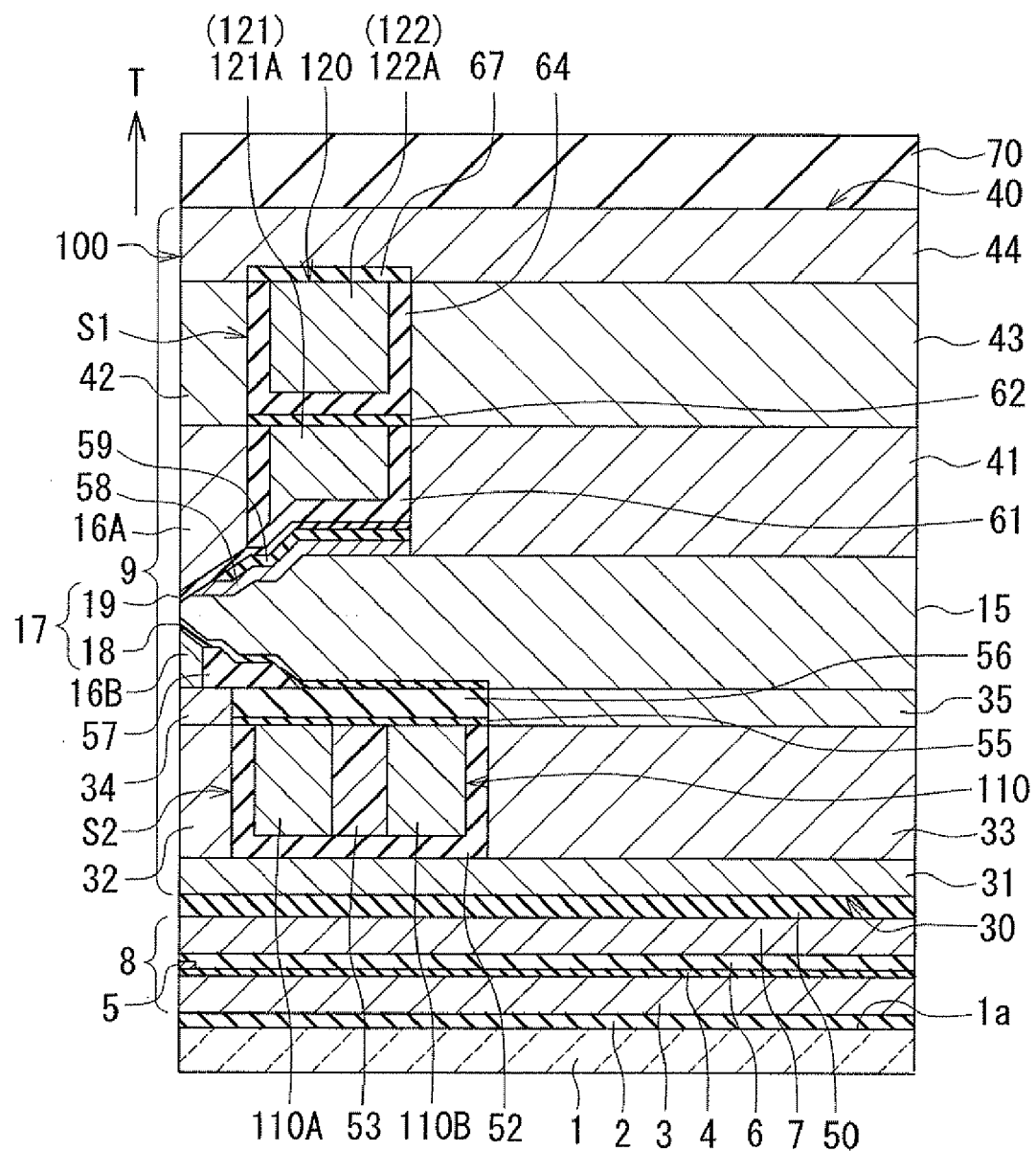
FIG. 34 is a cross-sectional view of a magnetic head according to an eleventh embodiment of the invention.

A magnetic head according to an eleventh embodiment of the invention will now be described with reference to FIG. 34. FIG. 34 is a cross-sectional view of the magnetic head according to the present embodiment. Note that FIG. 34 shows a cross section perpendicular to the medium facing surface and the top surface of the substrate, or the main cross section, in particular.

The configuration of the magnetic head according to the present embodiment is different from that of the magnetic head according to the fourth embodiment in the following respects. The magnetic head according to the present embodiment has the main pole 15 of the tenth embodiment shown in FIG. 33 instead of the main pole 15 of the fourth embodiment shown in FIG. 24. Furthermore, in the magnetic head according to the present embodiment, the magnetic layer 42 does not have the first and second connecting surfaces. The top surface of the magnetic layer 42 extends to the medium facing surface 100 and is connected to the front end face of the magnetic layer 42. In the magnetic head according to the present embodiment, each of the magnetic layers 31, 32, and 44 has an end face located in the medium facing surface 100. The magnetic head according to the present embodiment does not have the magnetic layer 36. In the magnetic head according to the present embodiment, the top surface of the magnetic layer 35 is in contact with the bottom end 15L of the main pole 15.

The remainder of configuration, function and effects of the present embodiment are similar to those of the fourth or tenth embodiment.

Twelfth Embodiment

Figure 35:
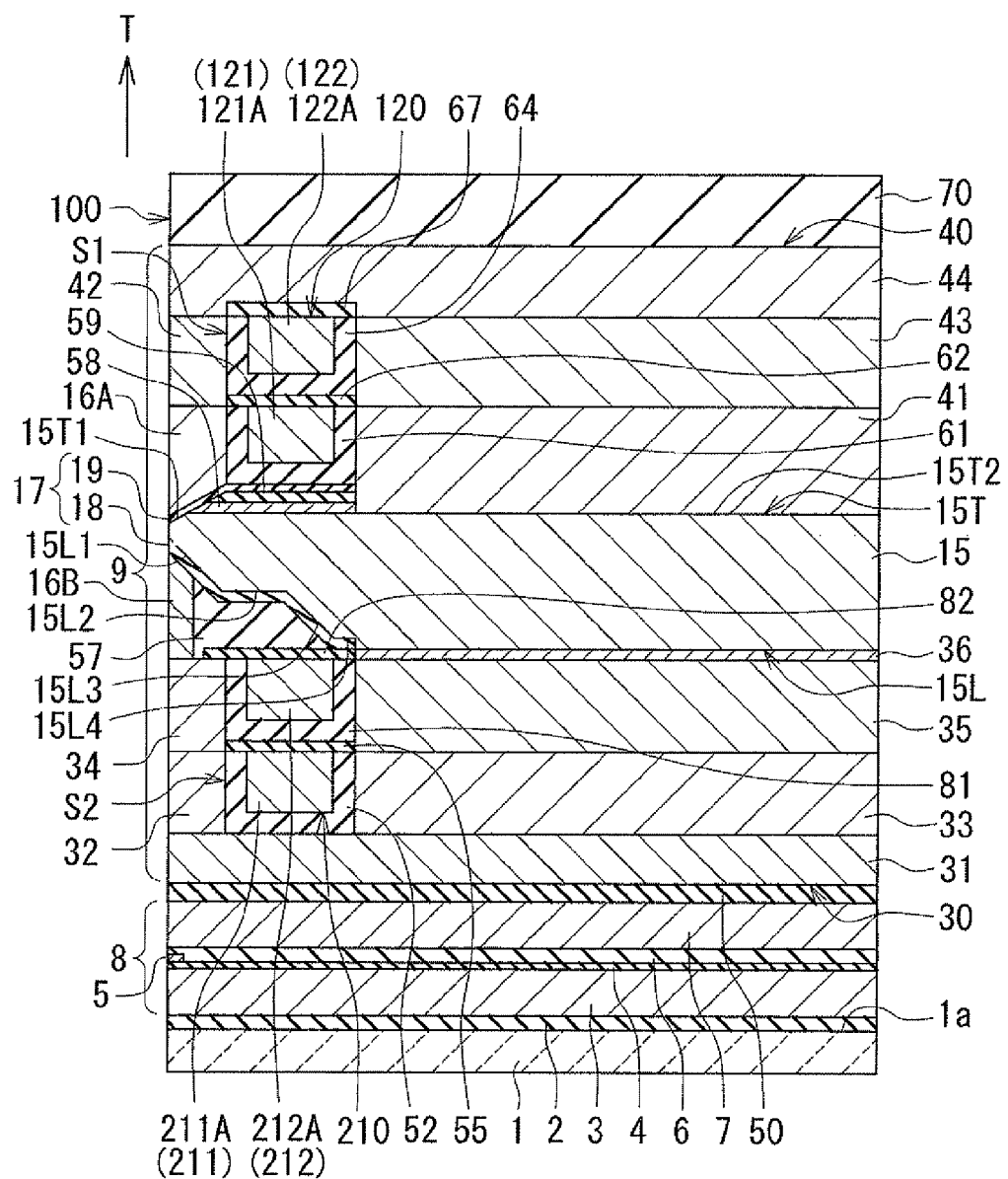
FIG. 35 is a cross-sectional view of a magnetic head according to a twelfth embodiment of the invention.
Figure 36:
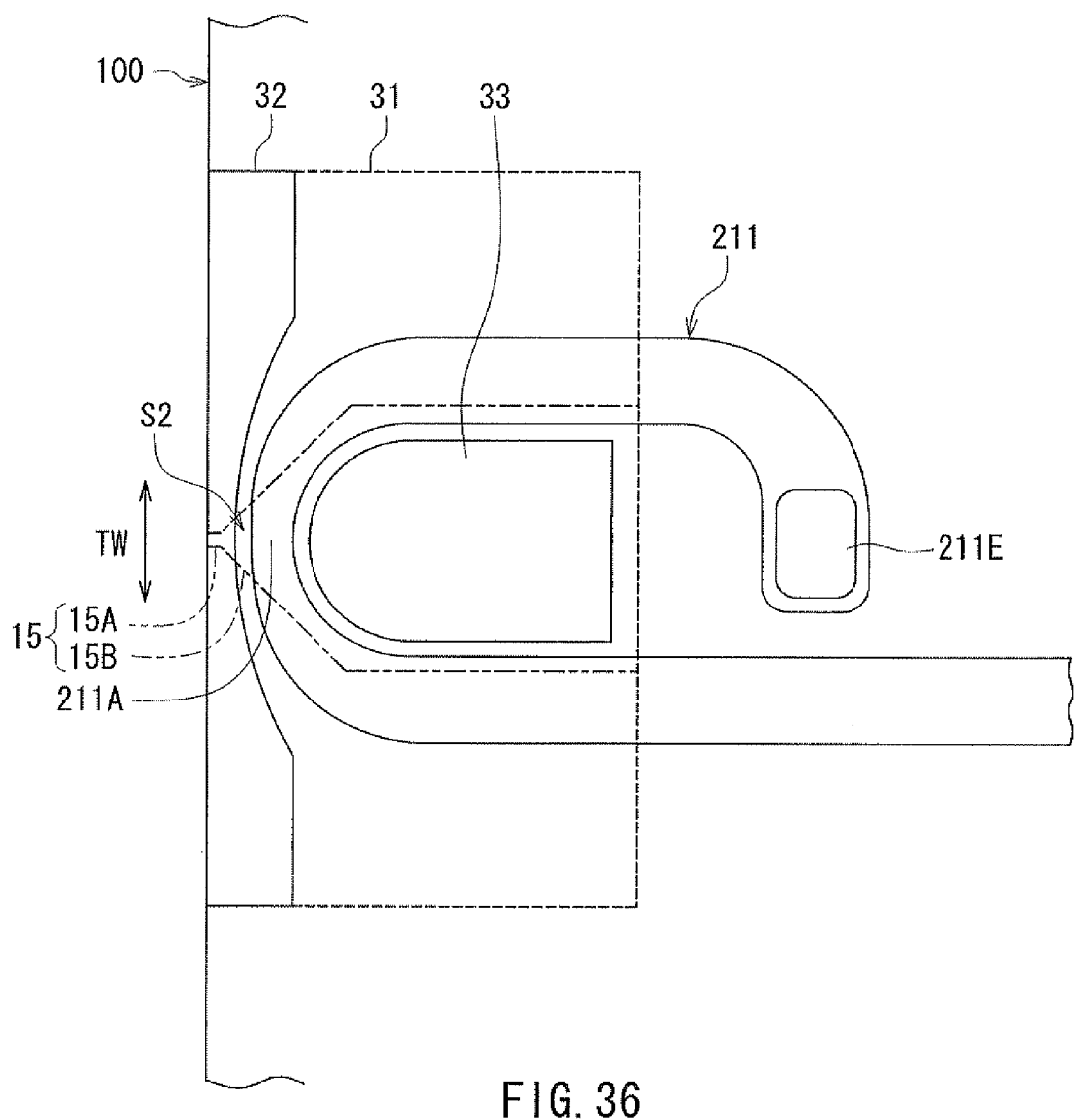
FIG. 36 is a plan view showing a first layer of a second portion of a coil in the magnetic head according to the twelfth embodiment of the invention.
Figure 37:
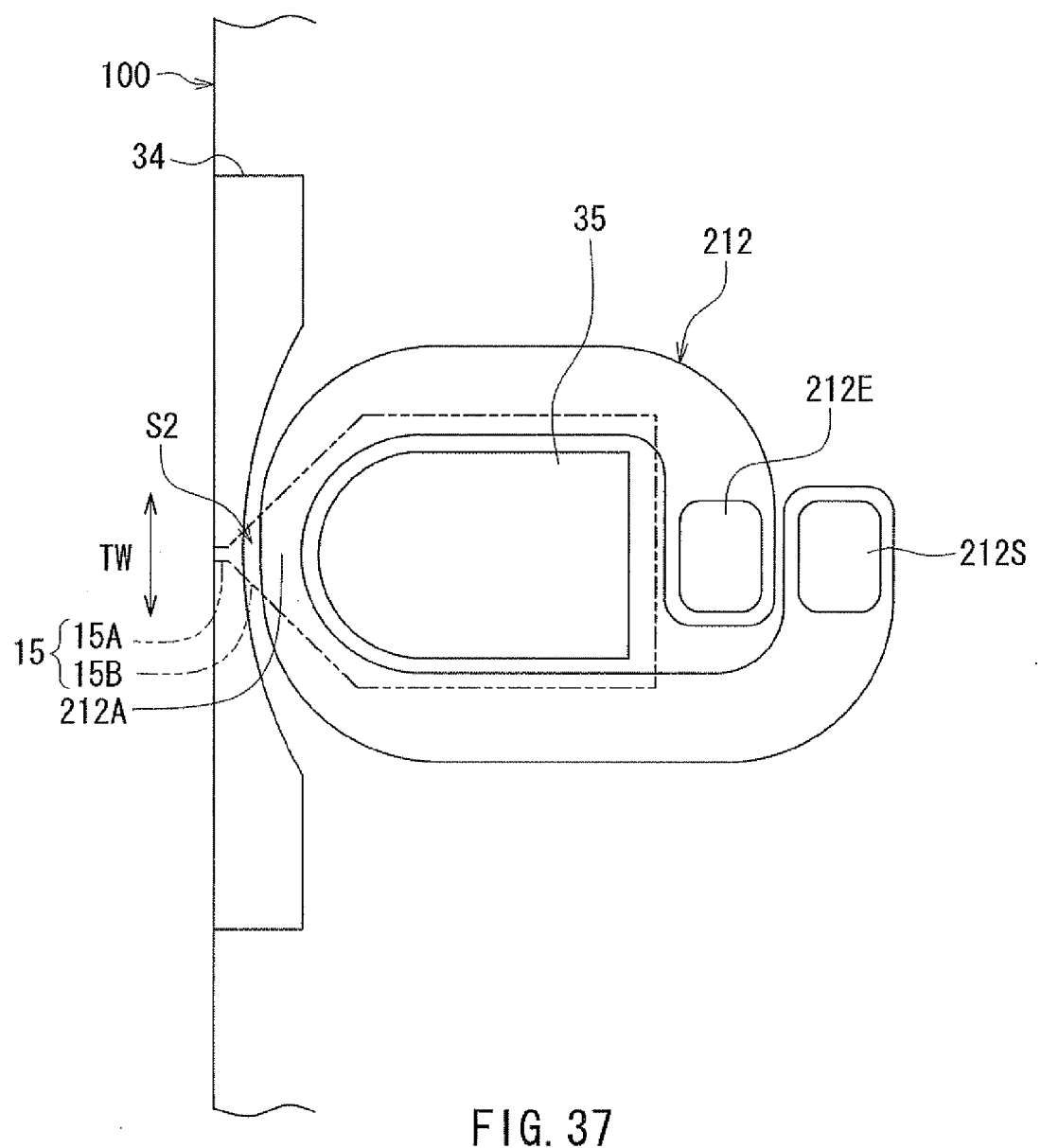
FIG. 37 is a plan view showing a second layer of the second portion of the coil in the magnetic head according to the twelfth embodiment of the invention.

A magnetic head according to a twelfth embodiment of the invention will now be described with reference to FIG. 35 to FIG. 37. FIG. 35 is a cross-sectional view of the magnetic head according to the present embodiment. Note that FIG. 35 shows a cross section perpendicular to the medium facing surface and the top surface of the substrate, or the main cross section, in particular. FIG. 36 is a plan view showing a first layer of a second portion of the coil of the magnetic head according to the present embodiment. FIG. 37 is a plan view showing a second layer of the second portion of the coil of the magnetic head according to the present embodiment.

The configuration of the magnetic head according to the present embodiment is different from that of the magnetic head according to the fourth embodiment in the following respects. In the magnetic head according to the present embodiment, the magnetic layer 42 does not have the first and second connecting surfaces. The top surface of the magnetic layer 42 extends to the medium facing surface 100 and is connected to the front end face of the magnetic layer 42. In the magnetic head according to the present embodiment, each of the magnetic layers 31, 32, and 44 has an end face located in the medium facing surface 100.

In the magnetic head according to the present embodiment, the coil includes a second portion 210 instead of the second portion 110. The second portion 210 includes a first layer 211 and a second layer 212. As shown in FIG. 36, the first layer 211 is wound approximately one turn around the magnetic layer 33 which constitutes part of the second return path section 30. As shown in FIG. 37, the second layer 212 is wound one turn around the magnetic layer 35 which constitutes part of the second return path section 30. The magnetic head according to the present embodiment does not have the insulating layer 53.

The magnetic head according to the present embodiment has an insulating film 81 and an insulating layer 82 each made of an insulating material. The insulating film 81 is interposed between the second layer 212 and each of the magnetic layers 34 and 35 and the insulating layer 55. The top surfaces of the second layer 212, the magnetic layers 34 and 35, the insulating film 81, and the insulating layer 56 (not shown) are even with each other. The insulating layer 82 is disposed over the top surfaces of the second layer 212 and the insulating film 81 and part of the top surface of the magnetic layer 34. The insulating film 81 and the insulating layer 82 are made of alumina, for example.

The magnetic head according to the present embodiment is configured so that the top surface 15T of the main pole 15 includes the first and second portions 15T1 and 15T2 and does not include the third and fourth portions 15T3 and 15T4, among the first to fourth portions 15T1 to 15T4 of the first embodiment shown in FIG. 1. The first portion 15T1 of the present embodiment corresponds to "the inclined portion of the top surface of the main pole" according to the invention.

In the magnetic head according to the present embodiment, the top surface of the second shield 16B includes only the second slope 16Bb of the first embodiment shown in FIG. 1, and does not include any flat portion. The insulating layer 56 includes a third slope, a third flat portion, and a fourth slope instead of the flat portion UL1, the slope UL2, and the bottom portion UL3 of the first embodiment shown in FIG. 1. The third slope is contiguous with the second slope 16Bb of the second shield 16B. The third flat portion is contiguous with the third slope and is located farther from the medium facing surface 100 than is the third slope. The fourth slope is contiguous with the third flat portion and is located farther from the medium facing surface 100 than is the third flat portion. The third and fourth slopes are inclined relative to the medium facing surface 100 and the first and second virtual plane P1 and P2 of FIG. 1 described in relation to the first embodiment. The fourth slope has a bottom end located on the top surface of the insulating layer 82.

In the magnetic head according to the present embodiment, the first portion 15L1 of the bottom end 15L of the main pole 15 is opposed to the second slope 16Bb and the third slope with the second gap layer 18 of the gap part 17 interposed between the first portion 15L1 and each of the second slope 16Bb and the third slope. The second portion 15L2 is opposed to the third flat portion with the second gap layer 18 interposed therebetween. The third portion 15L3 is opposed to the fourth slope with the second gap layer 18 interposed therebetween. The fourth portion 15L4 is opposed to the top surface of the insulating layer 82 with the second gap layer 18 interposed therebetween.

The second portion 210 of the coil will now be described in more detail with reference to FIG. 36 and FIG. 37. As shown in FIG. 36, the first layer 211 of the second portion 210 includes a second coil element 211A extending to pass between the magnetic layer 32 and the magnetic layer 33, in particular, within the second space S2. The first layer 211 has a coil connection part 211E electrically connected to the second layer 212.

As shown in FIG. 37, the second layer 212 of the second portion 210 includes a second coil element 212A extending to pass between the magnetic layer 34 and the magnetic layer 35, in particular, within the second space S2. The second layer 212 has a coil connection part 212S penetrating the insulating layer 55 and the insulating film 81 and electrically connected to the coil connection part 211E of the first layer 211, and a coil connection part 212E electrically connected to the coil connection part 121S of the first layer 121 of the first portion 120 of the fourth embodiment shown in FIG. 26.

A method of manufacturing the magnetic head according to the present embodiment will now be described. The method of manufacturing the magnetic head according to the present embodiment is different from the method according to the first embodiment in the following respects. In the present embodiment, the first layer 211 of the second portion 210 of the coil is formed in place of the second portion 10 of the coil. Furthermore, the steps to be performed after the formation of the magnetic layers 34 and 35 and before the formation of the second shield 16B and the nonmagnetic layer 57 in the present embodiment are different from those in the first embodiment. In the present embodiment, the insulating film 81 is formed subsequent to the formation of the magnetic layers 34 and 35. The insulating layer 55 and the insulating film 81 are then selectively etched by, for example, IBE, so that the coil connection part 211E of the first layer 211 is exposed.

Next, the second layer 212 of the second portion 210 of the coil is formed by frame plating, for example. The second layer 212 is formed such that its top surface is higher in level than the top surface of the portion of the insulating film 81 lying on the magnetic layers 34 and 35. Next, the insulating layer 56 (not shown) is formed over the entire top surface of the stack. The second layer 212, the insulating film 81, and the insulating layer 56 are then polished by, for example, CMP, until the magnetic layers 34 and 35 are exposed. The top surfaces of the second layer 212, the magnetic layers 34 and 35, the insulating film 81, and the insulating layer 56 are thereby made even with each other. Next, the insulating layer 82 is formed over the entire top surface of the stack. The insulating layer 82 is then selectively etched by, for example, IBE, so that part of the top surface of the magnetic layer 34, the top surface of the magnetic layer 35, and the coil connection part 212E of the second layer 212 are exposed.

In the present embodiment, the process for determining the shape of the bottom end 15L of the main pole 15 and the process for determining the shape of the top surface 15T of the main pole 15 are different from those of the first embodiment.

First, a description will be given of the process for determining the shape of the bottom end 15L of the main pole 15 of the present embodiment. In the present embodiment, the following step is performed after the step of FIG. 8A and FIG. 8B described in relation to the first embodiment. Initially, the mask 72 of the first embodiment shown in FIG. 9A and FIG. 9B is formed. The portion to be etched 57A is then etched using the mask 72, the second shield 16B, and the magnetic layer 36 as an etching mask. This etching is performed to etch portions lying under the initial top surface UL1P, the initial slope UL2P and the initial bottom portion UL3P to form the flat portion UL1, the slope UL2, and the bottom portion UL3. This etching is performed by, for example, RIE, under such a condition that part of the portion to be etched 57A as originally formed remains to form a slope in the vicinity of the boundary between the portion to be etched 57A as originally formed and the second shield 16B. The mask 72 is then removed.

Then, in the vicinity of the position ABS where the medium facing surface 100 is to be formed, etching is performed to etch part of the initial top surface of the second shield 16B and part of the portion to be etched 57A. This etching is performed by, for example, IBE, so that part of the initial top surface of the second shield 16B is etched to provide the second shield 16B with the second slope 16Bb. This etching proceeds until the bottom of the groove to be formed by the etching in the portion to be etched 57A reaches the top surface of the insulating layer 82, so that the portion 57A after being etched has the third slope, the third flat portion, and the fourth slope. The angles of inclination of the second slope 16Bb and the third slope are equal or nearly equal to the angle of inclination $\theta_{L1}$ of the first portion 15L1 of the bottom end 15L of the main pole 15 to be formed later. The third flat portion extends in a direction substantially perpendicular to the medium facing surface 100 to be formed later. The angle of inclination of the fourth slope is equal or nearly equal to the angle of inclination $\theta_{L3}$ of the third portion 15L3 of the bottom end 15L of the main pole 15 to be formed later.

The process for determining the shape of the top surface 15T of the main pole 15 of the present embodiment will now be described. In the present embodiment, the top surface 15PT of the magnetic layer 15P after the step of FIG. 13A and FIG. 13B described in relation to the first embodiment includes a portion that is to later become the second portion 15T2 of the top surface 15T of the main pole 15. In the present embodiment, the step of FIG. 14A and FIG. 14B described in relation to the first embodiment is not performed. In the present embodiment, the step of FIG. 16A and FIG. 16B (the fifth etching step) described in relation to the first embodiment etches part of the magnetic layer 15P to form the first and second portions 15T1 and 15T2.

Among the effects provided by the magnetic head according to the first embodiment, the effect resulting from the features of the shape of the top surface 15T of the main pole 15 cannot be provided by the present embodiment. However, the present embodiment can provide the effect resulting from the features of the shape of the bottom end 15L of the main pole 15.

Furthermore, the present embodiment is configured so that in the direction perpendicular to the medium facing surface 100, the length $L_{A1}$ of the first portion 15T1 (the inclined portion) of the top surface 15T is smaller than the length $L_{B1}$ of the first portion 15L1 of the bottom end 15L and the length $L_C$ of the first slope 16Ab of the first shield 16A. The present embodiment can provide the effect resulting from this feature as with the first embodiment.

The remainder of configuration, function and effects of the present embodiment are similar to those of the fourth embodiment.

The present invention is not limited to the foregoing embodiments, and various modifications may be made thereto. For example, as far as the requirements of the appended claims are met, the top surface 15T and the bottom end 15L of the main pole 15 that have been described in the foregoing embodiments can be employed in any combination.

Furthermore, the magnetic head may be provided with either one of the first return path section 40 and the second return path section 30.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:
   a medium facing surface that faces a recording medium;
   a coil that produces a magnetic field corresponding to data to be written on a recording medium;
   a main pole that has an end face located in the medium facing surface, allows a magnetic flux corresponding to the magnetic field produced by the coil to pass, and produces a write magnetic field for writing the data on a recording medium by means of a perpendicular magnetic recording system;
   a write shield that is made of a magnetic material and has an end face located in the medium facing surface; and
   a gap part that is made of a nonmagnetic material and interposed between the main pole and the write shield, wherein:

the end face of the write shield includes a first end face portion that is located forward of the end face of the main pole in a direction of travel of a recording medium;

the main pole has a top surface, and a bottom end opposite to the top surface, the top surface being a surface located at a forward end in the direction of travel of a recording medium;

at least one of the top surface and the bottom end of the main pole includes a first portion, a second portion, and a third portion that are contiguously arranged in this order of increasing distance from the medium facing surface;

the first portion has a first end located in the medium facing surface, and a second end opposite to the first end;

the third portion has a third end connected to the second portion, and a fourth end that is located farther from the medium facing surface than is the third end;

the end face of the main pole has an end located forward in the direction of travel of a recording medium and an end located backward in the direction of travel of a recording medium;

a first virtual plane and a second virtual plane, the first virtual plane passing through the end of the end face of the main pole located forward in the direction of travel of a recording medium and being perpendicular to the medium facing surface and to the direction of travel of a recording medium, the second virtual plane passing through the end of the end face of the main pole located backward in the direction of travel of a recording medium and being perpendicular to the medium facing surface and to the direction of travel of a recording medium, the first portion is inclined relative to the first and second virtual planes and the medium facing surface such that the second end is located farther from the first and second virtual planes than is the first end;

the second portion is substantially parallel to the first and second virtual planes;

the third portion is inclined relative to the first and second virtual planes and the medium facing surface such that the fourth end is located farther from the first and second virtual planes than is the third end; and the write shield includes a portion interposed between the third portion and the medium facing surface.

2. The magnetic head for perpendicular magnetic recording according to claim 1, wherein the end face of the main pole located in the medium facing surface has a width that decreases with increasing distance from the first virtual plane.

3. The magnetic head for perpendicular magnetic recording according to claim 1, wherein:

the at least one of the top surface and the bottom end of the main pole further includes a fourth portion and a fifth portion;

the fourth portion is contiguous with the third portion and is located farther from the medium facing surface than is the third portion;

the fifth portion is contiguous with the fourth portion and is located farther from the medium facing surface than is the fourth portion;

the fourth portion is substantially parallel to the first and second virtual planes; and the fifth portion has a fifth end connected to the fourth portion, and a sixth end that is located farther from the medium facing surface than is the fifth end, the fifth portion being inclined relative to the first and second virtual planes and the medium facing surface such that the sixth end is located farther from—the first and second virtual planes than is the fifth end.

4. The magnetic head for perpendicular magnetic recording according to claim 1, wherein:

the top surface of the main pole includes the first to third portions;

the bottom end of the main pole includes an inclined portion that has a first end located in the medium facing surface and a second end opposite to the first end;

the inclined portion is inclined relative to the first and second virtual planes and the medium facing surface such that the second end of the inclined portion is located farther from the first and second virtual planes than is the first end of the inclined portion;

the write shield has a slope including a portion that is opposed to the first portion with the gap part interposed therebetween, the slope being inclined relative to the first and second virtual planes and the medium facing surface; and the first portion is smaller than each of the inclined portion and the slope in length in a direction perpendicular to the medium facing surface.

5. The magnetic head for perpendicular magnetic recording according to claim 4, further comprising a return path section made of a magnetic material, wherein:

the return path section is located forward of the main pole in the direction of travel of a recording medium and connects the write shield and part of the main pole away from the medium facing surface to each other so that a space is defined by the main pole, the gap part, the write shield, and the return path section; and the coil includes a portion that passes through the space.

6. The magnetic head for perpendicular magnetic recording according to claim 1, wherein:

the bottom end of the main pole includes the first to third portions;

the end face of the write shield further includes a second end face portion that is located backward of the end face of the main pole in the direction of travel of a recording medium;

the top surface of the main pole includes an inclined portion that has a first end located in the medium facing surface and a second end opposite to the first end;

the inclined portion is inclined relative to the first and second virtual planes and the medium facing surface such that the second end of the inclined portion is located farther from the first and second virtual planes than is the first end of the inclined portion;

the write shield has a slope including a portion that is opposed to the inclined portion with the gap part interposed therebetween, the slope being inclined relative to the first and second virtual planes and the medium facing surface; and the inclined portion is smaller than each of the first portion and the slope in length in a direction perpendicular to the medium facing surface.

7. The magnetic head for perpendicular magnetic recording according to claim 6, further comprising a return path section made of a magnetic material, wherein:

the return path section is located backward of the main pole in the direction of travel of a recording medium and connects the write shield and part of the main pole away from the medium facing surface to each other so that a space is defined by the main pole, the gap part, the write shield, and the return path section; and the coil includes a portion that passes through the space.

8. The magnetic head for perpendicular magnetic recording according to claim 1, wherein:

each of the top surface and the bottom end of the main pole includes the first to third portions;

the end face of the write shield further includes a second end face portion that is located backward of the end face of the main pole in the direction of travel of a recording medium;

the write shield has a slope including a portion that is opposed to the first portion of the top surface of the main pole with the gap part interposed therebetween, the slope being inclined relative to the first and second virtual planes and the medium facing surface; and the first portion of the top surface of the main pole is smaller than each of the first portion of the bottom end of the main pole and the slope in length in a direction perpendicular to the medium facing surface.

9. The magnetic head for perpendicular magnetic recording according to claim 8, further comprising a first return path section and a second return path section each made of a magnetic material, wherein:

the first return path section is located forward of the main pole in the direction of travel of a recording medium and connects the write shield and part of the main pole away from the medium facing surface to each other so that a first space is defined by the main pole, the gap part, the write shield, and the first return path section;

the second return path section is located backward of the main pole in the direction of travel of a recording medium and connects the write shield and part of the main pole away from the medium facing surface to each other so that a second space is defined by the main pole, the gap part, the write shield, and the second return path section; and the coil includes a first portion that passes through the first space and a second portion that passes through the second space.

* * * * *